(12) United States Patent
Watahiki et al.

(10) Patent No.: US 9,263,767 B2
(45) Date of Patent: Feb. 16, 2016

(54) ELECTROLYTE SOLUTION FOR ELECTROCHEMICAL DEVICES

(75) Inventors: Tsutomu Watahiki, Kawagoe (JP); Takahiro Kiyosu, Kawagoe (JP); Kuniaki Okamoto, Kawagoe (JP)

(73) Assignee: Wako Pure Chemical Industries, Ltd., Osaka (JP)

( * ) Notice: Subject to any disclaimer, the term of this patent is extended or adjusted under 35 U.S.C. 154(b) by 215 days.

(21) Appl. No.: 14/235,370

(22) PCT Filed: Jul. 26, 2012

(86) PCT No.: PCT/JP2012/068996
§ 371 (c)(1),
(2), (4) Date: Jan. 27, 2014

(87) PCT Pub. No.: WO2013/015369
PCT Pub. Date: Jan. 31, 2013

(65) Prior Publication Data
US 2014/0162143 A1 Jun. 12, 2014

(30) Foreign Application Priority Data
Jul. 28, 2011 (JP) ................................. 2011-166018

(51) Int. Cl.
| H01M 6/16 | (2006.01) |
| H01M 10/0567 | (2010.01) |
| H01M 10/0568 | (2010.01) |
| H01M 10/0569 | (2010.01) |
| H01M 10/054 | (2010.01) |

(52) U.S. Cl.
CPC ........ *H01M 10/0567* (2013.01); *H01M 10/054* (2013.01); *H01M 10/0568* (2013.01); *H01M 10/0569* (2013.01); *H01M 2300/0025* (2013.01)

(58) Field of Classification Search
CPC ..................... H01M 10/0567; H01M 10/0568; H01M 10/0569; H01M 10/054; H01M 2300/0025
See application file for complete search history.

(56) References Cited

U.S. PATENT DOCUMENTS 5,491,039 A * 2/1996 Shackle ................ H01M 6/166
  252/62.2
5,693,432 A * 12/1997 Matsumoto .......... H01G 9/2009
  429/317
6,316,141 B1 * 11/2001 Aurbach .............. C01G 28/007
  429/188
2001/0049060 A1 12/2001 Aurbach et al.
2012/0219867 A1 * 8/2012 Nuli ........................ H01M 4/13
  429/337

FOREIGN PATENT DOCUMENTS

| JP | 2003-512704 | 4/2003 |
| JP | 2004-259650 | 9/2004 |
| JP | 2007-188694 | 7/2007 |
| JP | 2007-188709 | 7/2007 |

OTHER PUBLICATIONS

D. Aurbach et al.: "Prototype systems for rechargeable magnesium batteries"; Nature, vol. 407, 2000 Macmillan Magazines Ltd., Oct. 12, 2000, pp. 724-727.
Shiraga et al.: "Electrochemical characteristics of negative electrode for metal magnesium rechargeable battery, in ether-type electrolyte"; Graduate School of Engineering, Kyoto University, Proceedings, No. 76, New Battery Concept Subcommittee (2011), pp. 1-5 with partial translation.
Yoshimoto et al.: "Magnesium rechargeable battery"; Future Material, vol. 62, No. 4 (2011), pp. 211-216 with partial translation.

* cited by examiner

*Primary Examiner* — Raymond Alejandro
(74) *Attorney, Agent, or Firm* — Hamre, Schumann, Mueller & Larson, P.C.

(57) ABSTRACT

It is an object of the present invention to provide an electrochemical device having an electrolytic solution having high current density and high oxidation resistance, as well as high safety, where dissolution and deposition of magnesium progress repeatedly and stably.

The present invention relates to the electrolytic solution for an electrochemical device comprising (1) the supporting electrolyte composed of a magnesium salt and (2) at least one or more kinds of the compound represented by the following general formula [2], as well as the electrochemical device comprising said electrolytic solution, a positive electrode, a negative electrode and a separator.

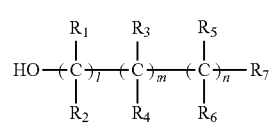

[2]

10 Claims, 22 Drawing Sheets

Fig. 58
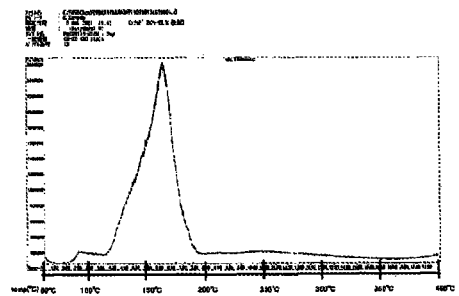
Fig. 59
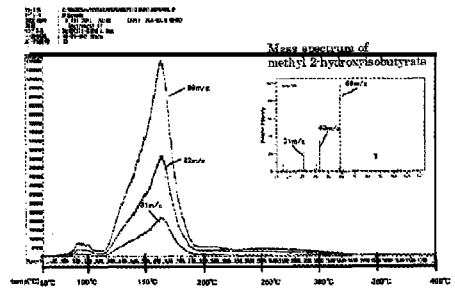
Fig. 60

ELECTROLYTE SOLUTION FOR ELECTROCHEMICAL DEVICES

TECHNICAL FIELD

The present invention relates to an electrolytic solution containing a magnesium ion and an electrochemical device including said electrolytic solution.

BACKGROUND ART

Magnesium to be used as a raw material of a magnesium ion battery is an element present abundantly on the earth, and is a material having higher superiority as compared with lithium which is unstable in price and supply amount or the like. In addition, since the magnesium ion battery is cheap and safe, as well as has high energy density, it has been drawn attention as a post-lithium ion battery.

As a negative electrode of the magnesium ion battery, usually metal magnesium is used. However, since metal magnesium has high reducibility, in the case where said metal is used as a negative electrode, it reacts with an electrolytic solution to form a passive state film having low ion conductivity, at the electrode surface thereof. There has been well known that formation of this passive state film inhibits reversible dissolution and deposition of magnesium, which has been a problem on using metal magnesium as a negative electrode.

On the other hand, an electrolytic solution not forming the passive state film has also been known. For example, in PATENT LITERATURE 1 and NON PATENT LITERATURE 1, there has been reported that by using an electrolytic solution, where an electrolyte represented by the general formula $Mg(ZR^1{}_lR^2{}_mX_n)_2$ (wherein z represents a boron or an aluminum; $R^1$ and $R^2$ represent a hydrocarbon group; X represents a bromine or a chlorine; and l+m+n is 4) is dissolved in tetrahydrofuran (THF), reversible dissolution and deposition of magnesium is possible.

Additionally, various reports have been made aiming at enhancing performance of the magnesium ion battery. For example, in PATENT LITERATURE 2, there has been reported that by using an electrolytic solution, where an aromatic Grignard's reagent represented by the general formula $C_6H_5MgX$ (wherein X=Cl, Br) is dissolved in tetrahydrofuran (THF), low oxidation potential of the Grignard's reagent (RMgX, wherein R is an alkyl group), which conventionally has been said, can be improved.

In addition, in PATENT LITERATURE 3 and PATENT LITERATURE 4, there has been reported that by using the Grignard's reagent (RMgX) or a magnesium chloride (II) and an organometal compound (an alkylaluminum compound) in combination, to form a complex by making magnesium dimerized in the system, acid resistance of an electrolytic solution can be improved.

Still more, in NON PATENT LITERATURE 2, there has been referred to on progress of reversible dissolution and deposition of magnesium, from the result of cyclic voltammogram and electrode surface analysis, by preparation of an electrolytic solution wherein a magnesium bromide (II) is dissolved in 2-methyltetrahydrofuran in order to enhance safety of the electrolytic solution.

CITATION LIST

Patent Literature

PATENT LITERATURE 1: JP-A-2003-512704
PATENT LITERATURE 2: JP-A-2004-259650
PATENT LITERATURE 3: JP-A-2007-188694
PATENT LITERATURE 4: JP-A-2007-188709

Non Patent Literature

NON PATENT LITERATURE 1: D. Aurbach et al., Nature, vol. 407, p. 724 to 727 (2000)
NON PATENT LITERATURE 2: Proceedings, No. 76th New Battery Concept Subcommittee (2011), p. 1 to 5.
NON PATENT LITERATURE 3: Future Material, vol. 62, p. 211 to 216 (2011)

SUMMARY OF INVENTION

Technical Problem

However, any of the electrolytic solutions described in the above literature has a low current value (or current density), which is observed accompanying with dissolution and deposition of magnesium, of ±1 mA or lower (or ±1 mA/cm$^2$ or lower), thus results in requiring long period of time in performing charge-discharge of a battery. That is, it cannot be said a battery with high practicality, due to difficulty of rapid charge-discharge. For example, in PATENT LITERATURE 4, a current value accompanying with dissolution of magnesium is 0.8 mA, and a current value accompanying with deposition of magnesium, is −0.6 mA, which cannot be said to be sufficiently high values.

In addition, an electrolytic solution being used in PATENT LITERATURE 1 and NON PATENT LITERATURE 1 starts decomposition when applied with a voltage of about 2.3 V, therefore it cannot be applied a charge-voltage of 2.3 V or higher. Still more, in PATENT LITERATURE 2, there has been described that oxidative decomposition potential of a phenylmagnesium bromide ($C_6H_5MgX$) is 3.8 V, however, practically, in PATENT LITERATURE 4, there has been referred to that it starts decomposition at further low potential (about 2.0 V).

Thus, such a problem is generated that high energy density, which the magnesium ion battery originally has, cannot be utilized sufficiently, because of limitation of charge-discharge voltage depending on decomposition potential of the electrolytic solution.

Another factor regarded as important, in the case of using as a practical battery, includes safety, for which the above electrolytic solution is insufficient. For example, magnesium aluminate (PATENT LITERATURE 1, NON PATENT LITERATURE 1) is a water prohibitive compound classified as the third class of hazardous materials, and the Grignard's reagent (PATENT LITERATURE 2) is an organometal compound having strong inflammability, which remains a problem on safety of the electrolytic solution.

In addition, PATENT LITERATURE 3 and PATENT LITERATURE 4 use a triethylaluminum and a diethylaluminum chloride, respectively, as raw materials, which are converted to a magnesium-aluminum complex within the system, however, since each of the raw materials is a spontaneous combustible substance, they cannot be said to have high safety.

Accordingly, in order to solve the above described problems, it is an object of the present invention to provide an electrochemical device having an electrolytic solution having high current density and high oxidation resistance, as well as high safety, where dissolution and deposition of magnesium progress repeatedly and stably.

Solution to Problem

The present invention relates to "an electrolytic solution for an electrochemical device comprising (1) a supporting electrolyte comprising a magnesium salt and (2) at least one or more kinds of the compounds represented by the following general formula [2]:

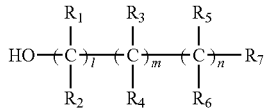
[2]

[wherein l, m and n each independently represent an integer of 0 to 2; $R_1$ and $R_2$ each independently represent a hydrogen atom, an alkyl group having 1 to 6 carbon numbers or a halogenoalkyl group having 1 to 6 carbon numbers; $R_3$, $R_4$, $R_5$ and $R_6$ each independently represent a hydrogen atom, a halogen atom, an alkyl group having 1 to 6 carbon numbers, a halogenoalkyl group having 1 to 6 carbon numbers or a hydroxyl group; $R_7$ represents an alkoxy group having 1 to 6 carbon numbers, an aralkyloxy group having 7 to 12 carbon numbers, an aryloxy group having 6 to 10 carbon numbers, an aryloxy group having 6 to 10 carbon numbers which has a halogen atom as substituent, an alkenyloxy group having 2 to 4 carbon numbers, a hydroxyalkenyl group having 2 to 4 carbon numbers, an alkylcarbonyl group having 2 to 7 carbon numbers, an alkylcarbonyloxy group having 2 to 7 carbon numbers, an alkenylcarbonyloxy group having 2 to 7 carbon numbers, an alkoxycarbonyl group having 2 to 7 carbon numbers, an alkylsulfonyl group having 1 to 4 carbon numbers, an alkylsilyloxy group having 1 to 6 carbon numbers, an alkylthio group having 1 to 4 carbon numbers, an arylcarbonyl group having 7 to 11 carbon numbers, an arylcarbonyloxy group having 7 to 11 carbon numbers, an aryloxycarbonyl group having 7 to 11 carbon numbers, a hydroxyalkyl group having 1 to 6 carbon numbers, an alkoxyalkyl group having 2 to 7 carbon numbers, an arylalkenyloxy group having 8 to 13 carbon numbers, an alkylsulfonyloxy group having 1 to 6 carbon numbers, a hydroxyaralkyloxy group having 7 to 12 carbon numbers, a hydroxyaryl group having 6 to 10 carbon numbers, a hydroxyaryloxy group having 6 to 10 carbon numbers, a hydroxyalkylcarbonyl group having 2 to 7 carbon numbers, an alkoxyarylalkyloxy group having 8 to 16 carbon numbers, an alkoxyaryl group having 7 to 13 carbon numbers, an alkoxyaryloxy group having 7 to 13 carbon numbers, an alkoxyalkenyl group having 3 to 7 carbon numbers, an alkoxyalkylcarbonyloxy group having 3 to 7 carbon numbers, an alkoxyalkenylcarbonyloxy group having 4 to 8 carbon numbers, an alkoxyalkyloxycarbonyl group having 3 to 7 carbon numbers, an alkoxyalkylcarbonyl group having 3 to 7 carbon numbers, a phosphono group represented by the following general formula [3]:

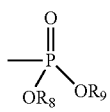
[3]

(wherein $R_8$ and $R_9$ each independently represent a hydrogen atom or an alkyl group having 1 to 4 carbon numbers), an amide group represented by the following general formula [4]:

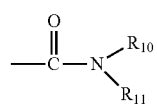
[4]

(wherein $R_{10}$ and $R_{11}$ each independently represent a hydrogen atom or an alkyl group having 1 to 4 carbon numbers),
a carbamide group represented by the following general formula [5]:

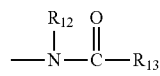
[5]

(wherein $R_{12}$ represents a hydrogen atom or an alkyl group having 1 to 4 carbon numbers, $R_{13}$ represents an alkyl group having 1 to 4 carbon numbers),
the group represented by the following general formula [6]:

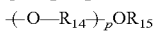
[6]

(wherein p represents an integer of 1 to 6, $R_{14}$ each independently represents an alkylene group or a halogenoalkylene group having 1 to 3 carbon numbers when p is 2 to 5, $R_{15}$ represents a hydrogen atom, an alkyl group having 1 to 6 carbon numbers, or a halogenoalkyl group having 1 to 6 carbon numbers), a hydroxyl group, a carboxyl group, a sulfo group, an amino group, an amino group having an alkyl group which has 1 to 6 carbon numbers as substituent, a cyano group, a thiol group, a monocyclic heterocyclic group, a group derived from cyclic acetal, a group derived from cyclic carbonate, or a group derived from cyclic carboxylate, or a cycloalkyl group having 5 to 6 carbon numbers, which has an alkyl group having 1 to 3 carbon numbers, an amino group or a hydroxyl group as substituent, an aryl group having 6 to 10 carbon numbers, a monocyclic heterocyclic group, a group derived from cyclic acetal, a group derived from cyclic carbonate or a group derived from cyclic carboxylate]".

Advantageous Effects of Invention

According to the present invention, a practical electrochemical device capable of attaining rapid charge-discharge can be provided, because dissolution and deposition of magnesium progress repeatedly and stably, and it has higher current density of at least over ±1 mA, as compared with a conventional electrolytic solution, as well as very small ion diffusion resistance. Still more, the present invention is capable of preparing a magnesium ion battery having high charging voltage, because the electrolytic solution has a high decomposition voltage of 4.2 V or higher. In addition, the present invention is capable of providing an electrolytic solution having high safety, because of using a simple magnesium salt as a supporting electrolyte, without using a water prohibitive compound or an organometal compound having inflammability. In addition, the present invention is capable of selecting various organic solvents as a solvent, by using the electrolytic solution using a complex.

BRIEF DESCRIPTION OF DRAWINGS

FIG. 58 represents a chart of total ion peak in the gas generated by heating the complex 5—mass spectrometry, obtained from Experimental Example 5.

FIG. 59 represents a chart of fragment ion peak of methyl 2-hydroxyisoburyrate extracted from the chart of total ion peak of FIG. 58, obtained from Experimental Example 5.

FIG. 60 represents a chart of total ion peak in the gas generated by heating the complex 6—mass spectrometry, obtained from Experimental Example 6.

DESCRIPTION OF EMBODIMENT

1. Supporting Electrolyte

Figure 1:
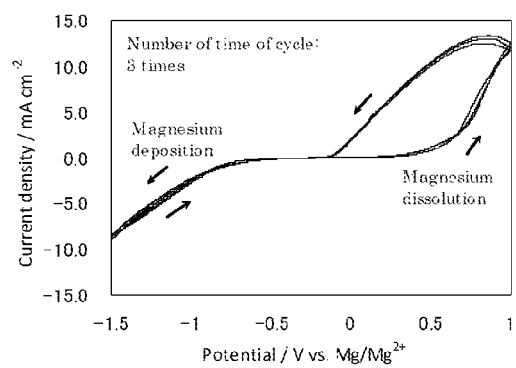
FIG. 1 represents a graph of measurement of the cyclic voltammetry (CV) using the electrolytic solution 1 ((Mg (OTf)$_2$)/2-methoxyethanol solution), obtained from Example 82.

The supporting electrolyte pertaining to the present invention would be the one comprising a magnesium salt, specifically, for example, includes the one comprising at least one kind of magnesium salt represented by the following general formula [1]

[1]

[wherein Mg represents a magnesium ion, q represents 1 or 2, when q is 1, X represents an oxide ion(O$^{2-}$), a sulfide ion (S$^{2-}$), a sulfate ion(SO$_4^{2-}$), a monohydrogen phosphate ion (HPO$_4^{2-}$) or a carbonate ion(CO$_3^{2-}$), which is divalent anion, and when q is 2, X represents a perfluoroalkane sulfonate ion having 1 to 4 carbon numbers, a bis(perfluoroalkanesulfonyl) imide ion represented by the following general formula [7]

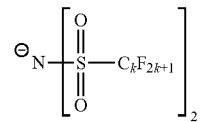
[7]

(wherein k represents an integer of 1 to 4, F represents a fluorine atom), a bis(fluorosulfonyl)imide ion, an alkane sulfonate ion having 1 to 4 carbon atoms, an arene sulfonate ion having 6 to 10 carbon atoms, a perfluoroalkane carboxylate ion having 2 to 5 carbon numbers, an alkane carboxylate ion having 2 to 5 carbon numbers, an arene carboxylate ion having 7 to 11 carbon numbers, an alkoxide ion having 1 to 4 carbon numbers, a permanganate ion, a perchlorate ion, a tetraphenylborate ion, a tetrafluoroborate ion, a hexafluorophosphate ion, a hexafluoroarsenate ion, a nitrate ion, a dihydrogen phosphate ion, a hydrogen sulfate ion, a hydrogen carbonate ion, a hydrogen sulfide ion, a hydroxide ion(OH$^-$), a thiocyanate ion, a cyanide ion(CN$^-$), a fluoride ion(F$^-$), a chloride ion(Cl$^-$), a bromide ion(Br$^-$), an iodide ion(I$^-$), or a hydride ion(H$^-$), which is a monovalent anion]. In the supporting electrolyte pertaining to the present invention, when Grignard reagent is included, Grignard reagent reacts vigorously with a hydroxyl group in the compound represented by the general formula [2], and both of Grignard reagent and the compound represented by the general formula [2] are decomposed, thus become not to function as the electrolytic solution. Moreover, since the performance of electrochemical device becomes decreased by the influence of degradation product (hydrocarbon, or the like), the one without Grignard reagent is preferable. As the supporting electrolyte pertaining to the present invention, the group composing of only the magnesium salt represented by the general formula [1] is particularly preferable.

In the general formula [1], q represents 1 or 2, and preferably 2.

X in the general formula [1] represents a divalent anion when q is 1, a monovalent anion when q is 2, and the monovalent anion is more preferable.

The perfluoroalkane sulfonate ion having 1 to 4 carbon numbers represented by X may be any of straight chained, branched or cyclic one, however, straight chained one is preferable. Specifically, it includes, for example, a trifluoromethane sulfonate ion, a pentafluoroethane sulfonate ion, a heptafluoropropane sulfonate ion, a nonafluorobutane sulfonate ion, or the like, and a trifluoromethane sulfonate ion is preferable.

k in the general formula [7] shown as X represents an integer of 1 to 4, preferably 1 or 2, more preferably 1.

Specific example of bis(perfluoroalkanesulfonyl)imide ion represented by the general formula [7] includes, for example, a bis(trifluoromethanesulfonyl)imide ion, a bis(pentafluoroethanesulfonyl)imide ion, a bis(heptafluoropropanesulfonyl)imide ion, a bis(nonafluorobutanesulfonyl)imide ion, or the like, and a bis(trifluoromethanesulfonyl)imide ion, or the like is preferable.

An alkane sulfonate ion having to 1 to 4 carbon numbers shown as X may be any of straight chained, branched or cyclic one, however, straight chained one is preferable. Specifically, it includes, for example, a methane sulfonate ion, an ethane sulfonate ion, an n-propane sulfonate ion, an isopropane sulfonate ion, a cyclopropane sulfonate ion, an n-butane sulfonate ion, or the like.

An arene sulfonate ion having 6 to 10 carbon numbers shown as X includes, for example, a benzene sulfonate ion, a naphthalene sulfonate ion, or the like.

A perfluoroalkane carboxylate ion having 2 to 5 carbon numbers shown as X, may be, for example, any of straight chained, branched or cyclic one, however, straight chained one is preferable. Specifically, it includes, for example, a trifluoroacetate ion, a pentafluoropropionate ion, a heptafluorobutyrate ion, nonafluoropentanoate ion, or the like.

An alkane carboxylate ion having 2 to 5 carbon numbers shown as X may be any of straight chained, branched or cyclic one, however, straight chained one is preferable. Specifically, it includes, for example, an acetate ion, a propionate ion, a butyrate ion, an isobutyrate ion, or the like.

An arene carboxylate ion having 7 to 11 carbon numbers shown as X includes, for example, a benzoate ion, a naphthalene carboxylate ion, or the like.

An alkoxide ion having 1 to 4 carbon numbers shown as X may be any of straight chained, branched or cyclic one, however, straight chained one is preferable. Specifically, it includes, for example, a methoxide ion, an ethoxide ion, an n-propoxide ion, an isopropoxide ion, an n-butoxide ion, an isobutoxide ion, a sec-butoxide ion, a tert-butoxide ion, a cyclopropoxide ion, cyclobutoxide ion, or the like.

Among the monovalent anion shown as X, a perfluoroalkane sulfonate ion having 1 to 4 carbon numbers, a bis(perfluoroalkanesulfonyl)imide ion represented by the general formula [7], a bis(fluorosulfonyl)imide ion, a perfluoroalkane carboxylate ion having 2 to 5 carbon numbers, an alkoxide ion having 1 to 4 carbon numbers, a tetraphenylborate ion, a tetrafluoroborate ion, a hexafluorophosphate ion, a perchlorate ion, a fluoride ion, a bromide ion, a chloride ion, an iodide ion are preferable. Among them, a perfluoroalkane sulfonate ion having 1 to 4 carbon numbers, a bis(perfluoroalkanesulfonyl)imide ion represented by the general formula [7], a tetrafluoroborate ion, a bromide ion, a chloride ion, an iodide ion are particularly preferable, and an perfluoroalkane sulfonate ion having 1 to 4 carbon numbers, a bromide ion, a chloride ion, an iodide ion are more particularly preferable.

Preferable specific example of magnesium salt represented by the general formula [1] includes, for example, a magnesium trifuluoromethane sulfonate, a magnesium nonafluorobutane sulfonate, a magnesium bis(trifluoromethanesulfonyl)imide, magnesium bis(nonafluoromethanesulfonyl)imide, a magnesium bis(fluorosulfonyl)imide, a magnesium trifluoroacetate, a magnesium pentafluoropropionate, a magnesium ethoxide, magnesium tetraphenyl borate, a magnesium tetrafluoroborate, a magnesium hexafluorophosphate, a magnesium perchlorate, a a magnesium fluoride, a magnesium bromide, a magnesium chloride, a magnesium iodide, or the like. Among them, a magnesium trifuluoromethane sulfonate, a magnesium bis(trifluoromethanesulfonyl)imide, a magnesium tetrafluoroborate, a magnesium bromide, a magnesium chloride, magnesium iodide are particularly preferable.

2. compound 1 of the general formula [2] represents an integer of 0 to 2, and 0 or 1 is preferable, 1 is more preferable.

m of the general formula [2] represents an integer of 0 to 2, and 0 or 1 is preferable.

n of the general formula [2] represents an integer of 0 to 2, and 0 or 1 is preferable, 0 is more preferable.

An alkyl group having 1 to 6 carbon numbers in $R_1$ to $R_6$ may be any of straight chained, branched or cyclic one, however, straight chained one is preferable, and the one having 1 to 3 is preferable. Specifically, for example, it includes a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a neohexyl group, a cyclopropyl group, a cyclobutyl group, a cyclopentyl group, a cyclohexyl group or the like, and a methyl group is preferable.

A halogenoalkyl group having 1 to 6 carbon numbers in $R_1$ to $R_6$ includes the one in which a hydrogen atom of the above alkyl group having 1 to 6 carbon numbers in $R_1$ to $R_6$ is substituted with a halogen atom, and may be any of straight chained, branched or cyclic one, however, straight chained one is preferable, and the one having 1 to 3 carbon numbers is preferable. It should be noted that, a hydrogen atom to be substituted with a halogen atom may be a part or all of hydrogen atom in an alkyl group, the one in which all of hydrogen atoms are substituted with a halogen atoms is preferable. The above halogen atom includes a fluorine atom, a chlorine atom, a bromine atom, an iodine atom, or the like, and a fluorine atom is preferable. Specifically, it includes a monofluoromethyl group, a difluoromethyl group, a trifluoromethyl group, a perfluoroethyl group, a perfluoropropyl group, a perfluorobutyl group, a perfluoropentyl group, a perfluorohexyl group, a monochloromethyl group, a dichloromethyl group, a trichloromethyl group, a perchloroethyl group, a perchloropropyl group, a perchlorobutyl group, a perchloropentyl group, a perchlorohexyl group, a monobromomethyl group, a dibromomethyl group, a tribromomethyl group, a perbromoethyl group, a perbromopropyl group, a perbromobutyl group, a perbromopentyl group, a perbromohexyl group, a monoiodomethyl group, a diiodomethyl group, a triiodomethyl group, a periodoethyl group, a periodopropyl group, a periodobutyl group, a periodopentyl group, a periodohexyl group, or the like, and a trifluoromethyl group, a perfluoroethyl group, a perfluoropropyl group are preferable.

$R_1$ or $R_2$ in the general formula [2] preferably represents a trifluoromethyl group, a perfluoroethyl group, a perfluoropropyl group, a methyl group or a hydrogen atom, more preferably a hydrogen atom or a methyl group, particularly preferably a hydrogen atom.

A halogen atom in $R_3$ to $R_6$ of the general formula [2] represents a fluorine atom, a chlorine atom, a bromine atom, an iodine atom or the like, preferably a fluorine atom is preferable.

$R_3$ to $R_6$ of the general formula [2] preferably represents a trifluoromethyl group, a perfluoroethyl group, a perfluoropropyl group, a methyl group, a fluorine atom, or a hydrogen atom, more preferably a methyl group or a hydrogen atom, particularly preferably a hydrogen atom.

An alkoxy group having 1 to 6 carbon numbers in $R_7$ may be any of straight chained, branched or cyclic one, however, straight chained one is preferable, and the one having 1 to 3 carbon numbers is preferable. Specifically, it includes, for example, a methoxy group, an ethoxy group, an n-propoxy group, an isopropoxy group, an n-butoxy group, an isobutoxy group, a sec-butoxy group, a tert-butoxy group, an n-pentyloxy group, an isopentyloxy group, a sec-pentyloxy group, a tert-pentyloxy group, a neopentyloxy group, an n-hexyloxy group, an isohexyloxy group, a sec-hexyloxy group, a tert-hexyloxy group, a neohexyloxy group, a cyclopropoxy group, a cyclopentyloxy group, a cyclohexyloxy group, or the like. Among them, a methoxy group, an ethoxy group, an n-propoxy group, an isopropoxy group, an n-butoxy group, a tert-butoxy group, or the like are preferable, and a methoxy group and an ethoxy group are more preferable.

An aralkyloxy group having 7 to 12 carbon numbers in $R_7$ includes, for example, a benzyloxy group, a phenethyloxy group, a phenyl-n-propoxy group, a naphthylmethoxy group, a naphthylethoxy group, or the like.

An aryloxy group having 6 to 10 carbon numbers in $R_7$ includes, for example, a phenyloxy group, a naphthyloxy group, or the like.

An aryloxy group having 6 to 10 carbon numbers which has a halogen atom as substituent in $R_7$ includes the one in which hydrogen atoms of the above aryloxy group having 6 to 10 of carbon numbers are substituted, it may be any of the one in which a part of hydrogen atoms were substituted in an aryl group or the one in which all of hydrogen atoms were substituted, however, the one in which all of hydrogen atoms were substituted is preferable. Said halogen atom includes a fluorine atom, a chlorine atom, a bromine atom, an iodine atom or the like, and a fluorine atom is preferable. An aryloxy group having 6 to 10 carbon numbers which has a halogen atom as substituent specifically includes, for example, a monofluorophenyloxy group, a difluorophenyloxy group, a trifluorophenyloxy group, a tetrafluorophenyloxy group, a pentafluorophenyloxy group, a heptafluoronaphthyloxy group, a pentabromophenyloxy group, a heptabromonaphthyloxy group, a pentachlorophenyloxy group, a heptachloronaphthyloxy group, or the like, and a pentafluorophenyloxy group is preferable.

An alkenyloxy group having 2 to 4 carbon numbers in $R_7$ includes, for example, a vinyloxy group, a 1-propenyloxy group, an allyloxy group, a 2-methylallyloxy, a 3-methylallyloxy group, or the like.

A hydroxyalkenyl group having 2 to 4 carbon numbers in $R_7$ includes, for example, a hydroxyvinyl group, a 3-hydroxy-1-propenyl group, a 3-hydroxy-2-propenyl group, a 4-hydroxy-1-butenyl group, a 4-hydroxy-2-butenyl group, or the like, and a 3-hydroxy-1-propenyl group is preferable.

An alkylcarbonyl group having 2 to 7 carbon numbers in $R_7$ may be any of straight chained, branched or cyclic one, and the straight chained one is preferable, however, the one having 2 to 5 carbon numbers is preferable. Specifically, it includes, for example, a methylcarbonyl group, an ethylcarbonyl group, an n-propylcarbonyl group, an isopropylcarbonyl group, an n-butylcarbonyl group, an isobutylcarbonyl group, a sec-butylcarbonyl group, a tert-butylcarbonyl group, an n-pentylcarbonyl group, an isopentylcarbonyl group, a sec-pentylcarbonyl group, a tert-pentylcarbonyl group, a neopentylcarbonyl group, an n-hexylcarbonyl group, an isohexylcarbonyl group, a sec-hexylcarbonyl group, a tert-hexylcarbonyl group, a neohexylcarbonyl group, a cyclopropylcarbonyl group, a cyclobutylcarbonyl group, a cyclopentylcarbonyl group, a cyclohexylcarbonyl, group, or the like. Among them, a methylcarbonyl group, an ethylcarbonyl group and an n-propylcarbonyl group are preferable, and a methylcarbonyl group is more preferable.

An alkylcarbonyloxy group having 2 to 7 carbon numbers in $R_7$ may be any of straight chained, branched or cyclic one, however, straight chained one is preferable, and the one having 2 to 5 carbon numbers is preferable. Specifically, it includes, for example, a methylcarbonyloxy group, an ethylcarbonyloxy group, an n-propylcarbonyloxy group, an isopropylcarbonyloxy group, an n-butylcarbonyloxy group, an isobutylcarbonyloxy group, a sec-butylcarbonyloxy group, a tert-butylcarbonyloxy group, an n-pentylcarbonyloxy group, an isopentylcarbonyloxy group, a sec-pentylcarbonyloxy group, a tert-pentylcarbonyloxy group, a neopentylcarbonyloxy group, an n-hexylcarbonyloxy group, an isohexylcarbonyloxy group, a sec-hexylcarbonyloxy group, a tert-hexylcarbonyloxy group, a neohexylcarbonyloxy group, a cyclopropylcarbonyloxy group, a cyclobutylcarbonyloxy group, a cyclopentylcarbonyloxy group, a cyclohexylcarbonyloxy group, or the like. Among them, a methylcarbonyloxy group, an ethylcarbonyloxy group and an n-propylcarbonyloxy group are preferable, and a methylcarbonyloxy group is more preferable.

An alkenylcarbonyloxy group having 2 to 7 in $R_7$ includes, for example, a vinylcarbonyloxy group, a 1-propenylcarbonyloxy group, a 2-methylpropenylcarbonyloxy group, or the like.

An alkoxycarbonyl group having 2 to 7 carbon numbers in $R_7$ may be any of straight chained, branched or cyclic one, however, straight chained one is preferable, and the one having 2 to 5 carbon numbers is preferable. Specifically, it includes, for example, a methoxycarbonyl group, an ethoxycarbonyl group, an n-propoxycarbonyl group, isopropoxycarbonyl group, an n-butoxycarbonyl group, isobutoxycarbonyl group, a sec-butoxycarbonyl group, a tert-butoxycarbonyl group, an n-pentyloxycarbonyl group, an isopentyloxycarbonyl group, a sec-pentyloxycarbonyl group, a tert-pentyloxycarbonyl group, a neopentyloxycarbonyl group, an n-hexyloxycarbonyl group, an isohexyloxycarbonyl group, a sec-hexyloxycarbonyl group, a tert-hexyloxycarbonyl group, a neohexyloxycarbonyl group, a cyclopropoxycarbonyl group, a cyclopentyloxycarbonyl group, a cyclohexyloxycarbonyl group, or the like. Among them, a methoxycarbonyl group, an ethoxycarbonyl group and an n-propoxycarbonyl group are preferable, and a methoxycarbonyl group is more preferable.

An alkylsulfonyl group having 1 to 4 carbon numbers in $R_7$ may be any of straight chained, branched or cyclic one, and straight chained one is preferable. Specifically, it includes for example, a methylsulfonyl group, an ethylsulfonyl group, an n-propylsulfonyl group, an n-butylsulfonyl group, an isobutylsulfonyl group, a sec-butylsulfonyl group, a tert-butylsulfonyl group, a cyclopropylsulfonyl group, or the like.

An alkylsilyloxy group having 1 to 6 carbon numbers in $R_7$ may be any of straight chained, branched or cyclic one, however, straight chained one is preferable, and the one having 1 to 4 carbon numbers is preferable. Specifically, it includes for example, a trimethylsilyloxy group, a triethylsilyloxy group, a triisopropylsilyloxy group, a tert-butyldimethylsilyloxy group, or the like.

An alkylthio group having 1 to 4 carbon numbers in $R_7$ includes a methylthio group, an ethylthio group, a propylthio group, an isopropylthio group, an n-butylthio group, an isobutylthio group, a sec-butylthio group, a tert-butylthio group, or the like.

An arylcarbonyl group having 7 to 11 carbon numbers in $R_7$ includes, for example, a phenylcarbonyl group, a naphthylcarbonyl group, or the like.

An arylcarbonyloxy group having 7 to 11 carbon numbers in $R_7$ includes, for example, a phenylcarbonyloxy group, a naphthylcarbonyloxy group, or the like.

An aryloxycarbonyl group having 7 to 11 carbon numbers in $R_7$ includes, for example, a phenyloxycarbonyl group, a naphthyloxycarbonyl group, or the like.

A hydroxyalkyl group having 1 to 6 carbon numbers in $R_7$ specifically includes, for example, a hydroxymethyl group, a hydroxyethyl group, a hydroxypropyl group, a hydroxybutyl group, a hydroxypentyl group, a hydroxyhexyl group, or the like.

An alkoxyalkyl group having 2 to 7 carbon numbers in $R_7$ specifically includes, for example, a methoxymethyl group, a methoxyethyl group, a methoxy-n-propyl group, a methoxyisopropyl group, an ethoxymethyl group, an ethoxyethyl group, an ethoxy-n-propyl group, an ethoxyisopropyl group, an n-propoxymethyl group, an n-propoxyethyl group, an n-propoxy-n-propyl group, an n-propoxyisopropyl group, an isopropoxymethyl group, an isopropoxyethyl group, an isopropoxy-n-propyl group, an isopropoxyisopropyl group, an n-butoxymethyl group, an n-butoxyethyl group, an n-butoxy-n-propyl group, an n-butoxyisopropyl group, or the like.

An arylalkenyloxy group having 8 to 13 carbon numbers in $R_7$ includes, for example, a cinnamyloxy group, a β-styrenyloxy group, or the like.

An alkylsulfonyloxy group having 1 to 6 carbon numbers in $R_7$ may be any of straight chained, branched or cyclic one, and straight chained one is preferable and the one having 2 to 4 carbon numbers is preferable. Specifically, it includes, for example, a methylsulfonyloxy group, an ethylsulfonyloxy group, an n-propylsulfonyloxy group, a tert-butylsulfonyloxy group, an n-butylsulfonyloxy group, an isobutylsulfonyloxy group, an n-pentylsulfonyloxy group, a cyclopropylsulfonyloxy group, a cyclohexylsulfonyloxy group, or the like.

A hydroxyaralkyloxy group having 7 to 12 carbon numbers in $R_7$ includes, for example, a hydroxybenzyloxy group, a hydroxyphenethyl group, a hydroxyphenyl-n-propyloxy group, a hydroxynaphthylmethyloxy group, a hydroxynaphthylethyloxy group, or the like.

A hydroxyaryl group having 6 to 10 carbon numbers in $R_7$ includes, for example, a hydroxyphenyl group, a hydroxynaphthyl group, or the like.

A hydroxyaryloxy group having 6 to 10 carbon numbers in $R_7$ includes, for example, a hydroxyphenyloxy group, a hydroxynaphthyloxy group, or the like.

A hydroxyalkylcarbonyl group having 2 to 7 carbon numbers in $R_7$ may be any of straight chained, branched or cyclic one, however, straight chained one is preferable, and the one having 2 to 5 carbon numbers is preferable. Specifically, it includes, for example, a hydroxymethylcarbonyl group, a hydroxyethylcarbonyl group, a hydroxy-n-propylcarbonyl group, a hydroxyisopropylcarbonyl group, a hydroxy-n-butylcarbonyl group, a hydroxyisobutylcarbonyl group, a hydroxy-sec-butylcarbonyl group, a hydroxy-tert-butylcarbonylgroup, a hydroxy-n-pentylcarbonyl group, a hydroxyisopentylcarbonyl group, a hydroxy-sec-pentylcarbonyl group, a hydroxy-tert-pentylcarbonyl group, a hydroxyneopentylcarbonyl group, a hydroxy-n-hexylcarbonyl group, a hydroxyisohexylcarbonyl group, a hydroxy-sec-hexylcarbonyl group, a hydroxy-tert-hexylcarbonyl group, a hydroxyneohexylcarbonyl group, a hydroxycyclopropylcarbonyl group, a hydroxycyclobutylcarbonyl group, a hydroxycyclopentylcarbonyl group, a hydroxycyclohexylcarbonyl group, or the like.

An alkoxyarylalkyloxy group having 8 to 16 carbon numbers in $R_7$ includes, for example, a methoxyphenylmethyloxy group, a dimethoxyphenylmethyloxy group, an ethoxyphenylmethyloxy group, an n-propoxyphenylmethyloxy group, a methoxyphenylethyloxy group, a dimethoxyphenylethyloxy group, an ethoxyphenylethyloxy group, an n-propoxyphenylethyloxy group, a methoxynaphthylmethyloxy group, a methoxynaphthylethyloxy group, a methoxynaphthylpropyloxy group, an ethoxynaphthylmethyloxy group, an ethoxynaphthylethyloxy group, an ethoxynaphthylpropyloxy group, or the like.

An alkoxyaryl group having 7 to 13 in $R_7$ includes, for example, a methoxyphenyl group, a dimethoxyphenyl group, an ethoxyphenyl group, an n-propoxyphenyl group, a methoxynaphthyl group, an ethoxynaphthyl group, an n-propoxynaphthyl group, or the like.

An alkoxyaryloxy group having 7 to 13 in $R_7$ includes, for example, a methoxyphenyloxy group, a dimethoxyphenyloxy group, an ethoxyphenyloxy group, an n-propoxyphenyloxy group, a methoxynaphthyloxy group, an ethoxynaphthyloxy group, an n-propoxynaphthyloxy group, or the like.

An alkoxyalkenyl group having 3 to 7 carbon numbers in $R_7$ includes, for example, a methoxyvinyl group, an ethoxyvinyl group, a propoxyvinyl group, a methoxy-1-propenyl group, an ethoxy-1-propenyl group, a propoxy-1-propenyl group, or the like.

An alkoxyalkylcarbonyloxy group having 3 to 7 carbon numbers in $R_7$ may be any of straight chained, branched or cyclic one, however, straight chained one is preferable, and the one having 3 to 6 carbon numbers is preferable. Specifically, it includes, for example, a methoxymethylcarbonyloxy group, a methoxyethylcarbonyloxy group, a methoxy-n-propylcarbonyloxy group, a methoxyisopropylcarbonyloxy group, an ethoxymethylcarbonyloxy group, an ethoxyethylcarbonyloxy group, an ethoxy-n-propylcarbonyloxy group, an ethoxyisopropylcarbonyloxy group, an n-propoxymethylcarbonyloxy group, an n-propoxyethylcarbonyloxy group, an n-propoxy-n-propylcarbonyloxy group, an n-propoxyisopropylcarbonyloxy group, an isopropoxymethylcarbonyloxy group, an isopropoxyethylcarbonyloxy group, an isopropoxy-n-propylcarbonyloxy group, an isopropoxyisopropylcarbonyloxy group, an n-butoxymethylcarbonyloxy group, an n-butoxyethylcarbonyloxy group, an n-butoxy-n-propylcarbonyloxy group, an n-butoxyisopropylcarbonyloxy group, or the like.

An alkoxyalkenylcarbonyloxy group having 4 to 8 carbon numbers in $R_7$ includes, for example, a methoxyvinylcarbonyloxy group, an ethoxyvinylcarbonyloxy group, a propoxyvinylcarbonyloxy group, a methoxy-1-propenylcarbonyloxy group, an ethoxy-1-propenylcarbonyloxy group, a propoxy-1-propenylcarbonyloxy group, or the like.

An alkoxyalkyloxycarbonyl group having 3 to 7 carbon numbers in $R_7$ may be any of straight chained, branched or cyclic one, however, straight chained one is preferable, and the one having 3 to 6 carbon numbers is preferable. Specifically, it includes, for example, a methoxyethyloxycarbonyl group, a methoxy-n-propyloxycarbonyl group, a methoxyisopropyloxycarbonyl group, an ethoxyethyloxycarbonyl group, an ethoxy-n-propyloxycarbonyl group, an ethoxyisopropyloxycarbonyl group, an n-propoxyethyloxycarbonyl group, an n-propoxy-n-propyloxycarbonyl group, an n-propoxyisopropyloxycarbonyl group, an isopropoxyethyloxycarbonyl group, an isopropoxy-n-propyloxycarbonyl group, an isopropoxyisopropyloxycarbonyl group, an n-butoxyethyloxycarbonyl group, an n-butoxy-n-propyloxycarbonyl group, an n-butoxyisopropyloxycarbonyl group, or the like.

An alkoxyalkylcarbonyl group having 3 to 7 carbon numbers in $R_7$ may be any of straight chained, branched or cyclic one, however, straight chained one is preferable, and the one having 3 to 6 carbon numbers is preferable. Specifically, it includes, for example, a methoxymethylcarbonyl group, a methoxyethylcarbonyl group, a methoxy-n-propylcarbonyl group, a methoxyisopropylcarbonyl group, an ethoxymethylcarbonyl group, an ethoxyethylcarbonyl group, an ethoxy-n-propylcarbonyl group, an ethoxyisopropylcarbonyl group, an n-propoxymethylcarbonyl group, an n-propoxyethylcarbonyl group, an n-propoxy-n-propylcarbonyl group, an n-propoxyisopropylcarbonyl group, isopropoxymethylcarbonyl group, an isopropoxyethylcarbonyl group, an isopropoxy-n-propylcarbonyl group, an isopropoxyisopropylcarbonyl group, an n-butoxymethylcarbonyl group, an n-butoxyethylcarbonyl group, an n-butoxy-n-propylcarbonyl group, an n-butoxyisopropylcarbonyl group, or the like.

An alkyl group having 1 to 4 carbon numbers in $R_8$ and $R_9$ of the general formula [3] in $R_7$ includes a methyl group, an ethyl group, an n-propyl group, an isopropyl group, an n-butyl group, an isobutyl group or the like, and a methyl group is preferable.

Preferable specific example of a phosphono group represented by the general formula [3] in $R_7$ includes, for example, a phosphono group, a dimethylphosphono group, a diethylphosphono group, or the like, and a dimethylphosphono group is preferable.

An alkyl group having 1 to 4 carbon numbers in $R_{10}$ and $R_{11}$ of the general formula [3] in $R_7$ includes the same one as the alkyl group having 1 to 4 carbon numbers in the above $R_5$ and $R_6$.

Preferable specific example of an amide group represented by the general formula [4] in $R_7$ includes, for example, an amide group, an n-methylamide group, a N,N-dimethylamide group, or the like.

An alkyl group having 1 to 4 carbon numbers in $R_{12}$ and $R_{13}$ of the general formula [5] in $R_7$ includes the same one as the alkyl group having 1 to 4 carbon numbers in the above $R_5$ and $R_6$.

Preferable specific example of a carbamide group represented by the general formula [5] in $R_7$ includes, for example, an acetamide group, an n-methylacetamide group, or the like.

p of the general formula [6] in $R_7$ represents an integer of 1 to 6, preferably 1 to 3, more preferably 1.

An alkylene group having 1 to 3 carbon numbers in $R_{14}$ of the general formula [6] in $R_7$ includes a methylene group, an ethylene group, an n-propylene group, or the like, among them, a methylene group, an ethylene group are preferable, and an ethylene group is more preferable.

A halogenoalkylene group having 1 to 3 carbon numbers in $R_{14}$ of the general formula [6] in $R_7$ includes the one in which a part or all of hydrogen atoms of the above alkylene group are substituted with halogen atoms. Said halogen atom represents a fluorine atom, a chlorine atom, a bromine atom, an iodine atom or the like, and a fluorine atom is preferable. Said halogenoalkylene group having 1 to 3 carbon numbers specifically includes a monofluoromethylene group, a difluoromethylene group, a trifluoromethylenea group, a monofluoroethylene group, a difluoroethylene group, a trifluoroethylene group, a perfluoroethylene group, a perfluoropropylene group, a dichloromethylene group, a trichloromethylene group, a perchloroethylene group, a perchloropropylene group, a monobromomethylene group, a dibromomethylene group, a tribromomethylene group, a perbromoethylene group, a perbromopropylene group, a monoiodomethylene group, a diiodomethylene group, a triiodomethylene group, a periodoethylene group, a periodopropylene group, or the like, and a monofluoroethylene group, a difluoroethylene group, a trifluoroethylene group, a perfluoroethylene group are preferable.

An alkyl group and a halogenoalkyl group having 1 to 6 carbon numbers in $R_{15}$ of the general formula [6] in $R_7$ includes the same alkyl group and a halogenoalkyl group having 1 to 6 carbon numbers as in $R_3$, $R_4$, $R_5$, and $R_6$, and the preferable group is also the same one.

An amino group which has an alkyl group having 1 to 6 carbon atoms as substituent in $R_7$ includes methylamine, dimethylamine, ethylamine, diethylamine, methylethylamine, n-propylamine, isopropylamine, n-butylamine, pentylamine, hexylamine, or the like, among them, methylamine, dimethylamine are preferable.

A monocyclic heterocyclic group in $R_7$ preferably includes 5 membered ring or 6-membered ring, specifically, it includes the group derived from the saturated hetero ring such as pyrrolidine, imidazolidine, pyrazolidine, piperazine, piperidine, morpholine, tetrahydrofuran, tetrahydropyran, tetrahydrothiophene, tetrahydrothiopyran, sulfolan, pentamethylenesulfone, dioxane, for example, the group derived from the unsaturated hetero ring such as pyridine, pyrrole, pyrroline, imidazole, imidazoline, pyrazole, pyrazoline, pyrimidine, pyrazine, triazole, oxazole, thiazole, isothiazole, furan, pyran, thiophene, or the like. Among them, pyrrolidine, dioxane, pyridine, imidazole, furan, thiophene, or the like are more preferable.

The group derived from the cyclic acetal in $R_7$ includes, for example, the one having 3 to 6 carbon numbers, specifically, for example, included a dioxolanyl group, a dioxanyl group, and a dioxolanyl group is preferable.

The group derived from the cyclic carbonate ester includes the group derived from vinylene carbonate, the group derived from ethylene carbonate (1,3-dioxolane-2-one), the group derived from propylene carbonate, or the like. The group derived from ethylene carbonate is preferable.

The group derived from cyclic carboxylate ester in $R_7$ includes, for example, the group derived from lactone compound having 3 to 9 carbon numbers, specifically, it includes, for example, the group derived from γ-butyrolactone, γ-valerolactone, γ-caprolactone, ε-caprolactone.

An alkyl group having 1 to 3 carbon numbers, which is a substituent of a cycloalkyl group having 5 to 6 carbon numbers, an aryl group having 6 to 10 carbon bumbers, a monocyclic heterocyclic group, a group derived from cyclic acetal or a group derived from cyclic carboxylate ester, in $R_7$ includes, for example, a methyl group, an ethyl group, an isopropyl group, an n-propyl group or the like, among them, a methyl group is preferable.

A cycloalkyl group having 5 to 6 carbon numbers, which has an alkyl group having 1 to 3 carbon numbers, an amino group or a hydroxyl group as substituent, in $R_7$ includes a cyclopentyl group or a cyclohexyl group, which has 1 to 6 substituents such as an alkyl group having 1 to 3 carbon numbers, an amino group or a hydroxyl group, and a hydroxyl group is preferable as substituent, and the one having 1 to 2 substituents is preferable. Specifically, it includes a monohydroxycyclohexyl group, a dihydroxycyclohexyl group, a monohydroxycyclopentyl group, a dihydroxycyclopentyl group, a monoaminocyclohexyl group, a diaminocyclohexyl group, a monoaminocyclopentyl group, a diaminocyclopentyl group, a methylcyclohexyl group, a dimethylcyclohexyl group, a methylcyclopentyl group, a dimethylcyclopentyl group or the like.

An aryl group having 6 to 10 carbon numbers, which has an alkyl group having 1 to 3 carbon numbers, an amino group or a hydroxyl group as substituent, in $R_7$ includes, for example, an aminophenyl group, a monohydroxyphenyl group, a dihydroxyphenyl group, a methylphenyl group, a dimethylphenyl group, or the like, among them, an aminophenyl group, a monohydroxyphenyl group are preferable.

A monocyclic heterocyclic group, which has an alkyl group having 1 to 3 carbon numbers, an amino group or a hydroxyl group as substituent, in $R_7$ includes the one in which 1 to 4 hydrogen atoms, preferably 1 to 2 hydrogen atoms, more preferably 1 hydrogen atom of the above monocyclic heterocyclic group are substituted. As substituent, a hydroxyl group is preferable.

The group derived from cyclic acetal, which has an alkyl group having 1 to 3 carbon numbers, an amino group or a hydroxyl group as substituent, in $R_7$ includes the group derived from the above cyclic acetal in which 1 to 2 hydrogen atoms, preferably 1 hydrogen atom is substituted.

The group derived from cyclic carbonate ester, which has an alkyl group having 1 to 3 carbon numbers, an amino group or a hydroxyl group as substituent, in $R_7$ includes the group derived from the above cyclic carbonate ester in which 1 to 2 hydrogen atoms, preferably 1 hydrogen atom is substituted.

The group derived from cyclic carboxylate ester, which has an alkyl group having 1 to 3 carbon numbers, an amino group or a hydroxyl group as substituent, in $R_7$ includes the group derived from the above cyclic carboxylate ester in which 1 to 4 hydrogen atoms, preferably 1 to 2 hydrogen atoms is substituted. As substituent, an alkyl group having 1 to 3 carbon numbers is preferable, specifically, a methyl group is preferable.

Among the specific example of the above-described $R_7$, an alkoxy group having 1 to 6 carbon numbers; an aralkyloxy group having 7 to 12 carbon numbers; an aryloxy group having 6 to 10 carbon numbers; an aryloxy group having 6 to 10 carbon numbers which has a halogen atom as substituent; an alkenyloxy group having 2 to 4 carbon numbers; a hydroxyalkenyl group having 2 to 4 carbon numbers; an alkylcarbonyl group having 2 to 7 carbon numbers; an alkylcarbonyloxy group having 2 to 7 carbon numbers; an alkenylcarbonyloxy group having 2 to 7 carbon numbers; an alkoxycarbonyl group having 2 to 7 carbon numbers; an alkylsulfonyl group having 1 to 4 carbon numbers; an alkylsilyloxy group having 1 to 6 carbon numbers; an alkylthio group having 1 to 4 carbon numbers; the group represented by the general formula [3]; the group represented by the general formula [4]; the group represented by the general formula [5]; the group represented by the general formula [6]; a hydroxyl group; carboxyl group; an amino group; an amino group which has an alkyl group having 1 to 6 carbon numbers as substituent; cyano group; a monocyclic heterocyclic group; a group derived from cyclic acetal; a cycloalkyl group which has an alkyl group, an amino group or a hydroxyl group as substituent; an aryl group having a hydroxyl group as substituent; or a monocyclic heterocyclic group having a hydroxyl group as substituent are preferable, and an alkoxy group having 1 to 6 carbon numbers; an alkylcarbonyloxy group having 2 to 7 carbon numbers; an alkenyloxy group having 2 to 4 carbon numbers; a hydroxyalkenyl group having 2 to 4 carbon numbers; an alkylcarbonyl group having 2 to 7 carbon numbers; an alkoxycarbonyl group having 2 to 7 carbon numbers; the group represented by the general formula [3]; the group represented by the general formula [6]; a hydroxyl group or cyano group is more preferable, and an alkoxy group having 1 to 6 carbon numbers; an alkylcarbonyloxy group having 2 to 7 carbon numbers; an alkylcarbonyl group having 2 to 7 carbon numbers; an alkoxycarbonyl group having 2 to 7 carbon numbers; or a hydroxyl group is particularly preferable.

Preferable specific example of the compound represented by the general formula [2] includes, for example, the compound represented by the following general formula [2-1]:

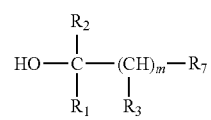

[2-1]

(wherein m, $R_1$, $R_2$, $R_3$ and $R_7$ are the same one as the above).

The preferable ones of m, $R_1$, $R_2$, $R_3$ and $R_7$ in the general formula [2-1] are the same one as in the above general formula [2].

Preferable specific example of the general formula [2-1] includes, for example, hydroxyacetone, 4-hydroxy-2-butanone, 4-hydroxy-3-butanone, 5-hydroxy-2-pentanone, 5-hydroxy-3-pentanone, 5-hydroxy-4-pentanone, 2-methoxyethanol, 2-ethoxyethanol, 2-n-propoxyethanol, 2-isopropoxyethanol, ethylene glycol, propylene glycol, methyl glycolate, ethyl glycolate, 2-(2-methoxyethoxy)ethanol, 1-methoxy-2-propanol, acetic acid 3-hydroxypropyl ester, acetic acid 2-hydroxyethyl ester, 2-hydroxypropyl acetate, methyl 2-hydroxyisobutyrate, 3-hydroxypropionitrile, cis-2-butene-1,4-diol, 1-methoxy-2-propanol, methyl lactate, 2-(aryloxy)ethanol or the like, among them, hydroxyacetone, 4-hydroxy-2-butanone, 4-hydroxy-3-butanone, 5-hydroxy-2-pentanone, 5-hydroxy-3-pentanone, 5-hydroxy-4-pentanone, 2-methoxyethanol, 2-ethoxyethanol, 2-n-propoxyethanol, 2-isopropoxyethanol, ethylene glycol, propylene glycol, methyl glycolate, ethyl glycolate are preferable.

3. Organic Solvent Pertaining to the Present Invention

In the electrolytic solution of the present invention, further, organic solvent may be added, other than the compound represented by the above general formula [2]. Said organic solvent is preferably used when viscosity of the compound represented by the general formula [2] is high, or the like. When the organic solvent pertaining to the present invention is added, it is possible to exhibit higher current density, thus the one including organic solvent is preferable.

Said organic solvent includes, for example, the one composed of one or more kinds of solvents selected from ether type solvent, alcohol type solvent, carbonate type solvent, ester type solvent, nitrile type solvent, sulfone type solvent, halogen type solvent, hydrocarbon type solvent, ionic liquid (ordinary temperature molten salt). Said ether type solvent, includes, for example, diethyl ether, tetrahydrofuran, 2-methyltetrahydrofuran, diisopropyl ether, 1,2-dimethoxyethane, diethylene glycol dimethyl ether, triethylene glycol dimethyl ether, or the like; alcohol type solvent includes, for example, methanol, ethanol, 1-propanol, 2-propanol, 1-butanol, 2-butanol, 1-pentanol, cyclopentanol, 1-hexanol, cyclohexanol, or the like; carbonate type solvent includes, for example, dimethyl carbonate, diethyl carbonate, ethyl methyl carbonate, propylene carbonate, or the like; ester type solvent includes, for example, methyl formate, ethyl formate, butyl format, methyl acetate, ethyl acetate, butyl acetate, methyl propionate, ethyl propionate, butyl propionate, butyrolactone, or the like; nitrile type solvent includes, for example, acetonitrile, propionitrile, butyronitrile, succinonitrile, pimelonitrile, or the like; sulfone type solvent includes, for example, dimethylsulfone, diethylsulfone, sulfolane, dipropylsulfone, or the like; halogen type solvent includes, for example, dichloromethane, chloroform, carbon tetrachloride, 1,2-dichloroethane, chlorobenzene, or the like; hydrocarbon type solvent includes, for example, n-pentane, cyclopentane, n-hexane, cyclohexane, n-heptane, n-octane, isooctane, benzene, toluene, xylene, or the like; ionic liquid (ordinary temperature molten salt) includes, for example, 1-ethyl-3-methylimidazolium tetrafluoroborate, 1-ethyl-3-methylimidazolium hexafluorophosphate, 1-ethyl-3-methylimidazolium trifluoromethanesulfonate, 1-ethyl-3-methylimidazolium bis(trifluoromethanesulfonyl)imide, 1-butyl-3-methylimidazolium tetrafluoroborate, 1-butyl-3-methylimidazolium hexafluorophosphate, 1-butyl-3-methylimidazolium trifluoromethanesulfonate, 1-butyl-3-methylimidazolium bis(trifluoromethanesulfonyl)imide, 1-ethyl-1-methylpyrrolidinium hexafluorophosphate, 1-methyl-1-propylpyrrolidinium bis(trifluoromethanesulfonyl)imide, 1-methyl-1-propylpiperidinium bis(trifluoromethanesulfonyl)imide, 1-butyl-1-methylpyrrolidinium tetrafluoroborate, 1-butyl-1-methylpyrrolidinium bis(trifluoromethanesulfonyl)imide, tetraethylammonium trifluoromethanesulfonate, or the like. In the above organic solvent, ether type solvent, alcohol type solvent, carbonate type solvent, ester type solvent, nitrile type solvent, ionic liquid (ordinary temperature molten salt), or the like are preferable, among them, dimethoxyethane, 2-methyltetrahydrofuran, diethyleneglycol dimethyl ether, propylene carbonate, acetonitrile, butyrolactone, ethanol or ethyl acetate, propionitrile, 1-ethyl-3-methylimidazolium trifluoromethanesulfonate, or tetraethylammonium trifluoromethanesulfonate, or the like are more preferable, and acetonitrile, propionitrile, 1-ethyl-3-methylimidazolium trifluoromethanesulfonate, or tetraethylammonium trifluoromethanesulfonate are particularly preferable.

In the case of using the above organic solvent, use amount thereof may be, depending on the object, such an amount that decreases viscosity of the electrolytic solution. The use amount of the organic solvent may be, preferably 90 v/v % or lower, and more preferably 80 v/v % or lower in the electrolytic solution.

4. The Electrolytic Solution of the Present Invention

The electrolytic solution of the present invention is the one including a supporting electrolyte composed of the above magnesium salt, and at least one or more kinds of compound represented by the above general formula [2].

Concentration of the supporting electrolyte in the electrolytic solution of the present invention is usually 0.1 to 5.0 mol/L, preferably 0.1 to 3.0 mol/L and more preferably 0.5 to 3.0 mol/L.

The electrolytic solution of the present invention may include the additives such as a film forming agent, an overcharge prevention agent, a deoxidizing agent, a dehydration agent, a flame retardant.

5. A Preparation Method for the Electrolytic Solution

As for the preparation method for the electrolytic solution, the supporting electrolyte pertaining to the present invention may be dissolved, so as to attain the above concentration, into a mixed solution of the compound represented by the general formula [2], or the compound represented by the general formula [2] and the above organic solvent. Specifically, it is performed by dissolving the supporting electrolyte by contacting these usually at 20 to 120° C., preferably 50 to 90° C., and more preferably 60 to 80° C., usually for 1 to 20 hours, preferably 1 to 10 hours, and more preferably 5 to 10 hours. It should be noted that it is preferable for the solution to be subjected to dehydration processing, after dissolution, and said dehydration processing may be performed by adding the dehydration agent such as, for example, a molecular sieve, in an amount of, for example, 0.5 to 10 g into 20 mL of the electrolytic solution.

Use amount of the compound represented by the above general formula [2] is such an amount, in the case of using only said compound as a solvent, that the supporting electrolyte pertaining to the present invention attains the above concentration. In addition, in the case of using a mixed solution of the compound represented by the above general formula [2] and the organic solvent pertaining to the present invention, as a solvent, use amount of the compound represented by the above general formula [2] is usually 2 to 30 mol, and preferably 5 to 20 mol, relative to 1 mol of the supporting electrolyte, and the organic solvent pertaining to the present invention may be added in such an amount that the supporting electrolyte pertaining to the present invention attains the above concentration.

6. The Electrolytic Solution Prepared from a Complex

The supporting electrolyte composed of a magnesium salt in the electrolytic solution of the present invention is considered to form a magnesium complex by binding with the compound represented by the above general formula [2]. Therefore, the electrolytic solution of the present invention may be prepared by preparing, in advance, such a magnesium complex (hereafter it may be abbreviated as the magnesium complex pertaining to the present invention), and dissolving said complex pertaining to the present invention into the organic solvent pertaining to the present invention. In the case of preparing the electrolytic solution using the complex pertaining to the present invention, the complex may be dissolved into the compound pertaining to the present invention, the organic solvent pertaining to the present invention or the mixed solution thereof, so that, for example, concentration of the complex attains the same concentration range of the supporting electrolyte in the above electrolytic solution of the present invention.

Said complex may be the complex in which 2 molecules of the general formula [2] is coordinated to 1 molecule of the magnesium salt represented by the general formula [1], specifically, the complex represented by the following general formula [10],

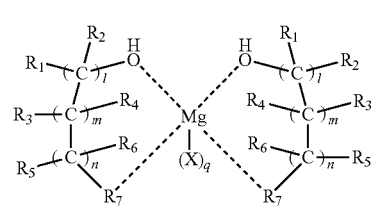

[10]

(wherein Mg, X, q, l, m, n, $R_1$ to $R_7$ are the same one as the above, however, coordination bond between $R_7$ and a magnesium ion represents the bind between an oxygen atom, a sulfur atom, a phosphorus atom, or a nitrogen atom in $R_7$ and the magnesium ion) is included.

Specific example of X, q, l, m, n, $R_1$ to $R_7$ in the complex represented by the above general formula [10] includes the same one as the one described in the above paragraph 1. Supporting electrolyte, and the paragraph 2. Compound.

Specific example of the complex represented by the general formula [10] includes the complex represented by the following general formula [10-1]:

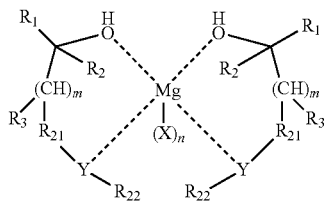

[10-1]

(wherein Mg, X, n, m, $R_1$, $R_2$ and $R_3$ are the same one as the above; Y represents an oxygen atom, or a sulfur atom; $R_{21}$ represents a bond, an alkylene group having 1 to 3 carbon numbers or alkenylene group having 2 to 4 carbon numbers; $R_{22}$ represents, a hydrogen atom, an alkyl group having 1 to 6 carbon numbers, aralkyl group having 7 to 12 carbon numbers, an aryl group having 6 to 10 carbon numbers, alkenyl group having 2 to 4 carbon numbers, arylalkenyl group having 8 to 13 carbon numbers, or an alkoxyalkyl group having 2 to 7 carbon numbers; $R_{21}$ may form a monocyclic heterocyclic group together with $R_{22}$ and Y, in such a case, $R_{21}$ may be a methylene group);

the complex represented by the following general formula [10-2]:

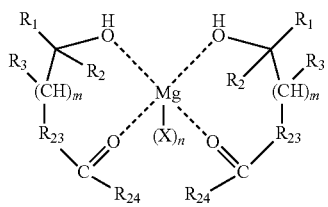

[10-2]

[wherein Mg, X, n, m, $R_1$, $R_2$ and $R_3$ are the same one as the above; $R_{23}$ represents an oxygen atom, the group shown as the following general formula [8]:

[8]

(wherein $R_{12}$ is the same one as the above) or bond; $R_{24}$ represents an alkyl group having 1 to 6 carbon numbers, an alkoxy group having 1 to 6 carbon numbers, a hydroxy group, the group shown in the following general formula [9]:

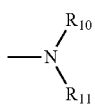

[9]

(wherein $R_{10}$ and $R_{11}$ are the same one as the above). $R_{24}$ may form a cyclic carbonate ester group or a cyclic carboxylic acid ester group together with $R_{23}$ and a carbonyl group, in such a case, $R_{11}$ may be a methylene group. When m is 0, $R_{24}$, a carbonyl group, $R_{23}$, carbon atom binding to $R_1$ and $R_2$, and $R_2$ may form a cyclic carboxylic acid ester group];

The complex represented by the following general formula [10-3]:

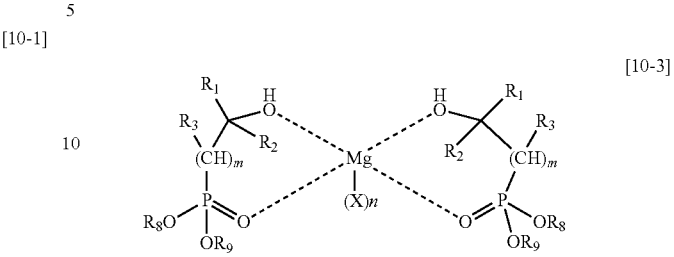

[10-3]

(wherein Mg, X, n, m, $R_1$, $R_2$, $R_3$, $R_8$ and $R_9$ are the same one as the above);

The complex represented by the following general formula [10-4]:

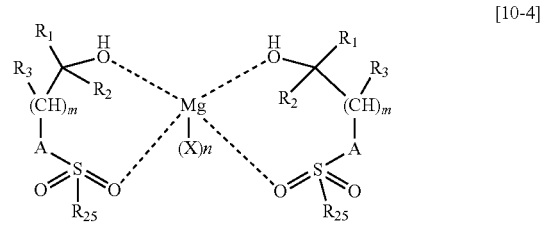

[10-4]

(wherein Mg, X, n, m, $R_1$, $R_2$, and $R_3$ are the same one as the above, A represents a bond or an oxygen atom, $R_{25}$ represents a hydroxyl group or an alkyl group having 1 to 4 carbon numbers);

The complex represented by the following general formula [10-5]:

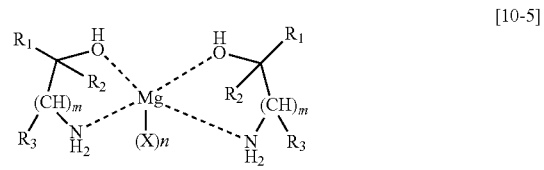

[10-5]

(wherein Mg, X, n, m, $R_1$, $R_2$, and $R_3$ are the same one as the above);

The complex represented by the following general formula [10-6]:

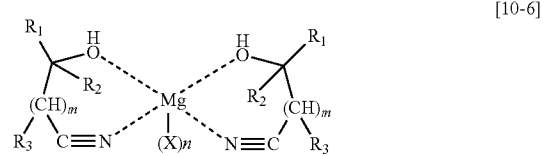

[10-6]

(wherein Mg, X, n, m, $R_1$, $R_2$, and $R_3$ are the same one as the above).

An alkylene group having 1 to 3 carbon numbers in $R_{21}$ of the above general formula [10-1] includes, for example, a methylene group, an ethylene group, an n-propylene group, or the like.

Alkenylene group having 2 to 4 carbon numbers in $R_{21}$ of the above general formula [10-1] includes, for example, a vinylene group, a 1-propenylene group, a 2-methyl-2-propenylene group, a 3-methyl-2-propenylene group, or the like.

The bond of $R_{21}$ in the above general formula [10-1] means that atoms of either side of $R_{21}$ are bonded, specifically, the structure:

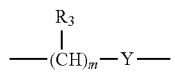

is shown. It should be noted that, bond in the present description represents, hereinafter, the same one.

When $R_{21}$ form a monocyclic heterocyclic group together with $R_{22}$ and Y, as a monocyclic heterocyclic group, 5-membered ring or 6-membered ring is preferable, specifically, it includes the group derived from the saturated hetero ring such as pyrrolidine, imidazolidine, pyrazolidine, piperazine, piperidine, morpholine, tetrahydrofurn, tetrahydroropyran, tetrahydrorothiophene, tetrahydrorothiopyran, sulfolane, pentamethylenesulfone, for example, the group derived from the unsaturated hetero ring such as pyrrole, pyrroline, imidazole, imidazoline, pyrazole, pyrazoline, pyrimidine, pyrazine, triazole, oxazol, thiazol, isothiazol, furanpyran, thiophene, or the like. It should be noted that, in this case, $R_{21}$ represents a bond or a methylene group.

An alkyl group having 1 to 6 carbon numbers in $R_{22}$ may be straight chained, branched or cyclic one, however, straight chained one is preferable, and the one having 1 to 3 carbon numbers is preferably included, specifically, it includes, for example, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a neohexyl group, a cyclopropyl group, a cyclobutyl group, a cyclopentyl group, a cyclohexyl group, or the like.

Aralkyl group having 7 to 12 carbon numbers in $R_{22}$ includes, for example, a benzyl group, a phenethyl group, a phenyl-n-propyl group, a naphthylmethyl group, a naphthylethyl group, or the like.

An aryl group having 6 to 10 carbon numbers in $R_{22}$ includes, for example, a phenyl group, a naphthyl group, or the like.

Alkenyl group having 2 to 4 carbon numbers in $R_{22}$ includes, for example, a vinyl group, a 1-propenyl group, an allyl group, a 2-methyl-2-propenyl group, a 3-methyl-2-propenyl group.

Arylalkenyl group having 8 to 13 carbon numbers in $R_{22}$ includes, for example, a cinnamyl group, β-styrenyl group, or the like.

As an alkoxyalkyl group having 2 to 7 carbon numbers in $R_{22}$, the one having 3 to 6 carbon numbers is preferable, specifically, it includes, for example, a methoxymethyl group, a methoxyethyl group, a methoxy-n-propyl group, a methoxyisopropyl group, an ethoxymethyl group, an ethoxyethyl group, an ethoxy-n-propyl group, an ethoxyisopropyl group, an n-prpoxymethyl group, an n-prpoxyethyl group, an n-prpoxy-n-propyl group, an n-prpoxyisopropyl group, an isoprpoxymethyl group, an isoprpoxyethyl group, an isoprpoxy-n-propyl group, an isoprpoxyisopropyl group, an n-butoxymethyl group, an n-butoxyethyl group, an n-butoxy-n-propyl group, an n-butoxyisopropyl group, or the like.

An alkyl group having 1 to 6 carbon numbers in $R_{24}$ of the above general formula [10-2] includes the same one as the alkyl group having 1 to 6 carbon numbers in the above $R_{22}$.

An alkoxy group having 1 to 6 carbon numbers in $R_{24}$ may be straight chained, branched or cyclic one, however, straight chained one is preferable, and the one having 1 to 3 carbon numbers is preferable. Specifically, it includes, for example, a methoxy group, an ethoxy group, an n-prpoxy group, an isoprpoxy group, an n-butoxy group, an isobutoxy group, a sec-butoxy group, a tert-butoxy group, an n-pentyloxy group, an isopentyloxy group, a sec-pentyloxy group, a tert-pentyloxy group, a neopentyloxy group, an n-hexyloxy group, an isohexyloxy group, a sec-hexyloxy group, a tert-hexyloxy group, a neohexyloxy group, a cycloprpoxy group, a cyclopentyloxy group, a cyclohexyloxy group, or the like.

A cyclic carbonate ester group in which $R_{24}$ forms together with $R_{23}$ and a carbonyl group includes, for example, the one having 3 to 6, specifically, it includes, for example, the group derived from vinylene carbonate, ethylene carbonate, propylene carbonate, or the like. In this case, $R_{23}$ may be a methylene group.

A cyclic carboxylic acid ester group in which $R_{24}$ forms together with $R_{23}$ and a carbonyl group includes, for example, the group derived from lactone compound having 3 to 9, specifically, it includes, for example, the group derived from γ-butyrolactone, γ-valerolactone, γ-caprolactone, ε-caprolactone. In this case, $R_{23}$ may be a methylene group.

When m is 0, $R_{24}$, a carbonyl group, $R_{23}$, carbon atom binding to $R_1$ and $R_2$, and $R_2$ may form a cyclic carboxylic acid ester group, a cyclic carboxylic acid ester group in this case includes the same one as cyclic ester group which the above $R_{24}$, $R_{23}$ and a carbonyl group form.

A cyclic carboxylic acid ester group, which $R_{24}$ forms together with $R_{23}$ and a carbonyl group, includes, for example, the group derived from lactone compound having 3 to 9 carbon numbers, specifically, it includes, for example, the group derived from γ-butyrolactone, γ-valerolactone, γ-caprolactone, ε-caprolactone.

The group represented by the general formula [8] in $R_{23}$ includes, for example,

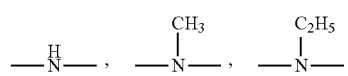

or the like.

The group represented by the general formula [9] in $R_{23}$ includes, for example, an amino group, an n-methylamino group, a N,N-dimethylamino group, or the like.

The alkyl group having 1 to 4 carbon numbers represented by the general formula [10-4] in $R_{25}$ includes a methyl group, an ethyl group, an n-propyl group, an isopropyl group, an isobutyl group, an n-butyl group, or the like.

Among the complex represented by the above general formula [10-1] to [10-6], the complex represented by the general formula [10-1] or [10-2] is preferable.

Specific example of the complex represented by said general formula [10-1] includes, for example, the following general formula [10-1-1]:

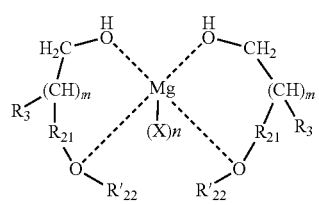

[10-1-1]

(Wherein Mg, X, n, m, $R_3$ and $R_{21}$ are the same one as the above. $R'_{22}$ represents a hydrogen atom, an alkyl group having 1 to 6 carbon numbers, aralkyl group having 7 to 12 carbon numbers, an aryl group having 6 to 10 carbon numbers, alkenyl group having 2 to 4 carbon numbers, arylalkenyl group having 8 to 13 carbon numbers, an alkoxyalkyl group having 3 to 7 carbon numbers; $R_{21}$ may form a monocyclic heterocyclic group together with $R'_{22}$ and a oxygen atom, in a such case, $R_{21}$ may be a methylene group), more specifically the group described in the below Table-1. Further, specific example of each group of $R'_{22}$ includes the same one as the specific example of $R_{22}$, and the preferable group is also the same one.

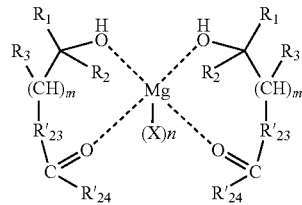

[10-2-1]

(wherein Mg, X, n, m, $R_1$, $R_2$ and $R_3$ are the same one as the above. $R'_{23}$ represents an oxygen atom or bond. $R'_{24}$ represents an alkoxy group having 1 to 6 carbon numbers.), more specifically the group described in the below Table-2 and

TABLE 1

| No. | X | n | m | $R_3$ | $R_{21}$ | $R'_{22}$ |
|---|---|---|---|---|---|---|
| 1 | Trifluoromethane sulfonate ion | 2 | 1 | Hydrogen atom | Bond | Hydrogen atom |
| 2 | Trifluoromethane sulfonate ion | 2 | 1 | Hydrogen atom | Bond | Methyl group |
| 3 | Trifluoromethane sulfonate ion | 2 | 1 | Hydrogen atom | Bond | Ethyl group |
| 4 | Trifluoromethane sulfonate ion | 2 | 1 | Hydrogen atom | Bond | Propyl group |
| 5 | Trifluoromethane sulfonate ion | 2 | 2 | Hydrogen atom | Bond | Hydrogen atom |
| 6 | Trifluoromethane sulfonate ion | 2 | 2 | Hydrogen Atom | Bond | Methyl group |
| 7 | Trifluoromethane sulfonate ion | 2 | 2 | Hydrogen atom | Bond | Ethyl group |
| 8 | Trifluoromethane sulfonate ion | 2 | 2 | Hydrogen atom | Bond | Propyl group |
| 9 | Trifluoromethane sulfonate ion | 2 | 0 | — | 1-propenylene group | Hydrogen atom |
| 10 | Bromide ion(Br$^-$) | 2 | 1 | Hydrogen atom | Bond | Hydrogen atom |
| 11 | Bromide ion(Br$^-$) | 2 | 1 | Hydrogen atom | Bond | Methyl group |
| 12 | Bromide ion(Br$^-$) | 2 | 1 | Hydrogen atom | Bond | Ethyl group |
| 13 | Chloride ion(Cl$^-$) | 2 | 1 | Hydrogen atom | Bond | Hydrogen atom |
| 14 | Chloride ion(Cl$^-$) | 2 | 1 | Hydrogen atom | Bond | Methyl group |
| 15 | Chloride ion(Cl$^-$) | 2 | 1 | Hydrogen atom | Bond | Ethyl group |
| 16 | Iodide ion(I$^-$) | 2 | 1 | Hydrogen atom | Bond | Hydrogen atom |
| 17 | Iodide ion(I$^-$) | 2 | 1 | Hydrogen atom | Bond | Methyl group |
| 18 | Iodide ion(I$^-$) | 2 | 1 | Hydrogen atom | Bond | Ethyl group |
| 19 | Tetrafluoroborate ion | 2 | 1 | Hydrogen atom | Bond | Hydrogen atom |
| 20 | Tetrafluoroborate ion | 2 | 1 | Hydrogen Atom | Bond | Methyl group |
| 21 | Tetrafluoroborate ion | 2 | 1 | Hydrogen atom | Bond | Ethyl group |
| 22 | Bis(trifluoromethanesulfonyl) imide ion | 2 | 1 | Hydrogen atom | Bond | Hydrogen atom |
| 23 | Bis(trifluoromethanesulfonyl) imide ion | 2 | 1 | Hydrogen atom | Bond | Methyl group |
| 24 | Bis(trifluoromethanesulfonyl) imide ion | 2 | 1 | Hydrogen atom | Bond | Ethyl group |

Specific example of the complex represented by said general formula [10-2] includes, for example, the complex represented by the following general formula [10-2-1]:

Table-3. Further, specific example of each group of $R'_{24}$ includes the same one as the specific example of $R_{24}$, and the preferable one is also the same one.

TABLE 2

| No | X | n | m | R₁ R₂ | R₃ | R'₂₃ | R'₂₄ |
|---|---|---|---|---|---|---|---|
| 1 | Trifluoromethane sulfonate ion | 2 | 0 | Hydrogen atom / Hydrogen atom | — | Bond | Methyl group |
| 2 | Trifluoromethane sulfonate ion | 2 | 0 | Methyl group / Hydrogen atom | — | Bound | Methyl group |
| 3 | Trifluoromethane salfonate ion | 2 | 1 | Hydrogen atom / Hydrogen atom | Hydrogen atom | Bond | Methyl group |
| 4 | Trifluoromethane sulfonate ion | 2 | 1 | Methyl group / Hydrogen atom | Hydrogen atom | Bond | Methyl group |
| 5 | Trifluoromethane sulfonate ion | 2 | 0 | Hydrogen atom / Hydrogen atom | — | Bond | Methoxy group |
| 6 | Trifluoromethane sulfonate ion | 2 | 0 | Methyl group / Hydrogen atom | — | Bond | Methoxy group |
| 7 | Trifluoromethane sulfonate ion | 2 | 0 | Methyl group / Methyl Group | — | Bond | Methoxy group |
| 8 | Trifluoromethane sulfonate ion | 2 | 1 | Hydrogen atom / Hydrogen atom | Hydrogen atom | Oxygen atom | Methyl group |
| 9 | Trifluoromethane sulfonate ion | 2 | 1 | Methyl group / Hydrogen atom | Hydrogen atom | Oxygen atom | Methyl group |
| 10 | Trifluoromethane sulfonate ion | 2 | 1 | Methyl group / Methyl Group | Hydrogen atom | Oxygen atom | Methyl group |
| 11 | Bromide ion | 2 | 0 | Hydrogen atom / Hydrogen atom | — | Bond | Methoxy group |
| 12 | Bromide ion | 2 | 0 | Methyl group / Hydrogen atom | — | Bond | Methoxy group |
| 13 | Bromide ion | 2 | 0 | Methyl group / Methyl Group | — | Bond | Methoxy group |
| 14 | Bromide ion | 2 | 1 | Hydrogen atom / Hydrogen atom | Hydrogen atom | Oxygen atom | Methyl group |
| 15 | Chloride ion | 2 | 0 | Hydrogen atom / Hydrogen atom | — | Bond | Methoxy group |
| 16 | Chloride ion | 2 | 0 | Methyl group / Hydrogen atom | — | Bond | Methoxy group |
| 17 | Chloride ion | 2 | 0 | Methyl group / Methyl Group | — | Bond | Methoxy group |
| 18 | Chloride ion | 2 | 1 | Hydrogen atom / Hydrogen atom | Hydrogen atom | Oxygen atom | Methyl group |

TABLE 3

| No | X | n | m | R₁ R₂ | R₃ | R'₂₃ | R'₂₄ |
|---|---|---|---|---|---|---|---|
| 19 | Iodide ion | 2 | 0 | Hydrogen atom / Hydrogen atom | — | Bond | Methyl group |
| 20 | Iodide ion | 2 | 0 | Hydrogen atom / Hydrogen atom | — | Bond | Methoxy group |

TABLE 3-continued

| No | X | n | m | $R_1$ $R_2$ | $R_3$ | $R'_{23}$ | $R'_{24}$ |
|---|---|---|---|---|---|---|---|
| 21 | Iodide ion | 2 | 1 | Hydrogen atom Hydrogen atom | Hydrogen atom | Oxygen atom | Methyl group |
| 22 | Tetrafluoro borate ion | 2 | 0 | Hydrogen atom Hydrogen atom | — | Bond | Methyl group |
| 23 | Tetrafluoro borate ion | 2 | 0 | Hydrogen atom Hydrogen atom | — | Bond | Methoxy group |
| 24 | Tetrafluoro borate ion | 2 | 1 | Hydrogen atom Hydrogen atom | Hydrogen atom | Oxygen atom | Methyl group |
| 25 | Bis(trifluoromethanesulfonyl) imide ion | 2 | 0 | Hydrogen atom Hydrogen atom | — | Bond | Methyl group |
| 26 | Bis(trifluoromethanesulfonyl) imide ion | 2 | 0 | Hydrogen atom Hydrogen atom | — | Bond | Methoxy group |
| 27 | Bis(trifluoromethanesulfonyl) imide ion | 2 | 1 | Hydrogen atom Hydrogen atom | Hydrogen atom | Oxygen atom | Methyl group |

As for the preparation method for the above complex, for example, the compound represented by the above general formula [2] may be added in 2 to 10 equivalents, and preferably 5 to 10 equivalents, relative to 1 mol of the supporting electrolyte pertaining to the present invention, and reacted them usually at 20 to 120° C., preferably 50 to 90° C., and more preferably 60 to 80° C., usually for 1 to 20 hours, preferably 1 to 10 hours, and more preferably 5 to 10 hours. It should be noted that the compound represented by the general formula [2] may be added in excess, in response to solubility thereof, or the above organic solvent pertaining to the present invention may be added further as the solvent. After dissolution, and after removing the solvent by concentration or the like, if needed, or a complex may be deposited by adding a suitable poor solvent, if needed.

The Electrochemical Device

The electrolytic solution of the present invention can be used as an electrolytic solution for an electrochemical device containing a magnesium in a negative electrode active substance, or an electrochemical device which is capable of forming an electric double layer by intercalation (occlusion, discharge) of the magnesium ion to the electrode. As said electrochemical device, a secondary battery, an electric double layer capacitor and the like are included, and among them, the secondary battery is preferable.

As the electrochemical device using the electrolytic solution of the present invention, it is enough to contain a magnesium as the negative electrode active substance, as described above, and constitution thereof is made of the above electrolytic solution of the present invention, a positive electrode, a negative electrode and a separator.

The positive electrode is not especially limited, as long as it is a transition metal oxide which is capable of intercalating the magnesium ion, and all substances for example described in NON PATENT LITERATURE 3 may be used.

The negative electrode is not especially limited, as long as it is the one containing magnesium as an active substance, and is capable of intercalating a magnesium ion, including, for example, a metal magnesium, a magnesium alloy or the like.

The separator is not especially limited, as long as it is the one which is capable of electrically insulating the positive electrode and the negative electrode, as well as permeating the magnesium ion, including specifically, a micro-porous polymer film, such as, for example, a porous polyolefin film. A specific example of the porous polyolefin film includes, for example, a porous polyethylene film only, or a multi-layer film by lamination of the porous polyethylene film and a porous polypropylene film, or the like.

Explanation will be given below on the present invention more specifically with reference to Examples and Comparative Examples, however, the present invention should not be limited thereby at all.

Explanation will be given below on the present invention more specifically with reference to Examples and Comparative Examples, however, the present invention should not be limited thereby at all.

EXAMPLE

Example 1

Preparation of Magnesium Trifuluoromethane sulfonate($Mg(OTf)_2$/2-methoxyethanol Solution Under nitrogen atmosphere, 4.84 g of magnesium trifluoromethane sulfonate($Mg(OTf)_2$) (produced by Tokyo Chemical Industry Co., Ltd.) and 25 ml of 2-methoxyethanol (produced by Wako Pure Chemical Industries Ltd.) were charged into the reactor, and stirred by heating at 100° C. for 4 hours. After filtrating off the undissolved material under reduced pressure, dehydration treatment was carried out by adding 2 g of MS5 A [(Molecular sieve 5 A (produced by Wako Pure Chemical Industries Ltd.)] to the mother liquor, then 2-methoxyethanol solution containing 0.5 M of Mg(OTf)$_2$ was prepared. Said solution was referred to as the electrolytic solution 1.

Example 2

Preparation of Mg(OTf)$_2$/Ethylene Glycol Solution

By carrying out the same operation as in Example 1 except that as solvent, instead of 25 ml of 2-methoxyethanol in Example 1, 25 ml of ethylene glycol (produced by Wako Pure Chemical Industries Ltd.) was used, ethylene glycol solution containing 0.5 M of Mg(OTf)$_2$ was prepared. Said solution was referred to as the electrolytic solution 2.

Example 3

Preparation of Mg(OTf)$_2$/Methyl Glycolate Solution

By carrying out the same operation as in Example 1 except that as solvent, instead of 25 ml of 2-methoxyethanol in Example 1, 25 ml of methyl glycolate (produced by Wako Pure Chemical Industries Ltd.) was used, methyl glycolate solution containing 0.5 M of Mg(OTf)$_2$ was prepared. Said solution was referred to as the electrolytic solution 3.

Example 4

Preparation of Mg(OTf)$_2$/2-ethoxyethanol Solution

By carrying out the same operation as in Example 1 except that as solvent, instead of 25 ml of 2-methoxyethanol in Example 1, 25 ml of 2-ethoxyethanol (produced by Wako Pure Chemical Industries Ltd.) was used, 2-ethoxyethanol solution containing 0.5 M of Mg(OTf)$_2$ was prepared. Said solution was referred to as the electrolytic solution 4.

Example 5

Preparation of Mg(OTf)$_2$/2-isopropoxyethanol Solution

By carrying out the same operation as in Example 1 except that as solvent, instead of 25 ml of 2-methoxyethanol in Example 1, 25 ml of 2-isopropoxyethanol (produced by Wako Pure Chemical Industries Ltd.) was used, 2-isopropoxyethanol solution containing 0.5 M of Mg(OTf)$_2$ was prepared. Said solution was referred to as the electrolytic solution 5.

Example 6

Preparation of Mg(OTf)$_2$/2-butoxyethanol Solution

By carrying out the same operation as in Example 1 except that as solvent, instead of 25 ml of 2-methoxyethanol in Example 1, 25 ml of 2-butoxyethanol (produced by Wako Pure Chemical Industries Ltd.) was used, 2-butoxyethanol solution containing 0.5 M of Mg(OTf)$_2$ was prepared. Said solution was referred to as the electrolytic solution

Example 7

Preparation of Mg(OTf)$_2$/2-(2-methoxyethoxy)ethanol Solution

By carrying out the same operation as in Example 1 except that as solvent, instead of 25 ml of 2-methoxyethanol in Example 1, 25 ml of 2-(2-methoxyethoxy)ethanol (produced by Wako Pure Chemical Industries Ltd.) was used, 2-(2-methoxyethoxy)ethanol solution containing 0.5 M of Mg(OTf)$_2$ was prepared. Said solution was referred to as the electrolytic solution 7.

Example 8

Preparation of Mg(OTf)$_2$/2-(hydroxymethyl)tetrahydrofuran Solution

By carrying out the same operation as in Example 1 except that as solvent, instead of 25 ml of 2-methoxyethanol in Example 1, 25 ml of 2-(hydroxymethyl)tetorahydrorofuran (produced by Wako Pure Chemical Industries Ltd.) was used, 2-(hydroxymethyl)tetorahydrorofuran solution containing 0.5 M of Mg(OTf)$_2$ was prepared. Said solution was referred to as the electrolytic solution 8.

Example 9

Preparation of Mg(OTf)$_2$/1-methoxy-2-propanol Solution

By carrying out the same operation as in Example 1 except that as solvent, instead of 25 ml of 2-methoxyethanol in Example 1, 25 ml of 1-methoxy-2-propanol (produced by Wako Pure Chemical Industries Ltd.) was used, 1-methoxy-2-propanol solution containing 0.5 M of Mg(OTf)$_2$ was prepared. Said solution was referred to as the electrolytic solution 9.

Example 10

Preparation of Mg(OTf)$_2$/2-(benzyloxy)ethanol Solution

By carrying out the same operation as in Example 1 except that as solvent, instead of 25 ml of 2-methoxyethanol in Example 1, 25 ml of 2-(benzyloxy)ethanol (produced by Wako Pure Chemical Industries Ltd.) was used, 2-(benzyloxy)ethanol solution containing 0.5 M of Mg(OTf)$_2$ was prepared. Said solution was referred to as the electrolytic solution 10.

Example 11

Preparation of Mg(OTf)$_2$/2-(phenyloxy)ethanol Solution

By carrying out the same operation as in Example 1 except that as solvent, instead of 25 ml of 2-methoxyethanol in Example 1, 25 ml of 2-(phenyloxy)ethanol (produced by Tokyo Chemical Industry Co., Ltd.) was used, 2-(phenyloxy)ethanol solution containing 0.16 M of Mg(OTf)$_2$ was prepared. Said solution was referred to as the electrolytic solution 11.

Example 12

Preparation of Mg(OTf)$_2$/2-(pentafluorophenyloxy)ethanol Solution

By carrying out the same operation as in Example 1 except that as solvent, instead of 25 ml of 2-methoxyethanol in Example 1, 25 ml of 2-(pentafluorophenyloxy)ethanol (produced by Tokyo Chemical Industry Co., Ltd.) was used, 2-(pentafluorophenyloxy)ethanol solution containing 0.13 M of Mg(OTf)$_2$ was prepared. Said solution was referred to as the electrolytic solution 12.

Example 13

Preparation of Mg(OTf)$_2$/2-Hydroxyacetic Acid Ethyl Ester Solution

By carrying out the same operation as in Example 1 except that as solvent, instead of 25 ml of 2-methoxyethanol in Example 1, 25 ml of 2-Hydroxyacetic acid ethyl ester (produced by Tokyo Chemical Industry Co., Ltd.) was used, 2-Hydroxyacetic acid ethyl ester solution containing 0.5 M of Mg(OTf)$_2$ was prepared. Said solution was referred to as the electrolytic solution 13.

Example 14

Preparation of Mg(OTf)$_2$/2-(t-butyldimethylsilyloxy) ethanol:Dimethoxyethane Mixed Solution By carrying out the same operation as in Example 1 except that as solvent, instead of 25 ml of 2-methoxyethanol in Example 1, 25 ml of dimethoxyethane (produced by Wako Pure Chemical Industries Ltd.) added with 5.30 g of 2-(t-butyldimethylsilyloxy)ethanol (produced by Wako Pure Chemical Industries Ltd.) was used, 2-(t-butyldimethylsilyloxy)ethanol:dimethoxyethane) mixed solution containing 0.33 M of Mg(OTf)$_2$ was prepared. Said solution was referred to as the electrolytic solution 14.

Example 15

Preparation of Mg(OTf)$_2$/2-(allyloxy)ethanol Solution

By carrying out the same operation as in Example 1 except that as solvent, instead of 25 ml of 2-methoxyethanol in Example 1, 25 ml of 2-(allyloxy)ethanol (produced by Wako Pure Chemical Industries Ltd.) was used, 2-(allyloxy)ethanol solution containing 0.5 M of Mg(OTf)$_2$ was prepared. Said solution was referred to as the electrolytic solution 15.

Example 16

Preparation of Mg(OTf)$_2$/2-(vinyloxy)ethanol Solution

By carrying out the same operation as in Example 1 except that as solvent, instead of 25 ml of 2-methoxyethanol in Example 1, 25 ml of 2-(vinyloxy)ethanol (produced by Tokyo Chemical Industry Co., Ltd.) was used, 2-(vinyloxy)ethanol solution containing 0.17 M of Mg(OTf)$_2$ was prepared. Said solution was referred to as the electrolytic solution 16.

Example 17

Preparation of Mg(OTf)$_2$/cis-2-butene-1,4-diol Solution

By carrying out the same operation as in Example 1 except that as solvent, instead of 25 ml of 2-methoxyethanol in Example 1, 25 ml of cis-2-butene-1,4-diol (produced by Wako Pure Chemical Industries Ltd.) was used, cis-2-butene-1,4-diol solution containing 0.5 M of Mg(OTf)$_2$ was prepared. Said solution was referred to as the electrolytic solution 17.

Example 18

Preparation of Mg(OTf)$_2$/2-hydroxyethyl Methacrylate Solution

By carrying out the same operation as in Example 1 except that as solvent, instead of 25 ml of 2-methoxyethanol in Example 1, 25 ml of 2-hydroxyethyl methacrylate (produced by Wako Pure Chemical Industries Ltd.) was used, 2-hydroxyethyl methacrylate solution containing 0.5 M of Mg(OTf)$_2$ was prepared. Said solution was referred to as the electrolytic solution 18.

Example 19

Preparation of Mg(OTf)$_2$/3-methoxy-1-propanol Solution

By carrying out the same operation as in Example 1 except that as solvent, instead of 25 ml of 2-methoxyethanol in Example 1, 25 ml of 3-methoxy-1-propanol (produced by Wako Pure Chemical Industries Ltd.) was used, 3-methoxy-1-propanol solution containing 0.5 M of Mg(OTf)$_2$ was prepared. Said solution was referred to as the electrolytic solution 19.

Example 20

Preparation of Mg(OTf)$_2$/Glycerin Solution

By carrying out the same operation as in Example 1 except that as solvent, instead of 25 ml of 2-methoxyethanol in Example 1, 25 ml of glycerin (produced by Wako Pure Chemical Industries Ltd.) was used, glycerin solution containing 0.5 M of Mg(OTf)$_2$ was prepared. Said solution was referred to as the electrolytic solution 20.

Example 21

Preparation of Mg(OTf)$_2$/Propylene Glycol Solution

By carrying out the same operation as in Example 1 except that as solvent, instead of 25 ml of 2-methoxyethanol in Example 1, 25 ml of propylene glycol (produced by Wako Pure Chemical Industries Ltd.) was used, propylene glycol solution containing 0.5 M of Mg(OTf)$_2$ was prepared. Said solution was referred to as the electrolytic solution 21.

Example 22

Preparation of Mg(OTf)$_2$/3-methoxy-1,2-propanediol Solution

By carrying out the same operation as in Example 1 except that as solvent, instead of 25 ml of 2-methoxyethanol in Example 1, 25 ml of 3-methoxy-1,2-propanediol (produced by Tokyo Chemical Industry Co., Ltd.) was used, 3-methoxy- 1,2-propanediol solution containing 0.5 M of Mg(OTf)$_2$ was prepared. Said solution was referred to as the electrolytic solution 22.

Example 23

Preparation of Mg(OTf)$_2$/1,3-propanediol Solution

By carrying out the same operation as in Example 1 except that as solvent, instead of 25 ml of 2-methoxyethanol in Example 1, 25 ml of 1,3-propanediol (produced by Wako Pure Chemical Industries Ltd.) was used, 1,3-propanediol solution containing 0.5 M of Mg(OTf)$_2$ was prepared. Said solution was referred to as the electrolytic solution 23.

Example 24

Preparation of Mg(OTf)$_2$/Diethylene Glycol Solution

By carrying out the same operation as in Example 1 except that as solvent, instead of 25 ml of 2-methoxyethanol in Example 1, 25 ml of diethylene glycol (produced by Wako Pure Chemical Industries Ltd.) was used, diethylene glycol solution containing 0.5 M of Mg(OTf)$_2$ was prepared. Said solution was referred to as the electrolytic solution 24.

Example 25

Preparation of Mg(OTf)$_2$/Pinacol:Ethylene Glycol Mixed Solution

By carrying out the same operation as in Example 1 except that as solvent, instead of 25 ml of 2-methoxyethanol in Example 1, 25 ml of ethylene glycol (produced by Wako Pure Chemical Industries Ltd.) added with 3.54 g of pinacol (produced by Wako Pure Chemical Industries Ltd.) was used, pinacol:ethylene glycol mixed solution containing 0.5 M of Mg(OTf)$_2$ was prepared. Said solution was referred to as the electrolytic solution 25.

Example 26

Preparation of Mg(OTf)$_2$/cis-cyclohexane-1,2-diol: Dimethoxyethane Mixed Solution By carrying out the same operation as in Example 1 except that as solvent, instead of 25 ml of 2-methoxyethanol in Example 1, 25 ml of dimethoxyethane (produced by Wako Pure Chemical Industries Ltd.) added with 3.48 g of cis-cyclohexane-1,2-diol (produced by Wako Pure Chemical Industries Ltd.) was used, cis-cyclohexane-1,2-diol: dimethoxyethane mixed solution containing 0.5 M of Mg(OTf)$_2$ was prepared. Said solution was referred to as the electrolytic solution 26.

Example 27

Preparation of Mg(OTf)$_2$/1,4-dioxane-2,3-diol: Dimethoxyethane Mixed Solution

By carrying out the same operation as in Example 1 except that as solvent, instead of 25 ml of 2-methoxyethanol in Example 1, 25 ml of dimethoxyethane (produced by Wako Pure Chemical Industries Ltd.) added with 3.60 g of 1,4-dioxane-2,3-diol (produced by Wako Pure Chemical Industries Ltd.) was used, 1,4-dioxane-2,3-diol:dimethoxyethane mixed solution containing 0.5 M of Mg(OTf)$_2$ was prepared. Said solution was referred to as the electrolytic solution 27.

Example 28

Preparation of Mg(OTf)$_2$/Hydroxyacetone Solution

By carrying out the same operation as in Example 1 except that as solvent, instead of 25 ml of 2-methoxyethanol in Example 1, 25 ml of hydroxyacetone (produced by Wako Pure Chemical Industries Ltd.) was used, hydroxyacetone solution containing 0.5 M of Mg(OTf)$_2$ was prepared. Said solution was referred to as the electrolytic solution 28.

Example 29

Preparation of Mg(OTf)$_2$/4-hydroxy-2-butanone Solution

By carrying out the same operation as in Example 1 except that as solvent, instead of 25 ml of 2-methoxyethanol in Example 1, 25 ml of 4-hydroxy-2-butanone (produced by Wako Pure Chemical Industries Ltd.) was used, 4-hydroxy-2-butanone solution containing 0.5 M of Mg(OTf)$_2$ was prepared. Said solution was referred to as the electrolytic solution 29.

Example 30

Preparation of Mg(OTf)$_2$/4-hydroxy-4-methyl-2-pentanone Solution

By carrying out the same operation as in Example 1 except that as solvent, instead of 25 ml of 2-methoxyethanol in Example 1, 25 ml of 4-hydroxy-4-methyl-2-pentanone (produced by Wako Pure Chemical Industries Ltd.) was used, 4-hydroxy-4-methyl-2-pentanone solution containing 0.5 M of Mg(OTf)$_2$ was prepared. Said solution was referred to as the electrolytic solution 30.

Example 31

Preparation of Mg(OTf)$_2$/2-(methanesulfonyl)ethanol Solution

By carrying out the same operation as in Example 1 except that as solvent, instead of 25 ml of 2-methoxyethanol in Example 1, 25 ml of 2-(methanesulfonyl)ethanol (produced by Wako Pure Chemical Industries Ltd.) was used, 2-(methanesulfonyl)ethanol solution containing 0.49 M of Mg(OTf)$_2$ was prepared. Said solution was referred to as the electrolytic solution 31.

Example 32

Preparation of Mg(OTf)$_2$/2-(methylthio)ethanol Solution

By carrying out the same operation as in Example 1 except that as solvent, instead of 25 ml of 2-methoxyethanol in Example 1, 25 ml of 2-(methylthio)ethanol (produced by Wako Pure Chemical Industries Ltd.) was used, 2-(methylthio)ethanol solution containing 0.25 M of Mg(OTf)$_2$ was prepared. Said solution was referred to as the electrolytic solution 32.

Example 33

Preparation of Mg(OTf)$_2$/dimethyl(2-hydroxyethyl) phosphonate Solution

By carrying out the same operation as in Example 1 except that as solvent, instead of 25 ml of 2-methoxyethanol in Example 1, 25 ml of dimethyl (2-hydroxyethyl)phosphonate (produced by Tokyo Chemical Industry Co., Ltd.) was used, dimethyl (2-hydroxyethyl)phosphonate solution containing 0.5 M of Mg(OTf)$_2$ was prepared. Said solution was referred to as the electrolytic solution 33.

Example 34

Preparation of Mg(OTf)$_2$/2-acetamideethanol Solution

By carrying out the same operation as in Example 1 except that as solvent, instead of 25 ml of 2-methoxyethanol in Example 1, 25 ml of 2-acetamideethanol (produced by Tokyo Chemical Industry Co., Ltd.) was used, 2-acetamideethanol solution containing 0.5 M of Mg(OTf)$_2$ was prepared. Said solution was referred to as the electrolytic solution

Example 35

Preparation of Mg(OTf)$_2$/Methylidene Glycerol Solution

By carrying out the same operation as in Example 1 except that as solvent, instead of 25 ml of 2-methoxyethanol in Example 1, 25 ml of methylidene glycerol (produced by Wako Pure Chemical Industries Ltd.) was used, methylidene glycerol solution containing 0.5 M of Mg(OTf)$_2$ was prepared. Said solution was referred to as the electrolytic solution 35.

Example 36

Preparation of Mg(OTf)$_2$/4-hydroxymethyl-1,3-dioxolane-2-one Solution

By carrying out the same operation as in Example 1 except that as solvent, instead of 25 ml of 2-methoxyethanol in Example 1, 25 ml of 4-hydroxymethyl-1,3-dioxolane-2-one (produced by Tokyo Chemical Industry Co., Ltd.) was used, 4-hydroxymethyl-1,3-dioxolane-2-one solution containing 0.5 M of Mg(OTf)$_2$ was prepared. Said solution was referred to as the electrolytic solution 36.

Example 37

Preparation of Mg(OTf)$_2$/2-(hydroxymethyl)thiophene Solution

By carrying out the same operation as in Example 1 except that as solvent, instead of 25 ml of 2-methoxyethanol in Example 1, 25 ml of 2-(hydroxymethyl)thiophene (produced by Tokyo Chemical Industry Co., Ltd.) was used, 2-(hydroxymethyl)thiophene solution containing 0.05 M of Mg(OTf)$_2$ was prepared. Said solution was referred to as the electrolytic solution 37.

Example 38

Preparation of Mg(OTf)$_2$/2-(hydroxymethyl)furan Solution

By carrying out the same operation as in Example 1 except that as solvent, instead of 25 ml of 2-methoxyethanol in Example 1, 25 ml of 2-(hydroxymethyl)furan (produced by Tokyo Chemical Industry Co., Ltd.) was used, 2-(hydroxymethyl)furan solution containing 0.06 M of Mg(OTf)$_2$ was prepared. Said solution was referred to as the electrolytic solution 38.

Example 39

Preparation of Mg(OTf)$_2$/2-aminoethanol Solution

By carrying out the same operation as in Example 1 except that as solvent, instead of 25 ml of 2-methoxyethanol in Example 1, 25 ml of 2-aminoethanol (produced by Wako Pure Chemical Industries Ltd.) was used, 2-aminoethanol solution containing 0.33 M of Mg(OTf)$_2$ was prepared. Said solution was referred to as the electrolytic solution 39.

Example 40

Preparation of Mg(OTf)$_2$/2-(methylamino)ethanol Solution

By carrying out the same operation as in Example 1 except that as solvent, instead of 25 ml of 2-methoxyethanol in Example 1, 25 ml of 2-(methylamino)ethanol (produced by Wako Pure Chemical Industries Ltd.) was used, 2-(methylamino)ethanol solution containing 0.45 M of Mg(OTf)$_2$ was prepared. Said solution was referred to as the electrolytic solution 40.

Example 41

Preparation of Mg(OTf)$_2$/2-(dimethylamino)ethanol Solution

By carrying out the same operation as in Example 1 except that as solvent, instead of 25 ml of 2-methoxyethanol in Example 1, 25 ml of 2-(dimethylamino)ethanol (produced by Wako Pure Chemical Industries Ltd.) was used, 2-(dimethylamino)ethanol solution containing 0.5 M of Mg(OTf)$_2$ was prepared. Said solution was referred to as the electrolytic solution 41.

Example 42

Preparation of Mg(OTf)$_2$/2-(hydroxymethyl)pyridine Solution

By carrying out the same operation as in Example 1 except that as solvent, instead of 25 ml of 2-methoxyethanol in Example 1, 25 ml of 2-(hydroxymethyl)pyridine (produced by Wako Pure Chemical Industries Ltd.) was used, 2-(hydroxymethyl)pyridine solution containing 0.5 M of Mg(OTf)$_2$ was prepared. Said solution was referred to as the electrolytic solution 42.

Example 43

Preparation of Mg(OTf)$_2$/2-pyrrolidinemethanol Solution

By carrying out the same operation as in Example 1 except that as solvent, instead of 25 ml of 2-methoxyethanol in Example 1, 25 ml of 2-pyrrolidinemethanol (produced by Wako Pure Chemical Industries Ltd.) was used, 2-pyrrolidinemethanol solution containing 0.12 M of Mg(OTf)$_2$ was prepared. Said solution was referred to as the electrolytic solution 43.

Example 44

Preparation of Mg(OTf)$_2$/2-(1-imidazolyl)ethanol Solution

By carrying out the same operation as in Example 1 except that as solvent, instead of 25 ml of 2-methoxyethanol in Example 1, 25 ml of 2-(1-imidazolyl)ethanol (produced by Wako Pure Chemical Industries Ltd.) was used, 2-(1-imidazolyl)ethanol solution containing 0.5 M of Mg(OTf)$_2$ was prepared. Said solution was referred to as the electrolytic solution 44.

Example 45

Preparation of Mg(OTf)$_2$/3-hydoroxypropionitrile Solution

By carrying out the same operation as in Example 1 except that as solvent, instead of 25 ml of 2-methoxyethanol in Example 1, 25 ml of 3-hydroxypropionitrile (produced by Wako Pure Chemical Industries Ltd.) was used, 3-hydoroxypropionitrile solution containing 0.45 M of Mg(OTf)$_2$ was prepared. Said solution was referred to as the electrolytic solution 45.

Example 46

Preparation of Mg(OTf)$_2$/Methyl Lactate Solution

By carrying out the same operation as in Example 1 except that as solvent, instead of 25 ml of 2-methoxyethanol in Example 1, 25 ml of methyl lactate (produced by Wako Pure Chemical Industries Ltd.) was used, methyl lactate solution containing 0.5 M of Mg(OTf)$_2$ was prepared. Said solution was referred to as the electrolytic solution 46.

Example 47

Preparation of Mg(OTf)$_2$/methyl 2-hydroxyisobutyrate Solution

By carrying out the same operation as in Example 1 except that as solvent, instead of 25 ml of 2-methoxyethanol in Example 1, 25 ml of methyl 2-hydroxyisobutyrate (produced by Tokyo Chemical Industry Co., Ltd.) was used, methyl 2-hydroxyisobutyrate solution containing 0.5 M of Mg(OTf)$_2$ was prepared. Said solution was referred to as the electrolytic solution 47.

Example 48

Preparation of Mg(OTf)$_2$/Methyl Hydroxypivalate Solution

By carrying out the same operation as in Example 1 except that as solvent, instead of 25 ml of 2-methoxyethanol in Example 1, 25 ml of methyl hydroxypivalate (produced by Tokyo Chemical Industry Co., Ltd.) was used, methyl hydroxypivalate solution containing 0.5 M of Mg(OTf)$_2$ was prepared. Said solution was referred to as the electrolytic solution 48.

Example 49

Preparation of Mg(OTf)$_2$/Glycolic Acid:Ethylene Glycol Mixed Solution

By carrying out the same operation as in Example 1 except that as solvent, instead of 25 ml of 2-methoxyethanol in Example 1, 25 ml of ethylene glycol (produced by Wako Pure Chemical Industries Ltd.) added with 2.28 g of glycolic acid (produced by Wako Pure Chemical Industries Ltd.) was used, glycolic acid:ethylene glycol mixed solution containing 0.5 M of Mg(OTf)$_2$ was prepared. Said solution was referred to as the electrolytic solution 49.

Example 50

Preparation of Mg(OTf)$_2$/Lactamide:Ethylene Glycol Mixed Solution

By carrying out the same operation as in Example 1 except that as solvent, instead of 25 ml of 2-methoxyethanol in Example 1, 25 ml of ethylene glycol (produced by Wako Pure Chemical Industries Ltd.) added with 2.68 g of lactamide (produced by Tokyo Chemical Industry Co., Ltd.) was used, lactamide:ethylene glycol mixed solution containing 0.5 M of Mg(OTf)$_2$ was prepared. Said solution was referred to as the electrolytic solution 50.

Example 51

Preparation of Mg(OTf)$_2$/Pantolactone:Ethylene Glycol Mixed Solution

By carrying out the same operation as in Example 1 except that as solvent, instead of 25 ml of 2-methoxyethanol in Example 1, 25 ml of ethylene glycol (produced by Wako Pure Chemical Industries Ltd.) added with 3.90 g of pantolactone (produced by Tokyo Chemical Industry Co., Ltd.) was used, pantolactone:ethylene glycol mixed solution containing 0.5 M of Mg(OTf)$_2$ was prepared. Said solution was referred to as the electrolytic solution 51.

Example 52

Preparation of Mg(OTf)$_2$/Catecol:Ethylene Glycol Mixed Solution

By carrying out the same operation as in Example 1 except that as solvent, instead of 25 ml of 2-methoxyethanol in Example 1, 25 ml of ethylene glycol (produced by Wako Pure Chemical Industries Ltd.) added with 3.30 g of catecol (produced by Wako Pure Chemical Industries Ltd.) was used, catecol:ethylene glycol mixed solution containing 0.5 M of Mg(OTf)$_2$ was prepared. Said solution was referred to as the electrolytic solution 52.

Example 53

Preparation of Mg(OTf)$_2$/o-aminophenol:Ethylene Glycol Mixed Solution

By carrying out the same operation as in Example 1 except that as solvent, instead of 25 ml of 2-methoxyethanol in Example 1, 25 ml of ethylene glycol (produced by Wako Pure Chemical Industries Ltd.) added with 3.27 g of o-aminophenol (produced by Wako Pure Chemical Industries Ltd.) was used, o-aminophenol:ethylene glycol mixed solution containing 0.5 M of $Mg(OTf)_2$ was prepared. Said solution was referred to as the electrolytic solution 53.

Example 54

Preparation of $Mg(OTf)_2$/Perfluoropinacol Solution

By carrying out the same operation as in Example 1 except that as solvent, instead of 25 ml of 2-methoxyethanol in Example 1, 25 ml of perfluoropinacol (produced by Tokyo Chemical Industry Co., Ltd.) was used, perfluoropinacol solution containing 0.15 M of $Mg(OTf)_2$ was prepared. Said solution was referred to as the electrolytic solution 54.

Example 55

Preparation of $Mg(OTf)_2$/1H,1H,11H,11H-dodecafluoro-3,6,9-trioxaundecane-1,11-diol:Ethylene Glycol Solution By carrying out the same operation as in Example 1 except that as solvent, instead of 25 ml of 2-methoxyethanol in Example 1, 25 ml of ethylene glycol added with 12.3 g of 1H,1H,11H,11H-dodecafluoro-3,6,9-trioxaundecane-1,1'-diol (produced by Wako Pure Chemical Industries Ltd.) was used, 1H,1H,11H,11H-dodecafluoro-3,6,9-trioxaundecane-1,11-diol:ethylene glycol mixed solution containing 0.5 M of $Mg(OTf)_2$ was prepared. Said solution was referred to as the electrolytic solution 55.

Example 56

Preparation of $Mg(OTf)_2$/Polyethylene Glycol Solution

By carrying out the same operation as in Example 1 except that as solvent, instead of 25 ml of 2-methoxyethanol in Example 1, 25 ml of polyethylene glycol 200 (produced by Wako Pure Chemical Industries Ltd.) was used, polyethylene glycol 200 solution containing 0.5 M of $Mg(OTf)_2$ was prepared. Said solution was referred to as the electrolytic solution 56.

Example 57

Preparation of $Mg(OTf)_2$/2-methoxyethanol Solution

By carrying out the same operation as in Example 1 except that as solvent, instead of 25 ml of 2-methoxyethanol in Example 1, 12.5 ml of 2-methoxyethanol (produced by Wako Pure Chemical Industries Ltd.) was used, 2-methoxyethanol solution containing 1.0 M of $Mg(OTf)_2$ was prepared. Said solution was referred to as the electrolytic solution 57.

Example 58

Preparation of $Mg(OTf)_2$/ethylene glycol solution

By carrying out the same operation as in Example 1 except that as solvent, instead of 25 ml of 2-methoxyethanol in Example 1, 12.5 ml of ethylene glycol (produced by Wako Pure Chemical Industries Ltd.) was used, ethylene glycol solution containing 1.0 M of $Mg(OTf)_2$ was prepared. Said solution was referred to as the electrolytic solution 58.

Example 59

Preparation of $Mg(OTf)_2$/2-methoxyethanol:dimethoxyethane (1:1) Mixed Solution By carrying out the same operation as in Example 1 except that as solvent, instead of 25 ml of 2-methoxyethanol in Example 1, mixed solvent of 12.5 ml of 2-methoxyethanol (produced by Wako Pure Chemical Industries Ltd.) and 12.5 ml of dimethoxyethane (produced by Wako Pure Chemical Industries Ltd.) was used, 2-methoxyethanol and dimethoxyethane (1:1) mixed solution containing 0.5 M of $Mg(OTf)_2$ was prepared. Said solution was referred to as the electrolytic solution 59.

Example 60

Preparation of $Mg(OTf)_2$/2-methoxyethanol:2-methyltetrahydrofuran (1:1) Mixed Solution By carrying out the same operation as in Example 1 except that as solvent, instead of 25 ml of 2-methoxyethanol in Example 1, mixed solvent of 12.5 ml of 2-methoxyethanol (produced by Wako Pure Chemical Industries Ltd.) and 12.5 ml of 2-methyltetrahydrofuran (produced by Wako Pure Chemical Industries Ltd.) was used, 2-methoxyethanol and 2-methyltetrahydrofuran (1:1) mixed solution containing 0.5 M of $Mg(OTf)_2$ was prepared. Said solution was referred to as the electrolytic solution 60.

Example 61

Preparation of $Mg(OTf)_2$/2-methoxyethanol:Diethylene Glycol Dimethyl Ether (1:1) Mixed Solution By carrying out the same operation as in Example 1 except that as solvent, instead of 25 ml of 2-methoxyethanol in Example 1, mixed solvent of 12.5 ml of 2-methoxyethanol (produced by Wako Pure Chemical Industries Ltd.) and 12.5 ml of diethylene glycol dimethyl ether (produced by Wako Pure Chemical Industries Ltd.) was used, 2-methoxyethanol and diethylene glycol dimethyl ether (1:1) mixed solution containing 0.5 M of $Mg(OTf)_2$ was prepared. Said solution was referred to as the electrolytic solution 61.

Example 62

Preparation of $Mg(OTf)_2$/2-methoxyethanol:Propylene Carbonate (1:1) Mixed Solution By carrying out the same operation as in Example 1 except that as solvent, instead of 25 ml of 2-methoxyethanol in Example 1, mixed solvent of 12.5 ml of 2-methoxyethanol (produced by Wako Pure Chemical Industries Ltd.) and 12.5 ml of propylene carbonate (produced by Wako Pure Chemical Industries Ltd.) was used, 2-methoxyethanol:propylene carbonate (1:1) mixed solution containing 0.5 M of $Mg(OTf)_2$ was prepared. Said solution was referred to as the electrolytic solution 62.

Example 63

Preparation of Mg(OTf)$_2$/2-methoxyethanol:Acetonitrile (1:1) Mixed Solution

By carrying out the same operation as in Example 1 except that as solvent, instead of 25 ml of 2-methoxyethanol in Example 1, mixed solvent of 12.5 ml of 2-methoxyethanol (produced by Wako Pure Chemical Industries Ltd.) and 12.5 ml of acetonitrile (produced by Wako Pure Chemical Industries Ltd.) was used, 2-methoxyethanol and acetonitrile (1:1) mixed solution containing 0.5 M of Mg(OTf)$_2$ was prepared. Said solution was referred to as the electrolytic solution 63.

Example 64

Preparation of Mg(OTf)$_2$/2-methoxyethanol:γ-butyrolactone (1:1) Mixed Solution By carrying out the same operation as in Example 1 except that as solvent, instead of 25 ml of 2-methoxyethanol in Example 1, mixed solvent of 12.5 ml of 2-methoxyethanol (produced by Wako Pure Chemical Industries Ltd.) and 12.5 ml of γ-butyrolactone (produced by Wako Pure Chemical Industries Ltd.) was used, 2-methoxyethanol and γ-butyrolactone (1:1) mixed solution containing 0.5 M of Mg(OTf)$_2$ was prepared. Said solution was referred to as the electrolytic solution 64.

Example 65

Preparation of Mg(OTf)$_2$/2-methoxyethanol:Ethanol (1:1) Mixed Solution

By carrying out the same operation as in Example 1 except that as solvent, instead of 25 ml of 2-methoxyethanol in Example 1, mixed solvent of 12.5 ml of 2-methoxyethanol (produced by Wako Pure Chemical Industries Ltd.) and 12.5 ml of ethanol (produced by Wako Pure Chemical Industries Ltd.) was used, 2-methoxyethanol and ethanol (1:1) mixed solution containing 0.5 M of Mg(OTf)$_2$ was prepared. Said solution was referred to as the electrolytic solution 65.

Example 66

Preparation of Mg(OTf)$_2$/2-methoxyethanol:Ethyl Acetate (1:1) Mixed Solution

By carrying out the same operation as in Example 1 except that as solvent, instead of 25 ml of 2-methoxyethanol in Example 1, mixed solvent of 12.5 ml of 2-methoxyethanol (produced by Wako Pure Chemical Industries Ltd.) and 12.5 ml of ethyl acetate (produced by Wako Pure Chemical Industries Ltd.) was used, 2-methoxyethanol:ethyl acetate (1:1) mixed solution containing 0.5 M of Mg(OTf)$_2$ was prepared. Said solution was referred to as the electrolytic solution 66.

Example 67

Preparation of Mg(OTf)$_2$/Ethylene Glycol:Acetonitrile (1:1) Mixed Solution

By carrying out the same operation as in Example 1 except that as solvent, instead of 25 ml of 2-methoxyethanol in Example 1, mixed solvent of 12.5 ml of ethylene glycol (produced by Wako Pure Chemical Industries Ltd.) and 12.5 ml of acetonitrile (produced by Wako Pure Chemical Industries Ltd.) was used, ethylene glycol:acetonitrile (1:1) mixed solution containing 0.5 M of Mg(OTf)$_2$ was prepared. Said solution was referred to as the electrolytic solution 67.

Example 68

Preparation of Mg(OTf)$_2$/Ethylene Glycol:Propionitrile (1:1) Mixed Solution

By carrying out the same operation as in Example 1 except that as solvent, instead of 25 ml of 2-methoxyethanol in Example 1, mixed solvent of 12.5 ml of ethylene glycol (produced by Wako Pure Chemical Industries Ltd.) and 12.5 ml of propionitrile (produced by Wako Pure Chemical Industries Ltd.) was used, ethylene glycol and propionitrile (1:1) mixed solution containing 0.5 M of Mg(OTf)$_2$ was prepared. Said solution was referred to as the electrolytic solution 68.

Example 69

Preparation of Mg(OTf)$_2$/2-methoxyethanol:1-ethyl-3-methylimidazolium trifluoromethanesulfonate (1:1) Mixed Solution By carrying out the same operation as in Example 1 except that as solvent, instead of 25 ml of 2-methoxyethanol in Example 1, mixed solvent of 12.5 ml of 2-methoxyethanol (produced by Wako Pure Chemical Industries Ltd.) and 12.5 ml of 1-ethyl-3-methylimidazolium trifluoromethanesulfonate (produced by Wako Pure Chemical Industries Ltd.) was used, 2-methoxyethanol and 1-ethyl-3-methylimidazolium trifluoromethanesulfonate (1:1) mixed solution containing 0.5 M of Mg(OTf)$_2$ was prepared. Said solution was referred to as the electrolytic solution 69.

Example 70

Preparation of Mg(OTf)$_2$/Ethylene Glycol:1-ethyl-3-methylimidazolium trifluoromethanesulfonate (1:1) Mixed Solution By carrying out the same operation as in Example 1 except that as solvent, instead of 25 ml of 2-methoxyethanol in Example 1, mixed solvent of 12.5 ml of ethylene glycol (produced by Wako Pure Chemical Industries Ltd.) and 12.5 ml of 1-ethyl-3-methylimidazolium trifluoromethanesulfonate (produced by Wako Pure Chemical Industries Ltd.) was used, ethylene glycol and 1-ethyl-3-methylimidazolium trifluoromethanesulfonate (1:1) mixed solution containing 0.5 M of Mg(OTf)$_2$ was prepared. Said solution was referred to as the electrolytic solution 70.

Example 71

Preparation of Mg(OTf)$_2$/Ethylene Glycol:Tetraethylammonium Trifluoromethanesulfonate (1:1) Mixed Solution By carrying out the same operation as in Example 1 except that as solvent, instead of 25 ml of 2-methoxyethanol in Example 1, mixed solvent of 12.5 ml of ethylene glycol (produced by Wako Pure Chemical Industries Ltd.) and 12.5 ml of tetraethylammonium trifluoromethanesulfonate (produced by Wako Pure Chemical Industries Ltd.) was used, ethylene glycol and tetraethylammonium trifluoromethanesulfonate (1:1) mixed solution containing 0.5 M of Mg(OTf)$_2$ was prepared. Said solution was referred to as the electrolytic solution 71.

Example 72

Preparation of Magnesium Chloride(MgCl$_2$)/2-methoxyethanol Solution

By carrying out the same operation as in Example 1 except that as supporting electrolyte, instead of 4.84 g of Mg(OTf)$_2$ in Example 1, 1.43 g of MgCl$_2$ (produced by Wako Pure Chemical Industries Ltd.) was used, 2-methoxyethanol solution containing 0.5 M of MgCl$_2$ was prepared. Said solution was referred to as the electrolytic solution 72.

Example 73

Preparation of Magnesium Bromide(MgBr$_2$)/2-methoxyethanol Solution

By carrying out the same operation as in Example 1 except that as supporting electrolyte, instead of 4.84 g of Mg(OTf)$_2$ in Example 1, 2.76 g of MgBr$_2$ (produced by Wako Pure Chemical Industries Ltd.) was used, 2-methoxyethanol solution containing 0.5 M of MgBr$_2$ was prepared. Said solution was referred to as the electrolytic solution 73.

Example 74

Preparation of Magnesium Iodide(MgI$_2$)/2-methoxyethanol Solution

By carrying out the same operation as in Example 1 except that as supporting electrolyte, instead of 4.84 g of Mg(OTf)$_2$ in Example 1, 4.17 g of MgI$_2$ (produced by Wako Pure Chemical Industries Ltd.) was used, 2-methoxyethanol solution containing 0.5 M of MgI$_2$ was prepared. Said solution was referred to as the electrolytic solution 74.

Example 75

Preparation of Magnesium Ethoxide(Mg(OEt)$_2$)/2-methoxyethanol Solution

By carrying out the same operation as in Example 1 except that as supporting electrolyte, instead of 4.84 g of Mg(OTf)$_2$ in Example 1, 1.72 g of Mg(OEt)$_2$ (produced by Wako Pure Chemical Industries Ltd.) was used, 2-methoxyethanol solution containing 0.5 M of Mg(OEt)$_2$ was prepared. Said solution was referred to as the electrolytic solution 75.

Example 76

Preparation of Magnesium Perchlorate(Mg(ClO$_4$)$_2$)/2-methoxyethanol Solution

By carrying out the same operation as in Example 1 except that as supporting electrolyte, instead of 4.84 g of Mg(OTf)$_2$ in Example 1, 3.35 g of Mg(ClO$_4$)$_2$ (produced by Wako Pure Chemical Industries Ltd.) was used, 2-methoxyethanol solution containing 0.5 M of Mg(ClO$_4$)$_2$ was prepared. Said solution was referred to as the electrolytic solution 76.

Example 77

Preparation of Magnesium Trifluoroacetate(Mg(TFAc)$_2$)/2-methoxyethanol Solution By carrying out the same operation as in Example 1 except that as supporting electrolyte, instead of 4.84 g of Mg(OTf)$_2$ in Example 1, 3.76 g of Mg(TFAc)$_2$ (produced by Wako Pure Chemical Industries Ltd.) was used, 2-methoxyethanol solution containing 0.5 M of Mg(TFAc)$_2$ was prepared. Further, as Mg(TFAc)$_2$, the group synthesized from magnesium acetate and trifluoroacetic acid according to the same method as described in Example 1 of JP 2009-269986 A was used. Said solution was referred to as the electrolytic solution 77.

Example 78

Preparation of Magnesium Tetrafluoroborate(Mg(BF$_4$)$_2$)/2-methoxyethanol Solution By carrying out the same operation as in Example 1 except that as supporting electrolyte, instead of 4.84 g of Mg(OTf)$_2$ in Example 1, 2.97 g of Mg(BF$_4$)$_2$ (produced by Wako Pure Chemical Industries Ltd.) was used, 2-methoxyethanol solution containing 0.5 M of Mg(BF$_4$)$_2$ was prepared. Said solution was referred to as the electrolytic solution 78.

Example 79

Preparation of Magnesium tetrafluoroborate(Mg(BF$_4$)$_2$)/Ethylene Glycol Solution By carrying out the same operation as in Example 2 except that as supporting electrolyte, instead of 4.84 g of Mg(OTf)$_2$ in Example 2, 2.97 g of Mg(BF$_4$)$_2$ (produced by Wako Pure Chemical Industries Ltd.) was used, ethylene glycol solution containing 0.5 M of Mg(BF$_4$)$_2$ was prepared. Said solution was referred to as the electrolytic solution 79.

Example 80

Preparation of Magnesium bis(trifluoromethanesulfonyl)imide (Mg(TFSI)$_2$)/Ethylene Glycol Solution By carrying out the same operation as in Example 1 except that as supporting electrolyte, instead of 4.84 g of Mg(OTf)$_2$ in Example 1, 8.80 g of Mg(TFSI)$_2$ (produced by Kishida Chemica Co., Ltd.) was used, 2-methoxyethanol solution containing 0.5 M of Mg(TFSI)$_2$ was prepared. Said solution was referred to as the electrolytic solution 80.

Example 81

Preparation of Magnesium bis(trifluoromethanesulfonyl)imide (Mg(TFSI)$_2$)/Ethylene Glycol Solution By carrying out the same operation as in Example 2 except that as supporting electrolyte, instead of 4.84 g of Mg(OTf)$_2$ in Example 2, 8.80 g of Mg(TFSI)$_2$ (produced by Kishida Chemica Co., Ltd.) was used, ethylene glycol solution containing 0.5 M of Mg(TFSI)$_2$ was prepared. Said solution was referred to as the electrolytic solution 81.

The electrolytic solutions obtained in the above Example 1 to 81 are listed up in the below Table 4 to Table 9.

TABLE 4

| Example No. | Electrolytic Solution No. | Supporting Electrolyte | Solvent Name | Structure of Solvent | Concentration (M) |
|---|---|---|---|---|---|
| Example-1 | Electrolytic Solution-1 | Mg(OTf)$_2$ | 2-Methoxyethanol | 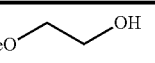 | 0.50 |
| Example-2 | Electrolytic Solution-2 | Mg(OTf)$_2$ | Ethylene glycol | 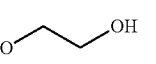 | 0.50 |
| Example-3 | Electrolytic Solution-3 | Mg(OTf)$_2$ | Methyl glycolate | 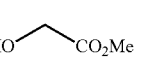 | 0.50 |
| Example-4 | Electrolytic Solution-4 | Mg(OTf)$_2$ | 2-Ethoxyethanol | 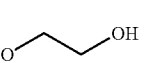 | 0.50 |
| Example-5 | Electrolytic Solution-5 | Mg(OTf)$_2$ | 2-Isopropoxyethanol | 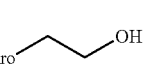 | 0.50 |
| Example-6 | Electrolytic Solution-6 | Mg(OTf)$_2$ | 2-Butoxyethanol | 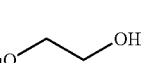 | 0.50 |
| Example-7 | Electrolytic Solution-7 | Mg(OTf)$_2$ | 2-(2-Methoxyethoxy)ethanol | 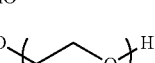 | 0.50 |
| Example-8 | Electrolytic Solution-8 | Mg(OTf)$_2$ | 2-(Hydroxymethyl)tetrahydrofuran | 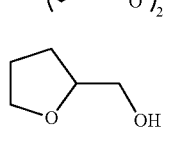 | 0.50 |
| Example-9 | Electrolytic Solution-9 | Mg(OTf)$_2$ | 1-Methoxy-2-propanol | 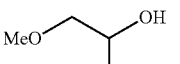 | 0.50 |
| Example-10 | Electrolytic Solution-10 | Mg(OTf)$_2$ | 2-(Benzyloxy)ethanol | 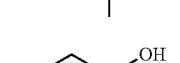 | 0.50 |
| Example-11 | Electrolytic Solution-11 | Mg(OTf)$_2$ | 2-(Phenyloxy)ethanol | 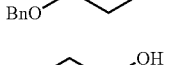 | 0.16 |
| Example-12 | Electrolytic Solution-12 | Mg(OTf)$_2$ | 2-(Pentafluorophenyloxy)ethanol | 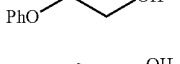 | 0.13 |
| Example-13 | Electrolytic Solution-13 | Mg(OTf)$_2$ | 2-Hydroxyacetic acid ethyl ester | 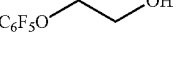 | 0.50 |
| Example-14 | Electrolytic Solution-14 | Mg(OTf)$_2$ | 2-(t-Butyldimethylsilyloxy)ethanol/dimethoxyethane | 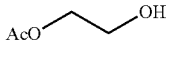 | 0.33 |
| Example 15 | Electrolytic Solution-15 | Mg(OTf)$_2$ | 2-(Allyloxy)ethanol | 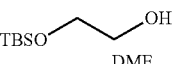 | 0.50 |
| Example-16 | Electrolytic Solution-16 | Mg(OTf)$_2$ | 2-(Vinyloxy)ethanol | 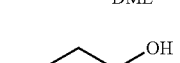 | 0.17 |
| Example-17 | Electrolytic Solution-17 | Mg(OTf)$_2$ | cis-2-Butene-1,4-diol | 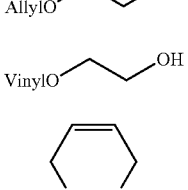 | 0.50 |
| Example-18 | Electrolytic Solution-18 | Mg(OTf)$_2$ | 2-Hydroxyethyl methacrylate | 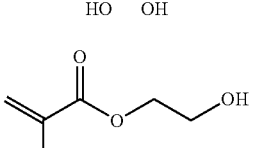 | 0.50 |
| Example-19 | Electrolytic Solution-19 | Mg(OTf)$_2$ | 3-Methoxy-1-propanol | 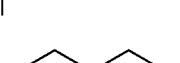 | 0.33 |
| Example-20 | Electrolytic Solution-20 | Mg(OTf)$_2$ | Glycerin | 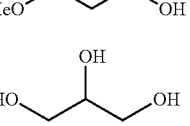 | 0.50 |

TABLE 5

| Example No. | Electrolytic Solution. No. | Supporting Electrolyte | Solvent Name | Structure of Solvent | Concentration (M) |
|---|---|---|---|---|---|
| Example-21 | Electrolytric Solution-21 | Mg(OTf)$_2$ | Propylene glycol | 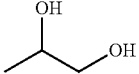 | 0.50 |
| Example-22 | Electrolytric Solution-22 | Mg(OTf)$_2$ | 3-Methoxy-1,2-propanediol | 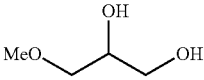 | 0.50 |
| Example-23 | Electrolytric Solution-23 | Mg(OTf)$_2$ | 1,3-Propanediol | 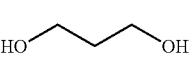 | 0.50 |
| Example-24 | Electrolytric Solution-24 | Mg(OTf)$_2$ | Diethylene glycol | 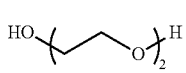 | 0.50 |
| Example-25 | Electrolytric Solution-25 | Mg(OTf)$_2$ | Pinacol/ethylene glycol | 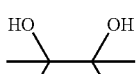 | 0.50 |
| Example-26 | Electrolytric Solution-26 | Mg(OTf)$_2$ | cis-Cyclohexane-1,2-diol/dimethoxyethane | 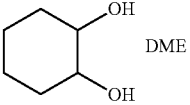 | 0.50 |
| Example-27 | Electrolytric Solution-27 | Mg(OTf)$_2$ | 1,4-Dioxane-2,3-diol/dimethoxyethane | 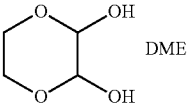 | 0.50 |
| Example-28 | Electrolytric Solution-28 | Mg(OTf)$_2$ | Hydroxyacetone | 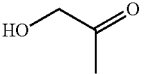 | 0.50 |
| Example-29 | Electrolytric Solution-29 | Mg(OTf)$_2$ | 4-Hydroxy-2-butanone | 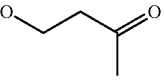 | 0.50 |
| Example-30 | Electrolytric Solution-30 | Mg(OTf)$_2$ | 4-Hydroxy-4-methyl-2-pentanone | 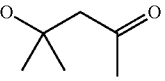 | 0.50 |
| Example-31 | Electrolytric Solution-31 | Mg(OTf)$_2$ | 2-(methanesulfonyl)ethanol | 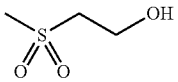 | 0.49 |
| Example-32 | Electrolytric Solution-32 | Mg(OTf)$_2$ | 2-(methylthio)ethanol | 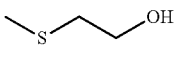 | 0.25 |
| Example-33 | Electrolytric Solution-33 | Mg(OTf)$_2$ | Dimethyl (2-hydroxyethyl) phosphonate | 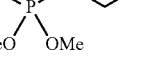 | 0.50 |
| Example-34 | Electrolytric Solution-34 | Mg(OTf)$_2$ | 2-Acetamideethanol | 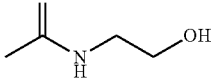 | 0.50 |
| Example-35 | Electrolytric Solution-35 | Mg(OTf)$_2$ | Methylidene glycerol | 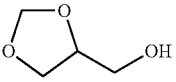 | 0.50 |

TABLE 6

| Example No. | Electrolytic Solution. No. | Supporting Electrolyte | Solvent Name | Structure of Solvent | Concentration (M) |
|---|---|---|---|---|---|
| Example-36 | Electrolytric Solution-36 | $Mg(OTf)_2$ | 4-Hydroxy-1,3-dioxolane-2-one | | 0.50 |
| Example-37 | Electrolytric Solution-37 | $Mg(OTf)_2$ | 2-(Hydroxymethyl) | | 0.05 |
| Example-38 | Electrolytric Solution-38 | $Mg(OTf)_2$ | 2-(Hydroxymethyl) furan | | 0.06 |
| Example-39 | Electrolytric Solution-39 | $Mg(OTf)_2$ | 2-Aminoethanol | | 0.33 |
| Example-40 | Electrolytric Solution-40 | $Mg(OTf)_2$ | 2-(Methylamino) ethanol | | 0.45 |
| Example-41 | Electrolytric Solution-41 | $Mg(OTf)_2$ | 2-(Dimethylamino) ethanol/ethylene glycol | | 0.50 |
| Example-42 | Electrolytric Solution-42 | $Mg(OTf)_2$ | 2-(Hydroxymethyl) pyridine | | 0.50 |
| Example-43 | Electrolytric Solution-43 | $Mg(OTf)_2$ | 2-Pyrrolidinemethanol | | 0.12 |
| Example-44 | Electrolytric Solution-44 | $Mg(OTf)_2$ | 2-(1-Imidazol) ethanol | | 0.50 |
| Example-45 | Electrolytric Solution-45 | $Mg(OTf)_2$ | 3-Hydroxypropionitrile | | 0.45 |
| Example-46 | Electrolytric Solution-46 | $Mg(OTf)_2$ | Methyl lactate | | 0.50 |
| Example-47 | Electrolytric Solution-47 | $Mg(OTf)_2$ | Methyl 2-Hydroxyisobutyrate | | 0.50 |
| Example-48 | Electrolytric Solution-48 | $Mg(OTf)_2$ | Methyl hydroxypivalate | | 0.50 |
| Example-49 | Electrolytric Solution-49 | $Mg(OTf)_2$ | Glycolic acid/ethylene glycol | | 0.50 |
| Example-50 | Electrolytric Solution-50 | $Mg(OTf)_2$ | Lactamide/ethylene | | 0.50 |

TABLE 7

| Example No. | Electrolytic Solution. No. | Supporting Electrolyte | Solvent Name | Structure of Solvent | Concentration (M) |
|---|---|---|---|---|---|
| Example-51 | Electrolytric Solution-51 | $Mg(OTf)_2$ | Pantolactone/ ethylene glycol | 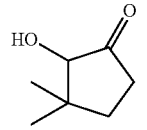 | 0.50 |
| Example-52 | Electrolytric Solution-52 | $Mg(OTf)_2$ | Catecol/ethylene glycol | 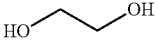 | 0.50 |
| Example-53 | Electrolytric Solution-53 | $Mg(OTf)_2$ | o-Aminophenol/ ethylene glycol | 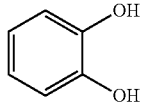 | 0.50 |
| Example-54 | Electrolytric Solution-54 | $Mg(OTf)_2$ | Perfluotopinacol | 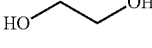 | 0.15 |
| Example 55 | Electrolytric Solution-55 | $Mg(OTf)_2$ | 1H,1H,11H,11H-Dodecafluoro-3, 6,9-trioxaundecane-1,11-diol/ethylene glycol | 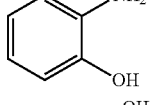 | 0.50 |
| Example-56 | Electrolytric Solution-56 | $Mg(OTf)_2$ | Polyethylene glycol 200 |  | 0.50 |
| Example-57 | Electrolytric Solution-57 | $Mg(OTf)_2$ | 2-Methoxyethanol | 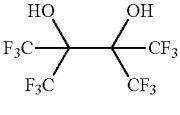 | 1.00 |
| Example-58 | Electrolytric Solution-58 | $Mg(OTf)_2$ | Ethylene glycol | 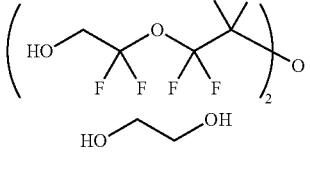 | 1.00 |
| Example-59 | Electrolytric Solution-59 | $Mg(OTf)_2$ | 2-Methoxyethanol/ dimethoxyethane (1:1) | 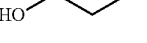 | 0.50 |
| Example-60 | Electrolytric Solution-60 | $Mg(OTf)_2$ | 2-Methoxyethanol/ 2-methyltetra-hydrofuran(1:1) | 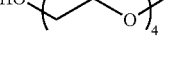 | 0.50 |
| Example-61 | Electrolytric Solution-61 | $Mg(OTf)_2$ | 2-Methoxyethanol/ diethylene glycol dimethyl ether (1:1) | 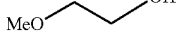 | 0.50 |

TABLE 8

| Example No. | Electrolytic Solution. No. | Supporting electrolyte | Solvent Name | Structure of Solvent | Concentration (M) |
|---|---|---|---|---|---|
| Example-62 | Electrolytic Solution-62 | Mg(OTf)$_2$ | 2-Methoxyethanol/ propylene carbonate(1:1) | 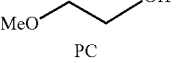 PC | 0.50 |
| Example-63 | Electrolytic Solution-63 | Mg(OTf)$_2$ | 2-Methoxyethanol/ acetonitrile (1:1) | 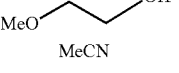 MeCN | 0.50 |
| Example-64 | Electrolytic Solution-64 | Mg(OTf)$_2$ | 2-Methoxyethanol/ γ-butyrolactone | 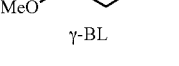 γ-BL | 0.50 |
| Example-65 | Electrolytic Solution-65 | Mg(OTf)$_2$ | 2-Methoxyethanol/ ethanol(1:1) |  EtOH | 0.50 |
| Example-66 | Electrolytic Solution-66 | Mg(OTf)$_2$ | 2-Methoxyethanol/ ethyl acetate (1:1) |  AcOEt | 0.50 |
| Example-67 | Electrolytic Solution-67 | Mg(OTf)$_2$ | Ethylene glycol/acetonitrile (1:1) |  MeCN | 0.50 |
| Example-68 | Electrolytic Solution-68 | Mg(OTf)$_2$ | Ethylene glycol/propionitrile (1:1) |  EtCN | 0.50 |
| Example-69 | Electrolytic Solution-69 | Mg(OTf)$_2$ | 2-Methoxyethanol/ 1-ethyl-3-methyl-imidazolium trifluoromethane sulfonate(1:1) | 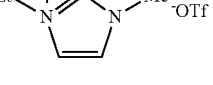 | 0.50 |
| Example-70 | Electrolytic Solution-70 | Mg(OTf)$_2$ | Ethylene glycol/1-ethyl-3-methylimidazolium trifluoromethane sulfonate(1:1) | 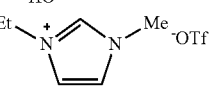 | 0.50 |
| Example-71 | Electrolytic Solution-71 | Mg(OTf)$_2$ | Ethylene glycol/tetraethyl-ammonium trifluoromethane sulfonate(1:1) | 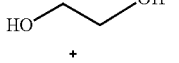 | 0.50 |
| Example-72 | Electrolytic Solution-72 | MgCl$_2$ | 2-Methoxyethanol | 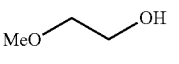 | 0.50 |
| Example-73 | Electrolytic Solution-73 | MgBr$_2$ | 2-Methoxyethanol | 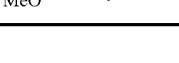 | 0.50 |

TABLE 9

| Example No. | Electrolytic Solution. No. | Supporting Electrolyte | Solvent Name | Structure of Solvent | Concentration (M) |
|---|---|---|---|---|---|
| Example-74 | Electrolytic Solution-74 | MgI$_2$ | 2-Methoxyethanol | 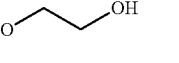 | 0.50 |
| Example-75 | Electrolytic Solution-75 | Mg(OEt)$_2$ | 2-Methoxyethanol | 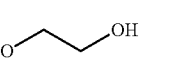 | 0.50 |
| Example-76 | Electrolytic Solution-76 | Mg(ClO$_4$)$_2$ | 2-Methoxyethanol | 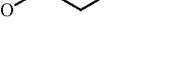 | 0.50 |
| Example-77 | Electrolytic Solution-77 | Mg(TFA)$_2$ | 2-Methoxyethanol |  | 0.50 |

TABLE 9-continued

| Example No. | Electrolytic Solution. No. | Supporting Electrolyte | Solvent Name | Structure of Solvent | Concentration (M) |
|---|---|---|---|---|---|
| Example-78 | Electrolytric Solution-78 | $Mg(BF_4)_2$ | 2-Methoxyethanol | 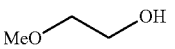 | 0.50 |
| Example-79 | Electrolytric Solution-79 | $Mg(BF_4)_2$ | Ethylene glycol | 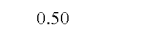 | 0.50 |
| Example-80 | Electrolytric Solution-80 | $Mg(TFSI)_2$ | 2-Methoxyethanol | 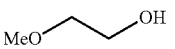 | 0.50 |
| Example-81 | Electrolytric Solution-81 | $Mg(TFSI)_2$ | Ethylene glycol | 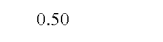 | 0.50 |

Example 82

Cyclic Voltammetry (CV) Measurement Using the Electrolytic Solution 1

CV measurement was performed using the electrolytic solution 1 to examine electric characteristics of the electrolytic solution 1.

Specifically, using a three-pole type beaker cell, magnesium (0.5 cm²), vanadium pentaoxide ($V_2O_5$) doped with sulfur and magnesium were used for a working electrode, a counter electrode and a reference electrode, respectively. In addition, 2 ml of the electrolytic solution 1 was added into the beaker and the measurement wa performed under conditions of at room temperature (20° C.), a sweep rate of 5 mV/s, and in a range of −1.5 to 1 V. It should be noted that the sweep was performed three cycles. Results thereof are shown in FIG. 1.

In FIG. 1, the horizontal axis (V) shows potential difference of the working electrode, based on potential of the reference electrode, and the vertical axis (mA/cm²) shows a current density obtained by dividing a current value observed at each potential with surface area of the working electrode (the horizontal axis and the vertical axis in graphs of CV measurement shown below represent the same values).

From the results of FIG. 1, oxidation current is observed accompanying with dissolution of magnesium from the working electrode from the vicinity of 0.5 V, and current density at the vicinity of 1 V was about 13.0 mA/cm². On the other hand, reduction current is observed accompanying with deposition of magnesium at the working electrode from the vicinity of −1 V, and current density at the vicinity of −1.5 V was about −9.0 mA/cm². Therefore, it has been clarified that by using the electrolytic solution 1, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 83

Evaluation of Oxidation Resistance of the Electrolytic Solution 1

CV measurement was performed using the electrolytic solution 1, similarly as in Example 82, except by setting a sweep rate of 10 mV/s, and a voltage range of −1.5 to 4.2 V. Results thereof are shown in FIG. 2.

Figure 2:
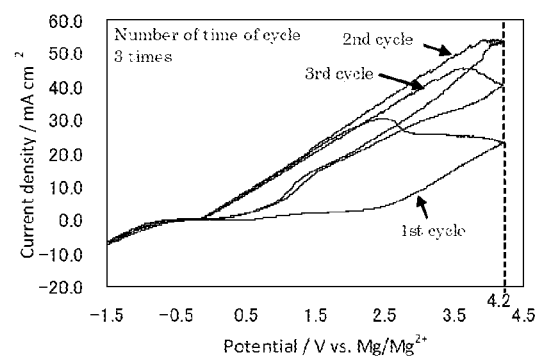
FIG. 2 represents a graph of CV measurement using the electrolytic solution 1 ((Mg(OTf)$_2$)/2-methoxyethanol solution), in which measurement range is enlarged to 4.2 V, obtained from Example 83.

As is clear from the results of FIG. 2, even in the case of applying the voltage up to 4.2 V under the sweep rate of 10 mV/s, only oxidation current is observed accompanying with dissolution of magnesium was observed, without observation of an inflection point in the cyclic voltammogram, and thus significant current increase derived from oxidative decomposition of the electrolytic solution, was not observed. In addition, it has been clarified that decomposition of the electrolytic solution was not generated within a voltage range measured, due to the fact that decrease in current density was not observed, even in sweep at or subsequent to the second cycle. That is, decomposition voltage was considered to be 4.2 V or higher. This value is sufficiently high value, as compared with decomposition voltage (2.3 V) of the electrolytic solution, where $Mg(ZR^1{}_lR^2{}_mX_n)_2$ (wherein z represents an aluminum, $R^1$ represents an ethyl group, $R^2$ represents a buthyl group and X represents a chlorine, respectively) is dissolved in THF, described in the PATENT LITERATURE 1 and NON PATENT LITERATURE 1; or decomposition voltage (3.8 V) of the electrolytic solution, where an aromatic Grignard's reagent was dissolved in THF, described in the PATENT LITERATURE 2.

Example 84

Cyclic Voltammetry (CV) Measurement Using the Electrolytic Solution 2

CV measurement was performed similarly as the method in Example 82, except by using the electrolytic solution 2 as the electrolytic solution. Results thereof are shown in FIG. 3.

Figure 3:
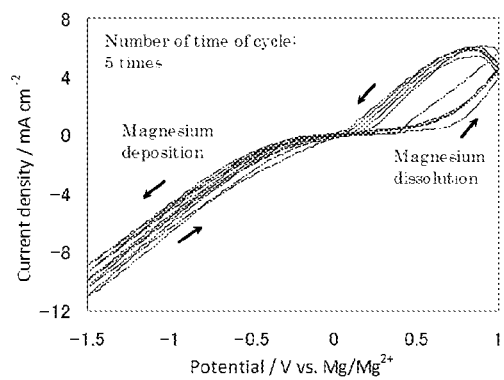
FIG. 3 represents a graph of CV measurement using the electrolytic solution 2 (Mg(OTf)$_2$/ethylene glycol solution), obtained from Example 84.

As is clear from the results of FIG. 3, oxidation current is observed accompanying with dissolution of magnesium from the vicinity of 0.5 V, and current density at the vicinity of 1 V was about 6.0 mA/cm². On the other hand, reduction current is observed accompanying with deposition of magnesium from the vicinity of −0.3 V, and current density at the vicinity of −1.5 V was about −11.0 mA/cm². Therefore, it has been clarified that by using the electrolytic solution 2, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 85

Cyclic Voltammetry (CV) Measurement Using the Electrolytic Solution 3

CV measurement was performed similarly as the method in Example 82, except by using the electrolytic solution 3 as the electrolytic solution. Results thereof are shown in FIG. 4.

Figure 4:
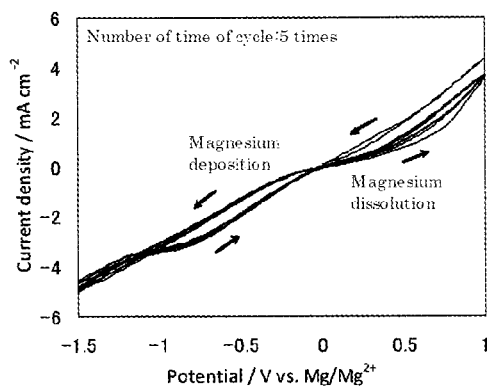
FIG. 4 represents a graph of CV measurement using the electrolytic solution 3 (Mg(OTf)$_2$/methyl glycolate solution), obtained from Example 85.

As is clear from the results of FIG. 4, oxidation current is observed accompanying with dissolution of magnesium from the vicinity of 0.2 V, and current density at the vicinity of 1 V was about 4.0 mA/cm$^2$. On the other hand, reduction current is observed accompanying with deposition of magnesium from the vicinity of −0.2 V, and current density at the vicinity of −1.5 V was about −5.0 mA/cm$^2$. Therefore, it has been clarified that by using the electrolytic solution 3, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 86

Cyclic Voltammetry (CV) Measurement Using the Electrolytic Solution 4

CV measurement was performed similarly as the method in Example 82, except by using the electrolytic solution 4 as the electrolytic solution. Results thereof are shown in FIG. 5.

Figure 5:
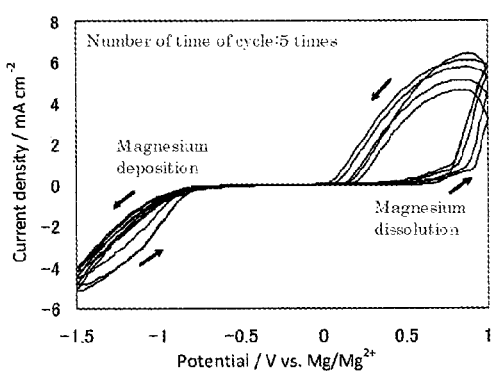
FIG. 5 represents a graph of CV measurement using the electrolytic solution 4 (Mg(OTf)$_2$/2-ethoxyethanol solution), obtained from Example 86.

As is clear from the results of FIG. 5, oxidation current is observed accompanying with dissolution of magnesium from the vicinity of 0.7 V, and current density at the vicinity of 1 V was about 6.4 mA/cm$^2$. On the other hand, reduction current is observed accompanying with deposition of magnesium from the vicinity of −0.7 V, and current density at the vicinity of −1.5 V was about −5.1 mA/cm$^2$. Therefore, it has been clarified that by using the electrolytic solution 4, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 87

Cyclic Voltammetry (CV) Measurement Using the Electrolytic Solution 7

CV measurement was performed similarly as the method in Example 82, except by using the electrolytic solution 7 as the electrolytic solution. Results thereof are shown in FIG. 6.

Figure 6:
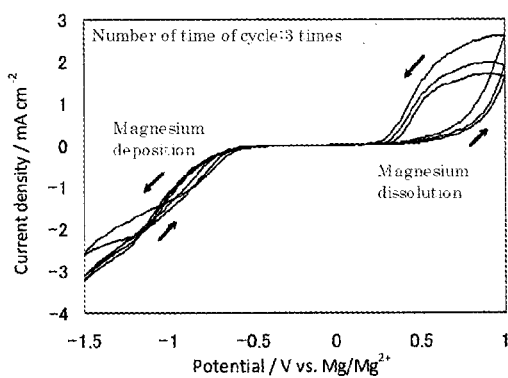
FIG. 6 represents a graph of CV measurement using the electrolytic solution 7 (Mg(OTf)$_2$/2-(2-methoxyethoxy)ethanol solution), obtained from Example 87.

As is clear from the results of FIG. 6, oxidation current is observed accompanying with dissolution of magnesium from the vicinity of 0.5 V, and current density at the vicinity of 1 V was about 2.6 mA/cm$^2$. On the other hand, reduction current is observed accompanying with deposition of magnesium from the vicinity of −0.7 V, and current density at the vicinity of −1.5 V was about −3.0 mA/cm$^2$. Therefore, it has been clarified that by using the electrolytic solution 7, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 88

Cyclic Voltammetry (CV) Measurement Using the Electrolytic Solution 9

CV measurement was performed similarly as the method in Example 82, except by using the electrolytic solution 9 as the electrolytic solution. Results thereof are shown in FIG. 7.

Figure 7:
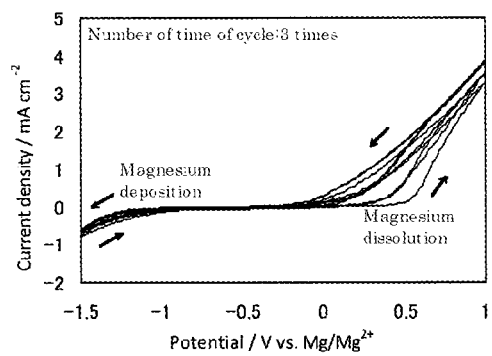
FIG. 7 represents a graph of CV measurement using the electrolytic solution 9 (Mg(OTf)$_2$/1-methoxy-2-propanol solution), obtained from Example 88.

As is clear from the results of FIG. 7, oxidation current is observed accompanying with dissolution of magnesium from the vicinity of 0.5 V, and current density at the vicinity of 1 V was about 3.8 mA/cm$^2$. On the other hand, reduction current is observed accompanying with deposition of magnesium from the vicinity of −1.0 V, and current density at the vicinity of −1.5 V was about −1.0 mA/cm$^2$. Therefore, it has been clarified that by using the electrolytic solution 9, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 89

Cyclic Voltammetry (CV) Measurement Using the Electrolytic Solution 13

CV measurement was performed similarly as the method in Example 82, except by using the electrolytic solution 13 as the electrolytic solution. Results thereof are shown in FIG. 8.

Figure 8:
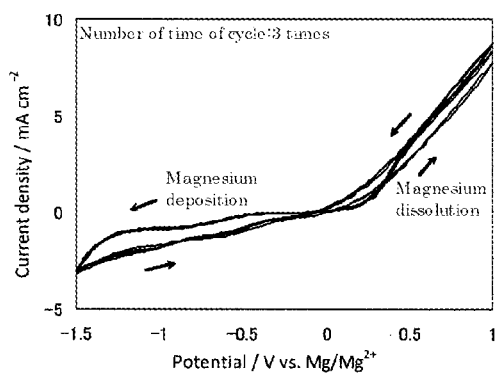
FIG. 8 represents a graph of CV measurement using the electrolytic solution 13 (Mg(OTf)$_2$/acetic acid-2-hydroxyethyl ester solution), obtained from Example 89.

As is clear from the results of FIG. 8, oxidation current is observed accompanying with dissolution of magnesium from the vicinity of 0.3 V, and current density at the vicinity of 1 V was about 8.8 mA/cm$^2$. On the other hand, reduction current is observed accompanying with deposition of magnesium from the vicinity of −0.5 V, and current density at the vicinity of −1.5 V was about −3.2 mA/cm$^2$. Therefore, it has been clarified that by using the electrolytic solution 13, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 90

Cyclic Voltammetry (CV) Measurement Using the Electrolytic Solution 15

CV measurement was performed similarly as the method in Example 82, except by using the electrolytic solution 15 as the electrolytic solution. Results thereof are shown in FIG. 9.

Figure 9:
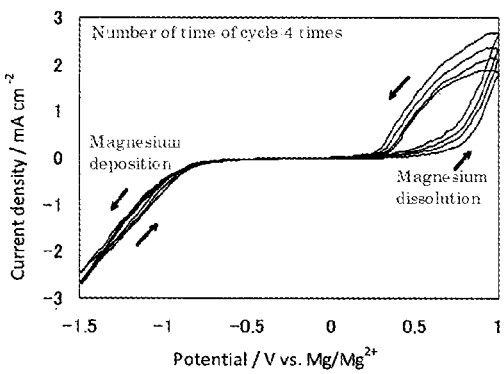
FIG. 9 represents a graph of CV measurement using the electrolytic solution 15 (Mg(OTf)$_2$/2-(allyloxy)ethanol), obtained from Example 90.

As is clear from the results of FIG. 9, oxidation current is observed accompanying with dissolution of magnesium from the vicinity of 0.7 V, and current density at the vicinity of 1 V was about 2.7 mA/cm$^2$. On the other hand, reduction current is observed accompanying with deposition of magnesium from the vicinity of −1.0 V, and current density at the vicinity of −1.5 V was about −2.7 mA/cm$^2$. Therefore, it has been clarified that by using the electrolytic solution 15, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 91

Cyclic Voltammetry (CV) Measurement Using the Electrolytic Solution 17

CV measurement was performed similarly as the method in Example 82, except by using the electrolytic solution 17 as the electrolytic solution. Results thereof are shown in FIG. 10.

Figure 10:
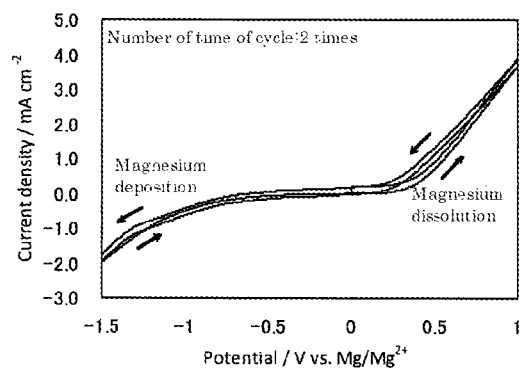
FIG. 10 represents a graph of CV measurement using the electrolytic solution 17 (Mg(OTf)$_2$/cis-2-butene-1,4-diol solution), obtained from Example 91.

As is clear from the results of FIG. 10, oxidation current is observed accompanying with dissolution of magnesium from the vicinity of 0.3 V, and current density at the vicinity of 1.0 V was about 3.7 mA/cm$^2$. On the other hand, reduction current is observed accompanying with deposition of magnesium from the vicinity of −0.5 V, and current density at the vicinity of −1.5 V was about −2.0 mA/cm$^2$. Therefore, it has been clarified that by using the electrolytic solution 17, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 92

Cyclic Voltammetry (CV) Measurement Using the Electrolytic Solution 25

CV measurement was performed similarly as the method in Example 82, except by using the electrolytic solution 25 as the electrolytic solution. Results thereof are shown in FIG. 11.

Figure 11:
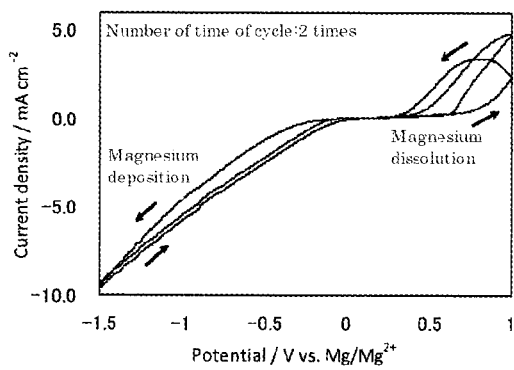
FIG. 11 represents a graph of CV measurement using the electrolytic solution 25 (Mg(OTf)$_2$/pinacol:ethylene glycol mixed solution), obtained from Example 92.

As is clear from the results of FIG. 11, oxidation current is observed accompanying with dissolution of magnesium from the vicinity of 0.6 V, and current density at the vicinity of 1.0 V was about 4.8 mA/cm$^2$. On the other hand, reduction current is observed accompanying with deposition of magnesium from the vicinity of −0.2 V, and current density at the vicinity of −1.5 V was about −9.6 mA/cm$^2$. Therefore, it has been clarified that by using the electrolytic solution 25, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 93

Cyclic Voltammetry (CV) Measurement Using the Electrolytic Solution 28

CV measurement was performed similarly as the method in Example 82, except by using the electrolytic solution 28 as the electrolytic solution. Results thereof are shown in FIG. 12.

Figure 12:
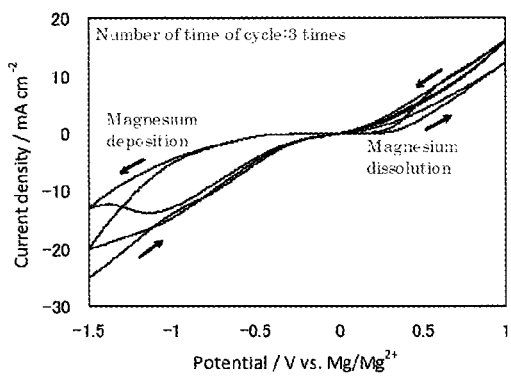
FIG. 12 represents a graph of CV measurement using the electrolytic solution 28 (Mg(OTf)$_2$/hydroxyacetone solution), obtained from Example 93.

As is clear from the results of FIG. 12, oxidation current is observed accompanying with dissolution of magnesium from the vicinity of 0.3 V, and current density at the vicinity of 1.0 V was about 15.4 mA/cm$^2$. On the other hand, reduction current is observed accompanying with deposition of magnesium from the vicinity of −0.5 V, and current density at the vicinity of −1.5 V was about −25.0 mA/cm$^2$. Therefore, it has been clarified that by using the electrolytic solution 28, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 94

Cyclic Voltammetry (CV) Measurement Using the Electrolytic Solution 29

CV measurement was performed similarly as the method in Example 82, except by using the electrolytic solution 29 as the electrolytic solution. Results thereof are shown in FIG. 13.

Figure 13:
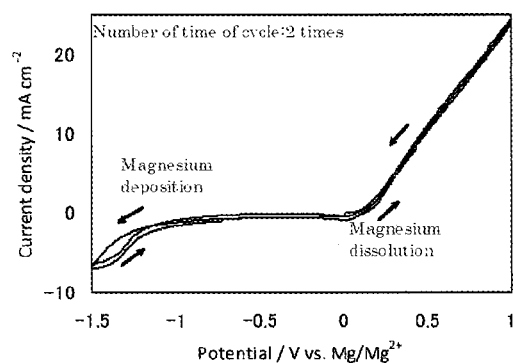
FIG. 13 represents a graph of CV measurement using the electrolytic solution 29 (Mg(OTf)$_2$/4-hydroxy-2-butanone solution), obtained from Example 94.

As is clear from the results of FIG. 13, oxidation current is observed accompanying with dissolution of magnesium from the vicinity of 0.2 V, and current density at the vicinity of 1.0 V was about 24.4 mA/cm$^2$. On the other hand, reduction current is observed accompanying with deposition of magnesium from the vicinity of −0.7 V, and current density at the vicinity of −1.5 V was about −6.3 mA/cm$^2$. Therefore, it has been clarified that by using the electrolytic solution 29, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 95

Cyclic Voltammetry (CV) Measurement Using the Electrolytic Solution 33

CV measurement was performed similarly as the method in Example 82, except by using the electrolytic solution 33 as the electrolytic solution. Results thereof are shown in FIG. 14.

Figure 14:
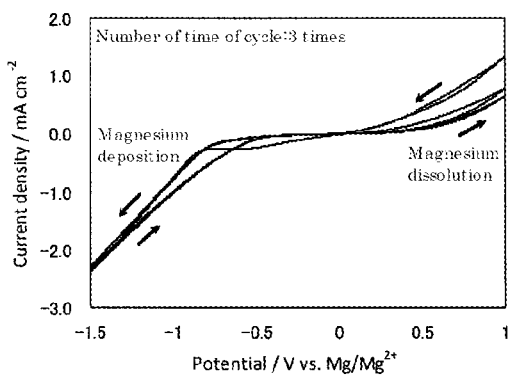
FIG. 14 represents a graph of CV measurement using the electrolytic solution 33 (Mg(OTf)$_2$/dimethyl (2-hydroxyethyl)phosphonate solution), obtained from Example 95.

As is clear from the results of FIG. 14, oxidation current is observed accompanying with dissolution of magnesium from the vicinity of 0.5 V, and current density at the vicinity of 1.0 V was about 1.3 mA/cm$^2$. On the other hand, reduction current is observed accompanying with deposition of magnesium from the vicinity of −0.7 V, and current density at the vicinity of −1.5 V was about −2.3 mA/cm$^2$. Therefore, it has been clarified that by using the electrolytic solution 33, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 96

Cyclic Voltammetry (CV) Measurement Using the Electrolytic Solution 41

CV measurement was performed similarly as the method in Example 82, except by using the electrolytic solution 41 as the electrolytic solution. Results thereof are shown in FIG. 15.

Figure 15:
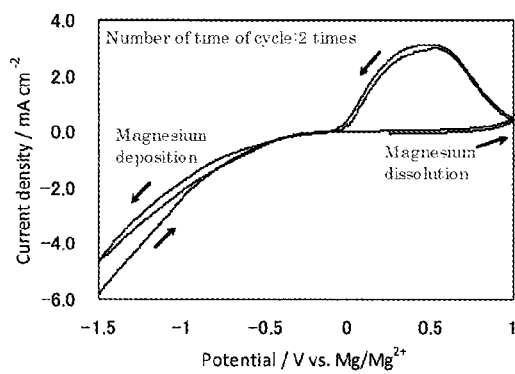
FIG. 15 represents a graph of CV measurement using the electrolytic solution 41 (Mg(OTf)$_2$/2-(dimethylamino)ethanol solution), obtained from Example 96.

As is clear from the results of FIG. 15, oxidation current is observed accompanying with dissolution of magnesium from the vicinity of 0.7 V, and current density at the vicinity of 1.0 V was about 4.7 mA/cm$^2$. On the other hand, reduction current is observed accompanying with deposition of magnesium from the vicinity of −0.3 V, and current density at the vicinity of −1.5 V was about −5.8 mA/cm$^2$. Therefore, it has been clarified that by using the electrolytic solution 41, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 97

Cyclic Voltammetry (CV) Measurement Using the Electrolytic Solution 45

CV measurement was performed similarly as the method in Example 82, except by using the electrolytic solution 45 as the electrolytic solution. Results thereof are shown in FIG. 16.

Figure 16:
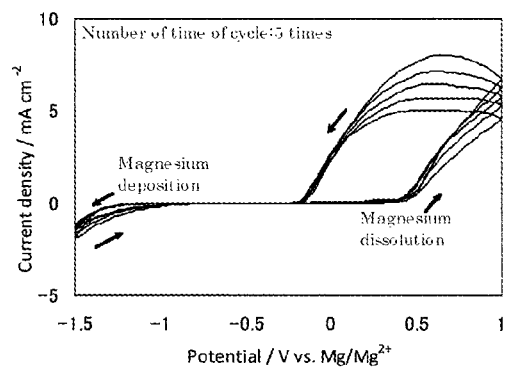
FIG. 16 represents a graph of CV measurement using the electrolytic solution 45 (Mg(OTf)$_2$/3-hydroxypropionitrile solution), obtained from Example 97.

As is clear from the results of FIG. 16, oxidation current is observed accompanying with dissolution of magnesium from the vicinity of 0.4 V, and current density at the vicinity of 1.0 V was about 6.7 mA/cm$^2$. On the other hand, reduction current is observed accompanying with deposition of magnesium from the vicinity of −1.2 V, and current density at the vicinity of −1.5 V was about −1.8 mA/cm$^2$. Therefore, it has been clarified that by using the electrolytic solution 45, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 98

Cyclic Voltammetry (CV) Measurement Using the Electrolytic Solution 46

CV measurement was performed similarly as the method in Example 82, except by using the electrolytic solution 46 as the electrolytic solution. Results thereof are shown in FIG. 17.

Figure 17:
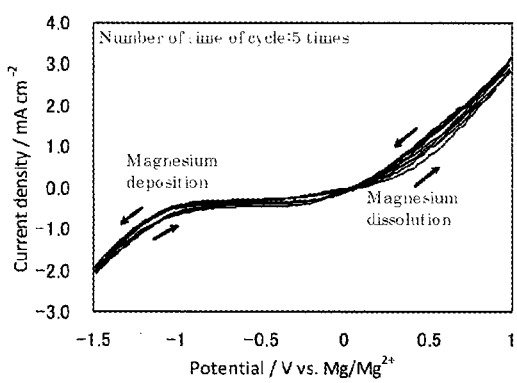
FIG. 17 represents a graph of CV measurement using the electrolytic solution 46 (Mg(OTf)$_2$/methyl lactate solution), obtained from Example 98.

As is clear from the results of FIG. 17, oxidation current is observed accompanying with dissolution of magnesium from the vicinity of 0.1 V, and current density at the vicinity of 1.0 V was about 3.1 mA/cm$^2$. On the other hand, reduction current is observed accompanying with deposition of magnesium from the vicinity of −0.1 V, and current density at the vicinity of −1.5 V was about −2.0 mA/cm$^2$. Therefore, it has been clarified that by using the electrolytic solution 46, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 99

Cyclic Voltammetry (CV) Measurement Using the Electrolytic Solution 49

CV measurement was performed similarly as the method in Example 82, except by using the electrolytic solution 49 as the electrolytic solution. Results thereof are shown in FIG. 18.

Figure 18:
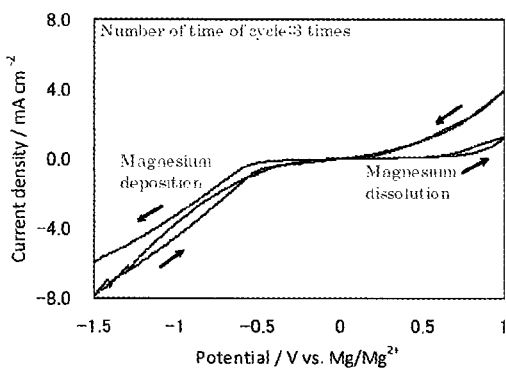
FIG. 18 represents a graph of CV measurement using the electrolytic solution 49 (Mg(OTf)$_2$/glycolic acid:ethylene glycol mixed solution), obtained from Example 99.

As is clear from the results of FIG. 18, oxidation current is observed accompanying with dissolution of magnesium from the vicinity of 0.7 V, and current density at the vicinity of 1.0 V was about 4.0 mA/cm$^2$. On the other hand, reduction current is observed accompanying with deposition of magnesium from the vicinity of −0.6 V, and current density at the vicinity of −1.5 V was about −7.9 mA/cm$^2$. Therefore, it has been clarified that by using the electrolytic solution 49, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 100

Cyclic Voltammetry (CV) Measurement Using the Electrolytic Solution 50

CV measurement was performed similarly as the method in Example 82, except by using the electrolytic solution 50 as the electrolytic solution. Results thereof are shown in FIG. 19.

Figure 19:
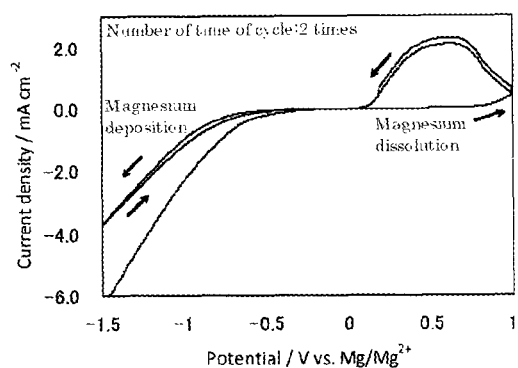
FIG. 19 represents a graph of CV measurement using the electrolytic solution 50 (Mg(OTf)$_2$/lactamide:ethylene glycol mixed solution), obtained from Example 100.

As is clear from the results of FIG. 19, oxidation current is observed accompanying with dissolution of magnesium from the vicinity of 0.8 V, and current density at the vicinity of 1.0 V was about 2.1 mA/cm$^2$. On the other hand, reduction current is observed accompanying with deposition of magnesium from the vicinity of −0.6 V, and current density at the vicinity of −1.5 V was about −6.4 mA/cm$^2$. Therefore, it has been clarified that by using the electrolytic solution 50, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 101

Cyclic Voltammetry (CV) Measurement Using the Electrolytic Solution 51

CV measurement was performed similarly as the method in Example 82, except by using the electrolytic solution 51 as the electrolytic solution. Results thereof are shown in FIG. 20.

Figure 20:
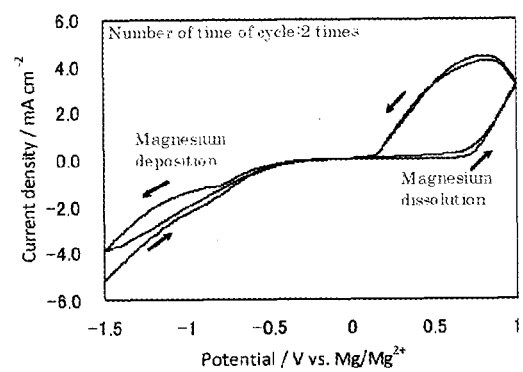
FIG. 20 represents a graph of CV measurement using the electrolytic solution 51 (Mg(OTf)$_2$/pantolactone:ethylene glycol mixed solution), obtained from Example 101.

As is clear from the results of FIG. 20, oxidation current is observed accompanying with dissolution of magnesium from the vicinity of 0.7 V, and current density at the vicinity of 1.0 V was about 4.4 mA/cm$^2$. On the other hand, reduction current is observed accompanying with deposition of magnesium from the vicinity of −0.3 V, and current density at the vicinity of −1.5 V was about −5.2 mA/cm$^2$. Therefore, it has been clarified that by using the electrolytic solution 51, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 102

Cyclic Voltammetry (CV) Measurement Using the Electrolytic Solution 52

CV measurement was performed similarly as the method in Example 82, except by using the electrolytic solution 52 as the electrolytic solution. Results thereof are shown in FIG. 21.

Figure 21:
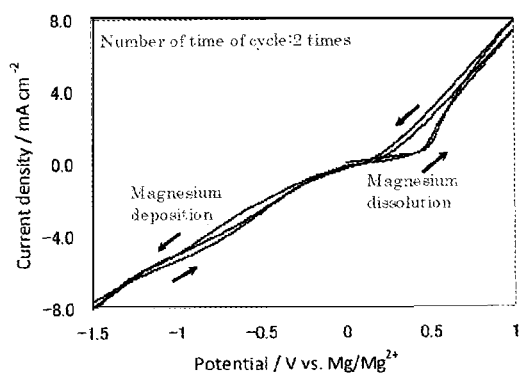
FIG. 21 represents a graph of CV measurement using the electrolytic solution 52 (Mg(OTf)$_2$/catechol:ethylene glycol mixed solution), obtained from Example 102.

As is clear from the results of FIG. 21, oxidation current is observed accompanying with dissolution of magnesium from the vicinity of 0.4 V, and current density at the vicinity of 1.0 V was about 7.0 mA/cm$^2$. On the other hand, reduction current is observed accompanying with deposition of magnesium from the vicinity of −0.1 V, and current density at the vicinity of −1.5 V was about −8.0 mA/cm$^2$. Therefore, it has been clarified that by using the electrolytic solution 52, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 103

Cyclic Voltammetry (CV) Measurement Using the Electrolytic Solution 53

CV measurement was performed similarly as the method in Example 82, except by using the electrolytic solution 53 as the electrolytic solution. Results thereof are shown in FIG. 22.

Figure 22:
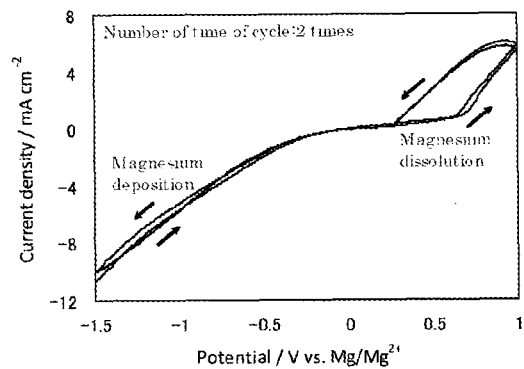
FIG. 22 represents a graph of CV measurement using the electrolytic solution 53 (Mg(OTf)$_2$%-aminophenol:ethylene glycol mixed solution), obtained from Example 103.

As is clear from the results of FIG. 22, oxidation current is observed accompanying with dissolution of magnesium from the vicinity of 0.6 V, and current density at the vicinity of 1.0 V was about 6.0 mA/cm². On the other hand, reduction current is observed accompanying with deposition of magnesium from the vicinity of −0.3 V, and current density at the vicinity of −1.5 V was about −10.7 mA/cm². Therefore, it has been clarified that by using the electrolytic solution 53, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 104

Cyclic Voltammetry (CV) Measurement Using the Electrolytic Solution 55

CV measurement was performed similarly as the method in Example 82, except by using the electrolytic solution 55 as the electrolytic solution. Results thereof are shown in FIG. 23.

Figure 23:
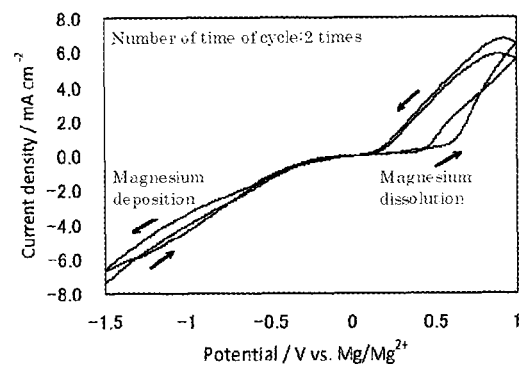
FIG. 23 represents a graph of CV measurement using the electrolytic solution 55 (Mg(OTf)$_2$/1H,1H,11H,11H-dodecafluoro-3,6,9-trioxaundecane-1,11-diol:ethylene glycol mixed solution), obtained from Example 104.

As is clear from the results of FIG. 23, oxidation current is observed accompanying with dissolution of magnesium from the vicinity of 0.6 V, and current density at the vicinity of 1.0 V was about 6.8 mA/cm². On the other hand, reduction current is observed accompanying with deposition of magnesium from the vicinity of −0.3 V, and current density at the vicinity of −1.5 V was about −7.4 mA/cm². Therefore, it has been clarified that by using the electrolytic solution 55, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 105

Cyclic Voltammetry (CV) Measurement Using the Electrolytic Solution 57

CV measurement was performed similarly as the method in Example 82, except by using the electrolytic solution 57 as the electrolytic solution. Results thereof are shown in FIG. 24.

Figure 24:
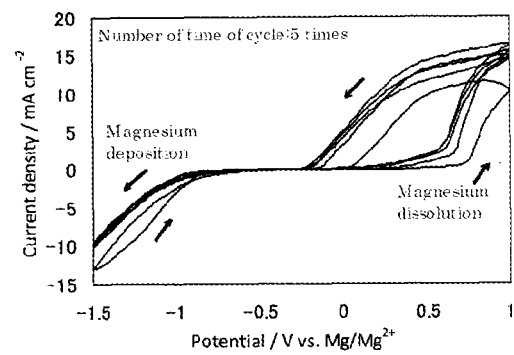
FIG. 24 represents a graph of CV measurement using the electrolytic solution 57 (Mg(OTf)$_2$/2-methoxyethanol 1.0 M solution), obtained from Example 105.

As is clear from the results of FIG. 24, oxidation current is observed accompanying with dissolution of magnesium from the vicinity of 0.5 V, and current density at the vicinity of 1.0 V was about 16.3 mA/cm². On the other hand, reduction current is observed accompanying with deposition of magnesium from the vicinity of −0.7 V, and current density at the vicinity of −1.5 V was about −13.0 mA/cm². Therefore, it has been clarified that by using the electrolytic solution 57, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 106

Cyclic Voltammetry (CV) Measurement Using the Electrolytic Solution 58

CV measurement was performed similarly as the method in Example 82, except by using the electrolytic solution 58 as the electrolytic solution. Results thereof are shown in FIG. 25.

Figure 25:
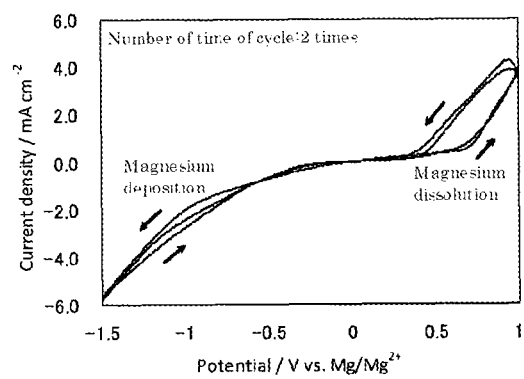
FIG. 25 represents a graph of CV measurement using the electrolytic solution 58 (Mg(OTf)$_2$/ethylene glycol 1.0 M solution), obtained from Example 106.

As is clear from the results of FIG. 25, oxidation current is observed accompanying with dissolution of magnesium from the vicinity of 0.3 V, and current density at the vicinity of 1.0 V was about 4.1 mA/cm². On the other hand, reduction current is observed accompanying with deposition of magnesium from the vicinity of −0.3 V, and current density at the vicinity of −1.5 V was about −5.8 mA/cm². Therefore, it has been clarified that by using the electrolytic solution 58, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle. Further, it has also been found that high concentration of supporting electrolyte caused increase of viscosity and thereby current density was decreased because the results of FIG. 25 gave lower current density compared with the example 84.

Example 107

Cyclic Voltammetry (CV) Measurement Using the Electrolytic Solution 59

CV measurement was performed similarly as the method in Example 82, except by using the electrolytic solution 59 as the electrolytic solution. Results thereof are shown in FIG. 26.

Figure 26:
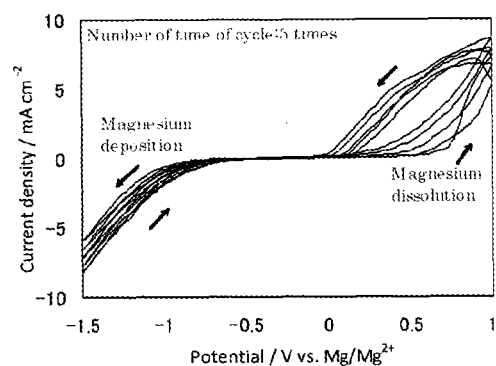
FIG. 26 represents a graph of CV measurement using the electrolytic solution 59 (Mg(OTf)$_2$/2-methoxyethaol:dimethoxyethane (1:1) mixed solution), obtained from Example 107.

As is clear from the results of FIG. 26, oxidation current is observed accompanying with dissolution of magnesium from the vicinity of 0.5 V, and current density at the vicinity of 1.0 V was about 8.6 mA/cm². On the other hand, reduction current is observed accompanying with deposition of magnesium from the vicinity of −0.6 V, and current density at the vicinity of −1.5 V was about −7.6 mA/cm². Therefore, it has been clarified that by using the electrolytic solution 59, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 108

Cyclic Voltammetry (CV) Measurement Using the Electrolytic Solution 60

CV measurement was performed similarly as the method in Example 82, except by using the electrolytic solution 60 as the electrolytic solution. Results thereof are shown in FIG. 27.

Figure 27:
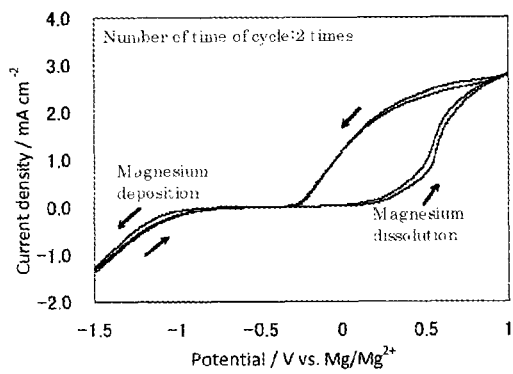
FIG. 27 represents a graph of CV measurement using the electrolytic solution 60 (Mg(OTf)$_2$/2-methoxyethaol:2-methyltetrahydrofuran (1:1) mixed solution), obtained from Example 108.

As is clear from the results of FIG. 27, oxidation current is observed accompanying with dissolution of magnesium from the vicinity of 0.5 V, and current density at the vicinity of 1.0 V was about 2.8 mA/cm². On the other hand, reduction current is observed accompanying with deposition of magnesium from the vicinity of −0.6 V, and current density at the vicinity of −1.5 V was about −1.3 mA/cm². Therefore, it has been clarified that by using the electrolytic solution 60, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 109

Cyclic Voltammetry (CV) Measurement Using the Electrolytic Solution 61

CV measurement was performed similarly as the method in Example 82, except by using the electrolytic solution 61 as the electrolytic solution. Results thereof are shown in FIG. 28.

Figure 28:
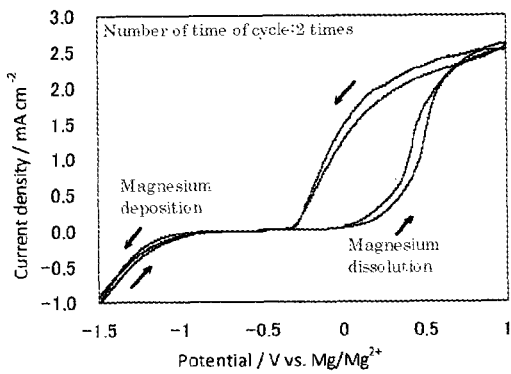
FIG. 28 represents a graph of CV measurement using the electrolytic solution 61 (Mg(OTf)$_2$/2-methoxyethanol:diethylene glycol dimethyl ether (1:1) mixed solution), obtained from Example 109.

As is clear from the results of FIG. 28, oxidation current is observed accompanying with dissolution of magnesium from the vicinity of 0.5 V, and current density at the vicinity of 1.0 V was about 2.6 mA/cm$^2$. On the other hand, reduction current is observed accompanying with deposition of magnesium from the vicinity of −0.6 V, and current density at the vicinity of −1.5 V was about −1.0 mA/cm$^2$. Therefore, it has been clarified that by using the electrolytic solution 61, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 110

Cyclic Voltammetry (CV) Measurement Using the Electrolytic Solution 62

Figure 29:
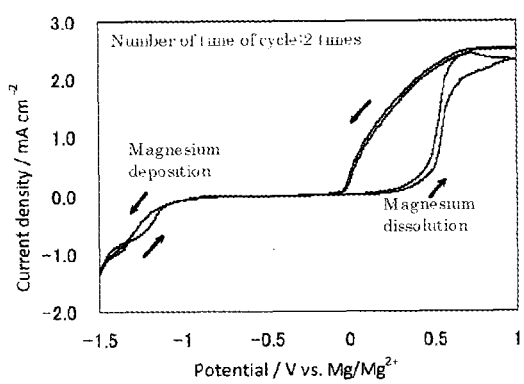
FIG. 29 represents a graph of CV measurement using the electrolytic solution 62 (Mg(OTf)$_2$/2-methoxyethanol:propylene carbonate (1:1) mixed solution), obtained from Example 110.

CV measurement was performed similarly as the method in Example 82, except by using the electrolytic solution 62 as the electrolytic solution. Results thereof are shown in FIG. 29.
As is clear from the results of FIG. 29, oxidation current is observed accompanying with dissolution of magnesium from the vicinity of 0.5 V, and current density at the vicinity of 1.0 V was about 2.5 mA/cm$^2$. On the other hand, reduction current is observed accompanying with deposition of magnesium from the vicinity of −0.6 V, and current density at the vicinity of −1.5 V was about −1.4 mA/cm$^2$. Therefore, it has been clarified that by using the electrolytic solution 62, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 111

Cyclic Voltammetry (CV) Measurement Using the Electrolytic Solution 63

Figure 30:
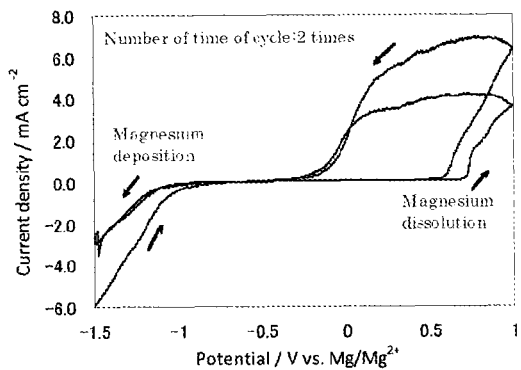
FIG. 30 represents a graph of CV measurement using the electrolytic solution 63 (Mg(OTf)$_2$/2-methoxyethanol:acetonitrile (1:1) mixed solution), obtained from Example 111.

CV measurement was performed similarly as the method in Example 82, except by using the electrolytic solution 63 as the electrolytic solution. Results thereof are shown in FIG. 30.
As is clear from the results of FIG. 30, oxidation current is observed accompanying with dissolution of magnesium from the vicinity of 0.5 V, and current density at the vicinity of 1.0 V was about 6.6 mA/cm$^2$. On the other hand, reduction current is observed accompanying with deposition of magnesium from the vicinity of −0.5 V, and current density at the vicinity of −1.5 V was about −5.9 mA/cm$^2$. Therefore, it has been clarified that by using the electrolytic solution 63, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 112

Cyclic Voltammetry (CV) Measurement Using the Electrolytic Solution 64

Figure 31:
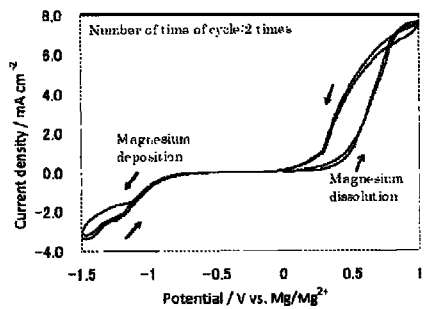
FIG. 31 represents a graph of CV measurement using the electrolytic solution 64 (Mg(OTf)$_2$/2-methoxyethanol:γ-butyrolactone (1:1) mixed solution), obtained from Example 112.

CV measurement was performed similarly as the method in Example 82, except by using the electrolytic solution 64 as the electrolytic solution. Results thereof are shown in FIG. 31.
As is clear from the results of FIG. 31, oxidation current is observed accompanying with dissolution of magnesium from the vicinity of 0.5 V, and current density at the vicinity of 1.0 V was about 7.6 mA/cm$^2$. On the other hand, reduction current is observed accompanying with deposition of magnesium from the vicinity of −0.5 V, and current density at the vicinity of −1.5 V was about −3.3 mA/cm$^2$. Therefore, it has been clarified that by using the electrolytic solution 64, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 113

Cyclic Voltammetry (CV) Measurement Using the Electrolytic Solution 65

Figure 32:
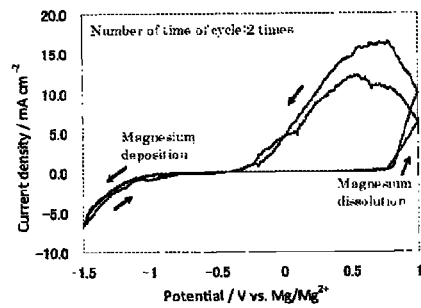
FIG. 32 represents a graph of CV measurement using the electrolytic solution 65 (Mg(OTf)$_2$/2-methoxyethanol:ethanol (1:1) mixed solution), obtained from Example 113.

CV measurement was performed similarly as the method in Example 82, except by using the electrolytic solution 65 as the electrolytic solution. Results thereof are shown in FIG. 32.
As is clear from the results of FIG. 32, oxidation current is observed accompanying with dissolution of magnesium from the vicinity of 0.5 V, and current density at the vicinity of 1.0 V was about 10.8 mA/cm$^2$. On the other hand, reduction current is observed accompanying with deposition of magnesium from the vicinity of −0.5 V, and current density at the vicinity of −1.5 V was about −6.8 mA/cm$^2$. Therefore, it has been clarified that by using the electrolytic solution 65, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 114

Cyclic Voltammetry (CV) Measurement Using the Electrolytic Solution 66

Figure 33:
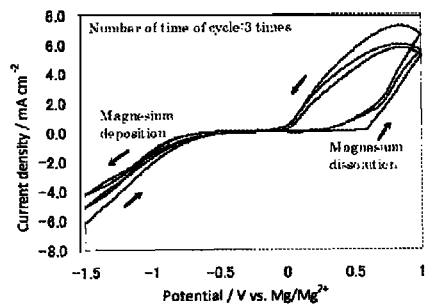
FIG. 33 represents a graph of CV measurement using the electrolytic solution 66 (Mg(OTf)$_2$/2-methoxyethanol:ethyl acetate (1:1) mixed solution), obtained from Example 114.

CV measurement was performed similarly as the method in Example 82, except by using the electrolytic solution 66 as the electrolytic solution. Results thereof are shown in FIG. 33.
As is clear from the results of FIG. 33, oxidation current is observed accompanying with dissolution of magnesium from the vicinity of 0.5 V, and current density at the vicinity of 1.0 V was about 6.8 mA/cm$^2$. On the other hand, reduction current is observed accompanying with deposition of magnesium from the vicinity of −0.5 V, and current density at the vicinity of −1.5 V was about −6.2 mA/cm$^2$. Therefore, it has been clarified that by using the electrolytic solution 66, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 115

Cyclic Voltammetry (CV) Measurement Using the Electrolytic Solution 67

CV measurement was performed similarly as the method in Example 82, except by using the electrolytic solution 67 as the electrolytic solution. Results thereof are shown in FIG. 34.

Figure 34:
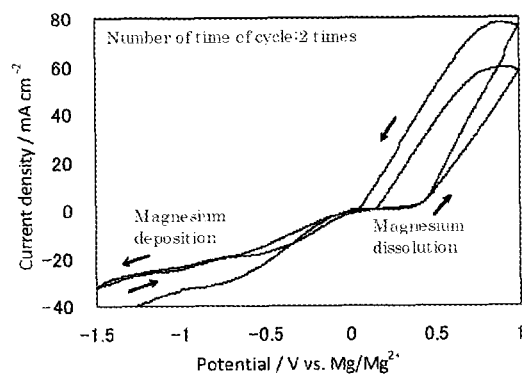
FIG. 34 represents a graph of CV measurement using the electrolytic solution 67 (Mg(OTf)$_2$/ethylene glycol:acetonitrile (1:1) mixed solution), obtained from Example 115.

As is clear from the results of FIG. 34, oxidation current is observed accompanying with dissolution of magnesium from the vicinity of 0.3 V, and current density at the vicinity of 1.0 V was about 77.1 mA/cm$^2$. On the other hand, reduction current is observed accompanying with deposition of magnesium from the vicinity of −0.2 V, and current density at the vicinity of −1.5 V was about −41.8 mA/cm$^2$. Therefore, it has been clarified that by using the electrolytic solution 67, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 116

Cyclic Voltammetry (CV) Measurement Using the Electrolytic Solution 68

CV measurement was performed similarly as the method in Example 82, except by using the electrolytic solution 68 as the electrolytic solution. Results thereof are shown in FIG. 35.

Figure 35:
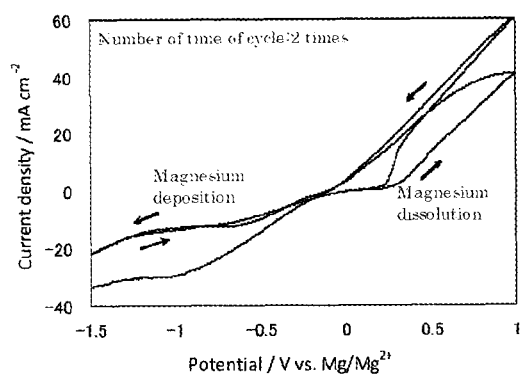
FIG. 35 represents a graph of CV measurement using the electrolytic solution 68 (Mg(OTf)$_2$/ethylene glycol:propionitrile (1:1) mixed solution), obtained from Example 116.

As is clear from the results of FIG. 35, oxidation current is observed accompanying with dissolution of magnesium from the vicinity of 0.3 V, and current density at the vicinity of 1.0 V was about 59.7 mA/cm$^2$. On the other hand, reduction current is observed accompanying with deposition of magnesium from the vicinity of −0.2 V, and current density at the vicinity of −1.5 V was about −33.6 mA/cm$^2$. Therefore, it has been clarified that by using the electrolytic solution 68, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 117

Cyclic Voltammetry (CV) Measurement Using the Electrolytic Solution 69

CV measurement was performed similarly as the method in Example 82, except by using the electrolytic solution 69 as the electrolytic solution. Results thereof are shown in FIG. 36.

Figure 36:
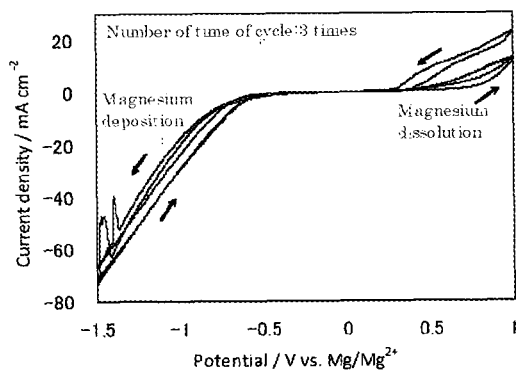
FIG. 36 represents a graph of CV measurement using the electrolytic solution 69 (Mg(OTf)$_2$/2-methoxyethanol:1-ethyl-3-methylimidazolium=trifluorometane sulfonate (1:1) mixed solution), obtained from Example 117.

As is clear from the results of FIG. 36, oxidation current is observed accompanying with dissolution of magnesium from the vicinity of 0.6 V, and current density at the vicinity of 1.0 V was about 22.2 mA/cm$^2$. On the other hand, reduction current is observed accompanying with deposition of magnesium from the vicinity of −0.6 V, and current density at the vicinity of −1.5 V was about −70.2 mA/cm$^2$. Therefore, it has been clarified that by using the electrolytic solution 69, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 118

Cyclic Voltammetry (CV) Measurement Using the Electrolytic Solution 70

CV measurement was performed similarly as the method in Example 82, except by using the electrolytic solution 70 as the electrolytic solution. Results thereof are shown in FIG. 37.

Figure 37:
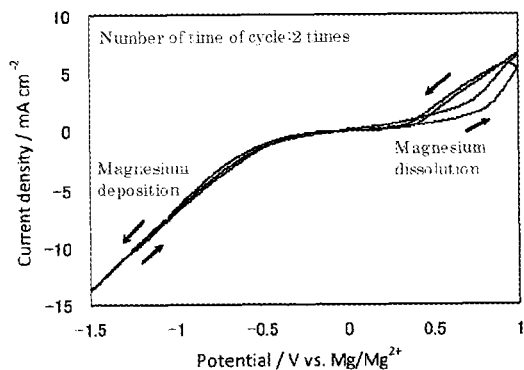
FIG. 37 represents a graph of CV measurement using the electrolytic solution 70 (Mg(OTf)$_2$/ethylene glycol:1-ethyl-3-methylimidazolium=trifluorometane sulfonate (1:1) mixed solution), obtained from Example 118.

As is clear from the results of FIG. 37, oxidation current is observed accompanying with dissolution of magnesium from the vicinity of 0.5 V, and current density at the vicinity of 1.0 V was about 6.6 mA/cm$^2$. On the other hand, reduction current is observed accompanying with deposition of magnesium from the vicinity of −0.4 V, and current density at the vicinity of −1.5 V was about −13.7 mA/cm$^2$. Therefore, it has been clarified that by using the electrolytic solution 70, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 119

Cyclic Voltammetry (CV) Measurement Using the Electrolytic Solution 71

CV measurement was performed similarly as the method in Example 82, except by using the electrolytic solution 71 as the electrolytic solution. Results thereof are shown in FIG. 38.

Figure 38:
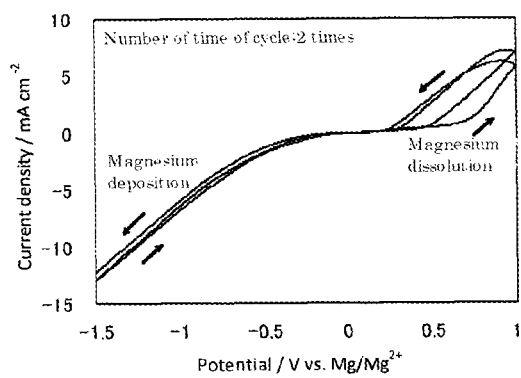
FIG. 38 represents a graph of CV measurement using the electrolytic solution 71 (Mg(OTf)$_2$/ethylnene glycol:tetraethylammonium=trifluorometane sulfonate (1:1) mixed solution), obtained from Example 119.

As is clear from the results of FIG. 38, oxidation current is observed accompanying with dissolution of magnesium from the vicinity of 0.6 V, and current density at the vicinity of 1.0 V was about 7.1 mA/cm$^2$. On the other hand, reduction current is observed accompanying with deposition of magnesium from the vicinity of −0.4 V, and current density at the vicinity of −1.5 V was about −12.8 mA/cm$^2$. Therefore, it has been clarified that by using the electrolytic solution 71, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 120

Cyclic Voltammetry (CV) Measurement Using the Electrolytic Solution 72

CV measurement was performed similarly as the method in Example 82, except by using the electrolytic solution 72 as the electrolytic solution. Results thereof are shown in FIG. 39.

Figure 39:
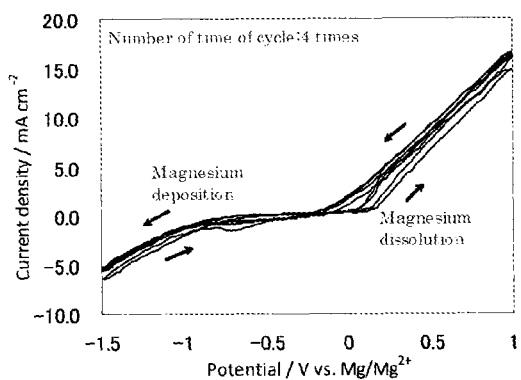
FIG. 39 represents a graph of CV measurement using the electrolytic solution 72 (MgCl$_2$/2-methoxyethanol solution), obtained from Example 120.

As is clear from the results of FIG. 39, oxidation current is observed accompanying with dissolution of magnesium from the vicinity of 0.5 V, and current density at the vicinity of 1.0 V was about 16.6 mA/cm$^2$. On the other hand, reduction current is observed accompanying with deposition of magnesium from the vicinity of −0.5 V, and current density at the vicinity of −1.5 V was about −6.4 mA/cm$^2$. Therefore, it has been clarified that by using the electrolytic solution 72, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 121

Cyclic Voltammetry (CV) Measurement Using the Electrolytic Solution 73

CV measurement was performed similarly as the method in Example 82, except by using the electrolytic solution 73 as the electrolytic solution. Results thereof are shown in FIG. 40.

Figure 40:
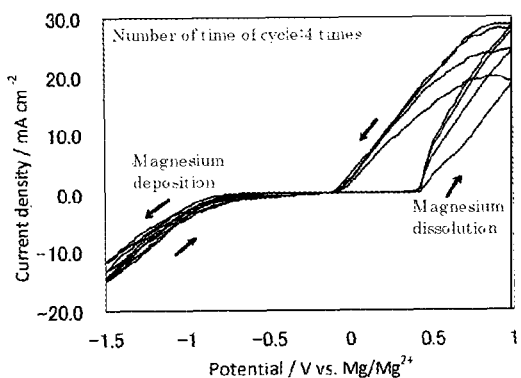
FIG. 40 represents a graph of CV measurement using the electrolytic solution 73 (MgBr$_2$/2-methoxyethanol solution), obtained from Example 121.

As is clear from the results of FIG. 40, oxidation current is observed accompanying with dissolution of magnesium from the vicinity of 0.5 V, and current density at the vicinity of 1.0 V was about 28.8 mA/cm$^2$. On the other hand, reduction current is observed accompanying with deposition of magnesium from the vicinity of −0.5 V, and current density at the vicinity of −1.5 V was about −15.1 mA/cm$^2$. Therefore, it has been clarified that by using the electrolytic solution 73, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 122

Cyclic Voltammetry (CV) Measurement Using the Electrolytic Solution 74

CV measurement was performed similarly as the method in Example 82, except by using the electrolytic solution 74 as the electrolytic solution. Results thereof are shown in FIG. 41.

Figure 41:
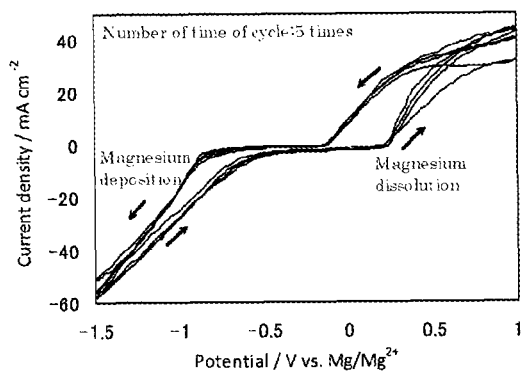
FIG. 41 represents a graph of CV measurement using the electrolytic solution 74 (MgI$_2$/2-methoxyethanol solution), obtained from Example 122.

As is clear from the results of FIG. 41, oxidation current is observed accompanying with dissolution of magnesium from the vicinity of 0.3 V, and current density at the vicinity of 1.0 V was about 43.5 mA/cm$^2$. On the other hand, reduction current is observed accompanying with deposition of magnesium from the vicinity of −0.9 V, and current density at the vicinity of −1.5 V was about −56.6 mA/cm$^2$. Therefore, it has been clarified that by using the electrolytic solution 74, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 123

Cyclic Voltammetry (CV) Measurement Using the Electrolytic Solution 79

CV measurement was performed similarly as the method in Example 82, except by using the electrolytic solution 79 as the electrolytic solution. Results thereof are shown in FIG. 42.

Figure 42:
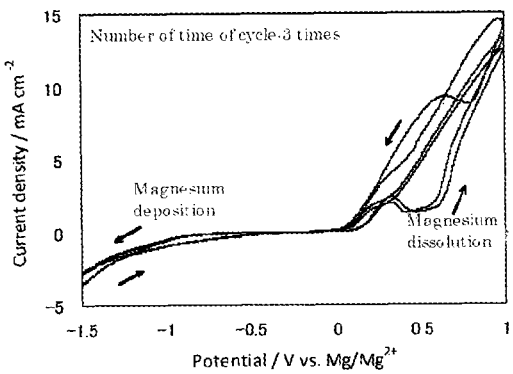
FIG. 42 represents a graph of CV measurement using the electrolytic solution 79 (Mg(BF$_4$)$_2$/ethylene glycol solution), obtained from Example 123.

As is clear from the results of FIG. 42, oxidation current is observed accompanying with dissolution of magnesium from the vicinity of 0.2 V, and current density at the vicinity of 1.0 V was about 14.5 mA/cm$^2$. On the other hand, reduction current is observed accompanying with deposition of magnesium from the vicinity of −0.9 V, and current density at the vicinity of −1.5 V was about −3.4 mA/cm$^2$. Therefore, it has been clarified that by using the electrolytic solution 79, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 124

Cyclic Voltammetry (CV) Measurement Using the Electrolytic Solution 81

CV measurement was performed similarly as the method in Example 82, except by using the electrolytic solution 81 as the electrolytic solution. Results thereof are shown in FIG. 43.

Figure 43:
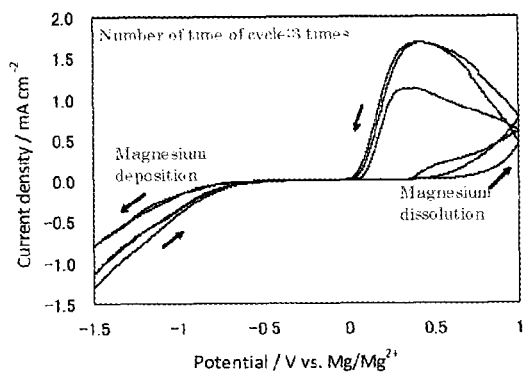
FIG. 43 represents a graph of CV measurement using the electrolytic solution 81 (Mg(TFSI)$_2$/ethylene glycol solution), obtained from Example 124.

As is clear from the results of FIG. 43, oxidation current is observed accompanying with dissolution of magnesium from the vicinity of 0.7 V, and current density at the vicinity of 1.0 V was about 1.7 mA/cm$^2$. On the other hand, reduction current is observed accompanying with deposition of magnesium from the vicinity of −0.7 V, and current density at the vicinity of −1.5 V was about −1.3 mA/cm$^2$. Therefore, it has been clarified that by using the electrolytic solution 81, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Comparative Example 1

CV Measurement Using a Butylmagnesium Chloride (BuMgCl)/Tetrahydrofuran (THF) Solution as the Electrolytic Solution CV measurement was performed similarly as the method in Example 82, except by using a 2 ml THF solution containing 0.5 M of butylmagnesium chloride (BuMgCl) (produced by Kishida Chemical Co., Ltd.), as the electrolytic solution, instead of the electrolytic solution 1, and by a setting the voltage range at −1.5 to 2.0 V. Results thereof are shown in FIG. 44.

Figure 44:
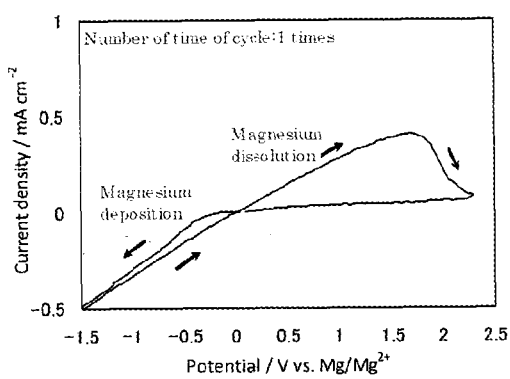
FIG. 44 represents a graph of CV measurement using the electrolytic solution (BuMgCl/THF solution), obtained from Comparative Example 1.

From the results of FIG. 44, it has been clarified that, in the case of using the BuMgCl/THF solution as the electrolytic solution, although Mg dissolved and deposited reversibly, density of current flowing at that time was very low, and current density at the vicinity of 1.5 V was about 0.4 mA/cm$^2$, and current density at the vicinity of −1.5 V was about −0.5 mA/cm$^2$.

Comparative Example 2

CV Measurement Using a Phenylmagnesium Chloride (PhMgCl)/Tetrahydrofuran (THF) Solution as the Electrolytic Solution CV measurement was performed similarly as the method in Example 82, except by using a 2 ml THF solution containing 0.5 M of phenylmagnesium chloride (PhMgCl) (produced by Kishida Chemical Co., Ltd.), as the electrolytic solution, instead of the electrolytic solution 1, and by a setting the voltage range at −1.0 to 1.0 V. Results thereof are shown in FIG. 45.

Figure 45:
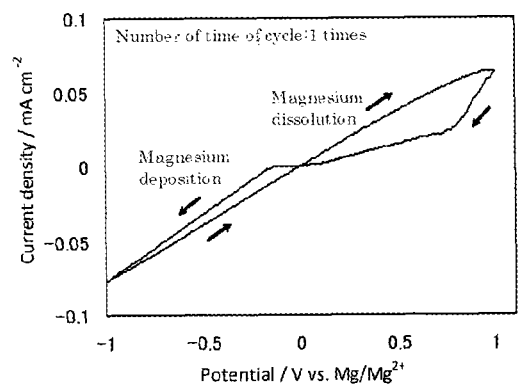
FIG. 45 represents a graph of CV measurement using the electrolytic solution (PhMgCl/THF solution), obtained from Comparative Example 2.

From the results of FIG. 45, it has been clarified that, in the case of using the PhMgCl/THF solution as the electrolytic solution, current density was still more decreased as compared with Comparative Example 1, and was about $6.0 \times 10^{-2}$ mA/cm$^2$ at the vicinity of 1 V, and was about $-8.0 \times 10^{-2}$ mA/cm$^2$ at the vicinity of −1 V.

Comparative Example 3

CV Measurement Using a Tetrabutylammonium Perchlorate (Bu$_4$NClO$_4$)/2-Methoxyethanol Solution as the Electrolytic Solution 4.28 g of tetrabutylammonium perchlorate (Bu$_4$NClO$_4$) (Produced by Wako Pure Chemical Industries, Ltd.) was dissolved into 25 ml of 2-methoxyethanol to prepare a Bu$_4$NClO$_4$/2-methoxyethanol solution containing 0.5 M of Bu$_4$NClO$_4$. CV measurement was performed similarly as the method in Example 82, except by using said electrolytic solution, instead of the electrolytic solution 1. Results thereof are shown in FIG. 46.

Figure 46:
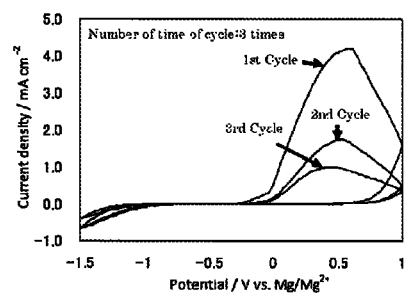
FIG. 46 represents a graph of CV measurement using the electrolytic solution (Bu$_4$NClO$_4$/2-methoxyethanol solution), obtained from Comparative Example 3.

From the results of FIG. 46, it has been clarified that oxidation current decreased in repeating the cycle, and reduction current significantly decreased as compared with the case of FIG. 1. From these facts, it was considered that no reductive decomposition occurred at all in the Bu$_4$NClO$_4$/2-methoxyethanol solution, and the supporting electrolyte (Bu$_4$NClO$_4$) formed a passive state film by oxidative decomposition, resulting in gradual decrease current density. That is, it was considered that 2-methoxyethanol used as the solvent, was stable against oxidation-reduction, and current observed in FIG. 1 was the one accompanying with dissolution and deposition of Mg.

Comparative Example 4

CV Measurement Using a Mg(OTf)$_2$/Ethanol Solution as the Electrolytic Solution The electrolytic solution containing 0.3 M of Mg(OTf)$_2$ was prepared by similar processing as in Example 1, except by using 25 ml of ethanol instead of 25 ml of 2-methoxyethanol, as the solvent, and setting amount of Mg(OTf)$_2$ to be 2.42 g. CV measurement was performed similarly as the method in Example 82, except by using said solution, instead of the electrolytic solution 1. Results thereof are shown in FIG. 47.

Figure 47:
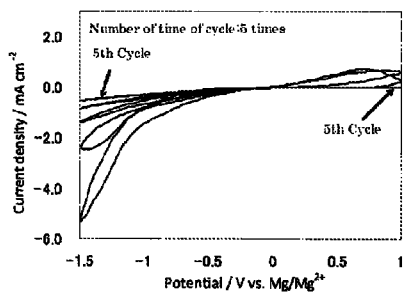
FIG. 47 represents a graph of CV measurement using the electrolytic solution (Mg(OTf)$_2$/ethanol solution), obtained from Comparative Example 4.

From the results of FIG. 47, it has been clarified that, in the case of using the Mg(OTf)$_2$/ethanol solution as the electrolytic solution, although magnesium dissolved and deposited reversibly, density of current flowing at that time was very low, and current density at the vicinity of 1.0 V was about 0.63 mA/cm$^2$. On the other hand, reduction current was relatively high, and current density at the vicinity of −1.5 V was about −5.3 mA/cm$^2$, however, current density abruptly decreased accompanying with the cycle. This was considered to have occurred because of formation of a passive state film at the electrode surface, by oxidative-reductive decomposition of ethanol used as the solvent.

Comparative Example 5

CV Measurement Using a Mg(OTf)$_2$/Dimethoxyethane Solution as the Electrolytic Solution The electrolytic solution containing 0.02 M of Mg(OTf)$_2$ was prepared by similar processing as in Example 1, except by using 25 ml of dimethoxyethane instead of 25 ml of 2-methoxyethanol, as the solvent, and setting amount of Mg(OTf)$_2$ to be 0.16 g. As the result, it has been clarified that in the case of dimethoxyethane, solubility of Mg(OTf)$_2$ was low, and it could dissolve only 0.02 M at the highest. CV measurement of the Mg(OTf)$_2$/dimethoxyethane solution was performed similarly as the method in Example 82, except by using said solution as the electrolytic solution, instead of the electrolytic solution 1. Results thereof are shown in FIG. 47.

Figure 48:
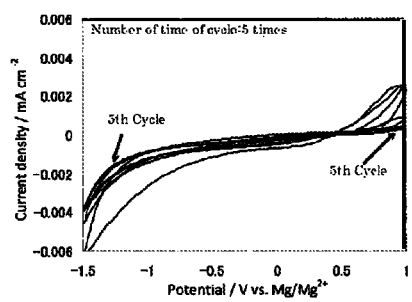
FIG. 48 represents a graph of CV measurement using the electrolytic solution (Mg(OTf)$_2$/dimethoxyethane solution), obtained from Comparative Example 5.

From the results of FIG. 48, it has been clarified that, in the case of using the Mg(OTf)$_2$/dimethoxyethane solution as the electrolytic solution, although Mg dissolved and deposited reversibly, density of current flowing at that time was very low, and current density at the vicinity of 1.0 V was about $2.6 \times 10^{-3}$ mA/cm$^2$, and current density at the vicinity of −1.5 V was about $-6.3 \times 10^{-3}$ mA/cm$^2$. In addition, similarly as in Comparative Example 4, decrease in current density was observed accompanying with the cycle, and thus it was considered that a passive state film was formed at the electrode surface.

Measurement results of oxidation current density and reduction current density, together with the electrolytic solution, the supporting electrolyte and the solvent, used in Examples 82, and 84 to 124, and Comparative Examples 1 to 5, are shown in the following Table 10 and Table 11.

TABLE 10

| Example No. | Electrolytic Solution. No. | Supporting Electrolyte | Solvent Name | Oxidation Current Density/ mA · cm$^2$ | Reduction Current Density/ mA · cm$^2$ |
|---|---|---|---|---|---|
| Example-82 | Electrolytric Solution-1 | Mg(OTf)$_2$ | 2-Methoxyethanol | 13.0 | −9.0 |
| Example-84 | Electrolytric Solution-2 | Mg(OTf)$_2$ | Ethylene glycol | 6.0 | −11.0 |
| Example-85 | Electrolytric Solution-3 | Mg(OTf)$_2$ | Methyl glycolate | 4.0 | −5.0 |
| Example-86 | Electrolytric Solution-4 | Mg(OTf)$_2$ | 2-Ethoxyethanol | 6.4 | −5.1 |
| Example-87 | Electrolytric Solution-7 | Mg(OTf)$_2$ | 2-(2-Methoxyethoxy)ethanol | 2.6 | −3.0 |
| Example-88 | Electrolytric Solution-9 | Mg(OTf)$_2$ | 1-Methoxy-2-propanol | 3.8 | −1.0 |
| Example-89 | Electrolytric Solution-13 | Mg(OTf)$_2$ | 2-Hydroxyacetic acid ethyl ester | 8.8 | −3.2 |

TABLE 10-continued

| Example No. | Electrolytic Solution. No. | Supporting Electrolyte | Solvent Name | Oxidation Current Density/ mA·cm$^2$ | Reduction Current Density/ mA·cm$^2$ |
|---|---|---|---|---|---|
| Example-90 | Electrolytric Solution-15 | Mg(OTf)$_2$ | 2-(Allyloxy)ethane | 2.7 | −2.7 |
| Example-91 | Electrolytric Solution-17 | Mg(OTf)$_2$ | cis-2-Butene-1,4-diol | 3.7 | −2.0 |
| Example-92 | Electrolytric Solution-25 | Mg(OTf)$_2$ | Pinacol/ethylene glycol | 4.8 | −9.6 |
| Example-93 | Electrolytric Solution-28 | Mg(OTf)$_2$ | Hydroxyacetone | 15.4 | −25.0 |
| Example-94 | Electrolytric Solution-29 | Mg(OTf)$_2$ | 4-Hydroxy-2-butanone | 2.8 | −1.3 |
| Example-95 | Electrolytric Solution-33 | Mg(OTf)$_2$ | Dimethyl (2-hydroxyethyl)phosphonate | 1.3 | −2.3 |
| Example-96 | Electrolytric Solution-41 | Mg(OTf)$_2$ | 2-(Dimethylamino)ethanol/ethylene glycol | 4.7 | −5.8 |
| Example-97 | Electrolytric Solution-45 | Mg(OTf)$_2$ | 3-Hydroxypropionitrile | 6.7 | −1.8 |
| Example-98 | Electrolytric Solution-46 | Mg(OTf)$_2$ | Methyl lactate | 3.1 | −2.0 |
| Example-99 | Electrolytric Solution-49 | Mg(OTf)$_2$ | Glycolic acid/ethylene glycol | 4.0 | −7.9 |
| Example-100 | Electrolytric Solution-50 | Mg(OTf)$_2$ | Lactamide/ethylene glycol | 2.1 | −6.4 |
| Example-101 | Electrolytric Solution-51 | Mg(OTf)$_2$ | Pantolactone/ethylene glycol | 4.4 | −5.2 |
| Example-102 | Electrolytric Solution-52 | Mg(OTf)$_2$ | Catecol/ethylene glycol | 7.0 | −8.0 |
| Example-103 | Electrolytric Solution-53 | Mg(OTf)$_2$ | o-Aminophenol/ethylene glycol | 6.0 | −10.7 |
| Example-104 | Electrolytric Solution-55 | Mg(OTf)$_2$ | 1H,1H,11H,11H-Dodecafluoro-3,6,9-trioxaundecane-1,11-diol/ethylene glycol | 6.8 | −7.4 |
| Example-105 | Electrolytric Solution-57 | Mg(OTf)$_2$ | 2-Methoxyethanol | 16.3 | −13.0 |
| Example-106 | Electrolytric Solution-58 | Mg(OTf)$_2$ | Ethylene glycol | 4.1 | −5.8 |
| Example-107 | Electrolytric Solution-59 | Mg(OTf)$_2$ | 2-Methoxyethanol/dimethoxyethane (1:1) | 8.6 | −7.6 |
| Example-108 | Electrolytric Solution-60 | Mg(OTf)$_2$ | 2-Methoxyethanol/2-methyltetrahydrofuran(1:1) | 2.8 | −1.3 |

TABLE 11

| Example No. | Electrolytic Solution. No. | Supporting Electrolyte | Solvent Name | Oxidation Current Density/ mA·cm$^2$ | Reduction Current Density/ mA·cm$^2$ |
|---|---|---|---|---|---|
| Example-109 | Electrolytric Solution-61 | Mg(OTf)$_2$ | 2-Methoxyethanol/diethylene glycol dimethyl ether (1:1) | 2.6 | −1.0 |
| Example-110 | Electrolytric Solution-62 | Mg(OTf)$_2$ | 2-Methoxyethanol/propylene carbonate(1:1) | 2.5 | −1.4 |
| Example-111 | Electrolytric Solution-63 | Mg(OTf)$_2$ | 2-Methoxyethanol/acetonitrile (1:1) | 6.6 | −5.9 |
| Example-112 | Electrolytric Solution-64 | Mg(OTf)$_2$ | 2-Methoxyethanol/γ-butyrolactone (1:1) | 7.6 | −3.3 |
| Example-113 | Electrolytric Solution-65 | Mg(OTf)$_2$ | 2-Methoxyethanol/ethanol(1:1) | 10.8 | −6.8 |
| Example-114 | Electrolytric Solution-66 | Mg(OTf)$_2$ | 2-Methoxyethanol/AcOEt(1:1) | 6.8 | −6.2 |
| Example-115 | Electrolytric Solution-67 | Mg(OTf)$_2$ | Ethylene glycol/acetonitrile(1:1) | 77.1 | −41.8 |
| Example-116 | Electrolytric Solution-68 | Mg(OTf)$_2$ | Ethylene glycol/propionitrile(1:1) | 59.7 | −33.6 |
| Example-117 | Electrolytric Solution-69 | Mg(OTf)$_2$ | 2-Methoxyethanol/1-ethyl-3-methylimidazolium trifluromethane sulfonate(1:1) | 22.2 | −70.2 |
| Example-118 | Electrolytric Solution-70 | Mg(OTf)$_2$ | Ethylene glycol/1-ethyl-3-methylimidazolium trifluromethane sulfonate(1:1) | 6.6 | −13.7 |

TABLE 11-continued

| Example No. | Electrolytic Solution. No. | Supporting Electrolyte | Solvent Name | Oxidation Current Density/ mA·cm$^2$ | Reduction Current Density/ mA·cm$^2$ |
|---|---|---|---|---|---|
| Example-119 | Electrolytric Solution-71 | Mg(OTf)$_2$ | Ethylene glycol/tetraethylammonium trifuoromethanesulfonate(1:1) | 7.1 | −12.8 |
| Example-120 | Electrolytric Solution-72 | MgCl$_2$ | 2-Methoxyethanol | 16.6 | −6.4 |
| Example-121 | Electrolytric Solution-73 | MgBr$_2$ | 2-Methoxyethanol | 28.8 | −15.1 |
| Example-122 | Electrolytric Solution-74 | MgI$_2$ | 2-Methoxyethanol | 43.5 | −56.6 |
| Example-123 | Electrolytric Solution-75 | Mg(BF$_4$)$_2$ | Ethylene glycol | 14.5 | −3.4 |
| Example-124 | Electrolytric Solution-76 | Mg(TSFI)$_2$ | Ethylene glycol | 1.7 | −1.3 |
| Comparative Examle-1 | — | n-BuMgCl | Tetrahydrofuran | 0.4 | −0.5 |
| Comparative Examle-1 | — | PhMgCl | Tetrahydrofuran | 0.06 | −0.08 |
| Comparative Examle-1 | — | Bu$_4$NClO$_4$ | 2-Methoxyethanol | 1.0 | −0.4 |
| Comparative Examle-1 | — | Mg(OTf)$_2$ | Ethanol | 0.63 | −5.3 |
| Comparative Examle-1 | — | Mg(OTf)$_2$ | Dimethoxyethane | 0.0026 | −0.0063 |

In comparing Examples 82 to 124 and Comparative Examples 1 to 2, it has been clarified that Grignard's reagent-type electrolytic solution used in Comparative Examples 1 and 2 had current density of ±1 mA/cm$^2$ or lower, whereas any of the electrolytic solutions of the present invention shown in Examples 82 to 124 had high current density. In addition, also even in comparing CV measurement results (Comparative Examples 4 and 5) of other than the Grignard's reagent-type electrolytic solution described in PATENT LITERATURE 3 and 4, they have been clarified to have clearly high current value (or current density).

In addition, as is clear from the results of Example 83, it has been clarified that use of the electrolytic solution of the present invention is capable of responding to charging under high voltage, in the case of using the electrolytic solution of the present invention as the electrolytic solution for the electrochemical device such as a battery, a capacitor or the like, due to having an extremely high decomposition voltage of the electrolytic solution of 4.2 V or higher.

Comparative Example 3 is the result of using the electrolytic solution other than a magnesium salt, and from said result, it was able to prove that the electrolytic solution itself of the present invention was not redox-decomposed, due to having low current density.

Still more, the electrolytic solutions shown in Comparative Examples 4 and 5 showed extremely low current density, as well as showed decrease in current density accompanying with the cycle, while the electrolytic solutions of the present invention did not cause decrease in current density accompanying with the cycle at all. From these results, in ethanol of Comparative Example 4, or dimethoxyethane of Comparative Example 5, it is considered to form a passive state film at the electrode surface, by oxidative-reductive decomposition of the solvent itself. On the other hand, it has been clarified that in the electrolytic solution of the present invention, decomposition of the solvent itself was suppressed, and only dissolution and deposition of magnesium progressed efficiently and selectively.

From these results, the electrolytic solution of the present invention is the one which is capable of providing the electrochemical device having rapid charge-discharge capability, when used in the electrochemical device, due to having high current density, as well as being capable of charging under high voltage.

Example 125

Measurement of Alternating Current Impedance of the Electrolytic Solutions 2 and 3

Alternating current impedance was measured using the electrolytic solutions 2 and 3 to analyze resistance components of the electrolytic solutions 2 and 3.

Specifically, using a three-pole type beaker cell, Mg alloy (AZ31, 2 cm×1.5 cm)), V$_2$O$_5$ and magnesium were used for a working electrode, a counter electrode and a reference electrode, respectively, and distance between the working electrode and the opposite electrode was set at 5 mm. Measurement was performed by adding 2 ml of the electrolytic solution 2 or 3 into said beaker, under conditions of an initial potential of 0.1 V, relative to the reference electrode, a frequency region of from 20 kHz to 20 mHz, and an amplitude of 10 mV. The measurement results of alternating current impedance are shown in FIGS. 49 and 50.

Figure 49:
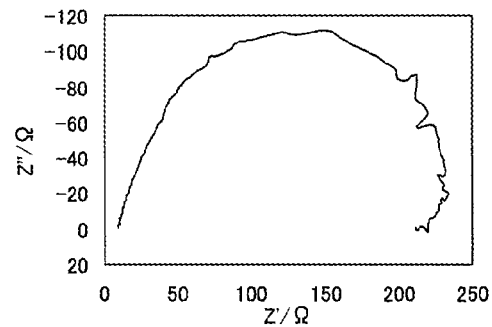
FIG. 49 represents a graph of the alternating current impedance measurement using the electrolytic solution 2 (Mg(OTf)$_2$/ethylene glycol solution), obtained from Example 125.
Figure 50:
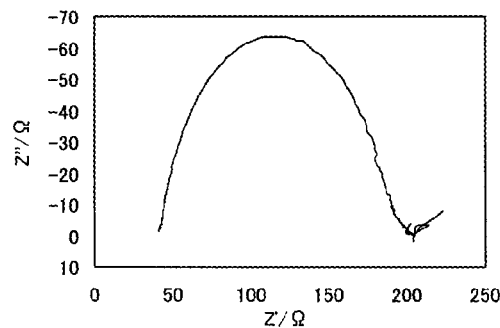
FIG. 50 represents a graph of the alternating current impedance measurement using the electrolytic solution 3 (Mg(OTf)$_2$/methyl glycolate solution), obtained from Example 125.

From the results of FIGS. 49 and 50, it has been clarified that total resistance value was each as low as about 120Ω, and diffusion rate of the magnesium ion in the electrolytic solution was high.

Comparative Example 6

Figure 51:
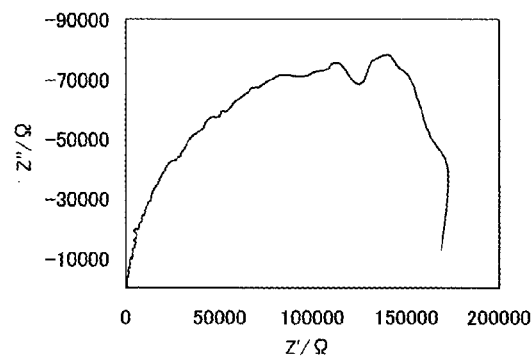
FIG. 51 represents a graph of the alternating current impedance measurement using the electrolytic solution (BuMgCl/THF solution) prepared in Comparative Example 1, obtained from Comparative Example 6.

Measurement of Alternating Current Impedance of a Butylmagnesium Chloride (BuMgCl)/Tetrahydrofuran (THF) Solution Alternating current impedance was measured similarly as in Example 125, except by using a THF solution containing 0.5 M of butylmagnesium chloride (BuMgCl) (produced by Kishida Chemical Co., Ltd.), prepared in Comparative Example 1, instead of the electrolytic solution 2 or 3. Results thereof are shown in FIG. 51.

From the result, it has been estimated that diffusion rate of the ion in the electrolytic solution was slow, due to having very high total resistance value of about $8.5 \times 10^4 \Omega$.

From the results of Example 125 and comparative Example 6, it was considered that by using the electrolytic solution of the present invention, current density in CV was dramatically enhanced, because of occurrence of rapid diffusion of the magnesium ion formed by dissolving of magnesium, as compared with the Grignard's reagent. Therefore, it was considered that the electrolytic solution of the present invention other than the electrolytic solutions 2 and 3 also showed similarly rapid diffusion, due to having high current density.

Experiment Example 1

Synthesis of a $Mg[(OTf)_2(2\text{-Methoxyethanol})_2]$ Complex and Confirmation Thereof (1) Synthesis of the Complex Under nitrogen atmosphere, 2.42 g (0.0075 mol) of magnesium trifluoromethanesulfonate $Mg[(OTf)_2]$ (produced by Tokyo Chemical Industry Co., Ltd.), 1.14 g (0.0150 mol) of 2-methoxyethanol (produced by Wako Pure Chemical Industries, Ltd.) and 15 ml of 1,2-dimethoxyethane (produced by Wako Pure Chemical Industries, Ltd.) were sequentially put into a reactor and stirred under heating at 80° C. for 5 hours. After filtration separation of insoluble matters by suction filtration, the filtrate was concentrated under reduced pressure to obtain a white solid. Next, by adding 15 ml of toluene and stirring under suspension, and by drying under reduced pressure the white solid recovered by filtration, the $Mg[(OTf)_2(2\text{-methoxyethanol})_2]$ complex was obtained. Said complex was named a complex 1.

(2) $^1$H-NMR Measurement of the Complex

The isolated complex 1 was dissolved in deuterated acetone (acetone-$d_6$, produced by Wako Pure Chemical Industries, Ltd.) to measure $^1$H-NMR using an NMR measurement equipment. Shift values of measured peaks (based on tetramethylsilane, as standard) are shown below.

$^1$H NMR ($CD_3$ $COCD_3$); $\delta$=5.51 (br, 1H), 3.84-3.76 (m, 2H), 3.60-3.55 (t, 2H), 3.42 (s, 3H)

In addition, $^1$H NMR of 2-methoxyethanol itself was measured using the NMR measurement equipment. Results thereof are shown below.

$^1$H NMR ($CD_3$ $COCD_3$); $\delta$=3.62-3.3.58 (m, 2H), 3.54 (br, 1H), 3.41-3.38 (t, 2H), 3.28 (s, 3H)

Comparing the $^1$H-NMR result of the complex 1 with the $^1$H-NMR result of 2-methoxyethanol itself, it has been clarified that shift value of the complex 1 was shifted toward a lower magnetic field side. Therefore, it was estimated that the complex 1 is a complex in which 2-methoxyethanol coordinated to $Mg(OTf)_2$.

(3) Quantitative Determination of Magnesium by Chelatometric Titration

The complex 1 was subjected to chelatometric titration [using a 0.01 M/EDTA aqueous solution, and eriochrome black T, as an indicator].

That is, firstly, 0.5 g of complex 1 was weighed accurately, which was dissolved into ion exchanged water and set to a constant volume of 50 ml. Into 5 ml of this solution, several drops of a 3M aqueous solution of ammonium hydroxide (produced by Wako Pure Chemical Industries, Ltd.), and 2 ml of a 1 M aqueous solution of ammonium hydroxide-ammonium chloride (produced by Wako Pure Chemical Industries, Ltd.), and several drops of eriochrome black T (produced by Wako Pure Chemical Industries, Ltd.), as an indicator, were sequentially added to prepare a sample solution. After that, chelatometric titration was performed using a 0.01 M EDTA aqueous solution (produced by Wako Pure Chemical Industries, Ltd.), whose concentration was specified, in advance, using a magnesium standard solution (concentration: 200 ppm).

As a result, content of magnesium in the complex was 5.1 w/w %. This was equal to the content of magnesium of 5.1 w/w %, calculated theoretically assuming that a structure of the complex 1 is $Mg(OTf)_2(2\text{-methoxyethanol})_2]$ (relative error: 5% or less). From this, a structure of the complex 1 was estimated to be $Mg(OTf)_2(2\text{-methoxyethanol})_2]$ coordinated with 2 molecules of 2-methoxyethanol.

(4) Structure Analysis of a Ligand

The complex 1 was supplied to a gas generated by heating—mass spectrometry to identify a structure of the ligand in the complex.

That is, the complex 1 (1 mg) was filled into a thermal decomposition apparatus, in a state of solid sample, and gradually heated from 40° C. up to 400° C. under a temperature increasing rate of 20° C./minute to measure gas components generated using the mass spectrometer. Results thereof are shown in FIG. 52 and FIG. 53.

Figure 52:
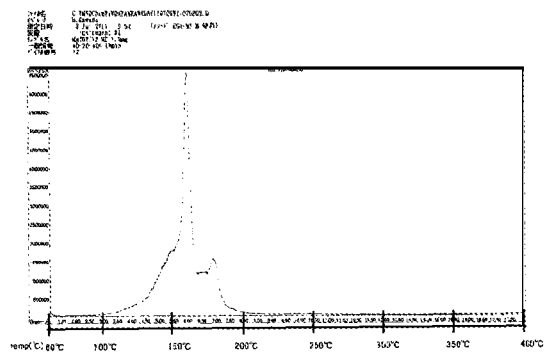
FIG. 52 represents a chart of total ion peak in the gas generated by heating the complex 1—mass spectrometry, obtained from Experimental Example 1.
Figure 53:
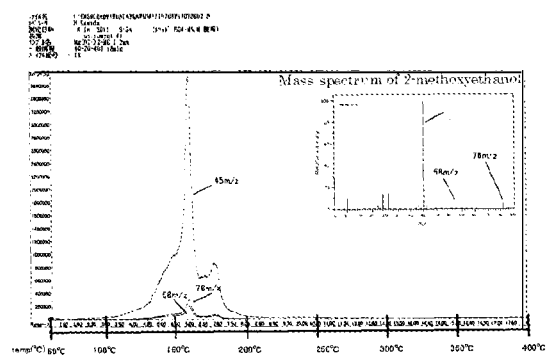
FIG. 53 represents a chart of fragment ion peak of 2-methoxyethanol extracted from the chart of total ion peak of FIG. 52, obtained from Experimental Example 1.

It should be noted that the horizontal axis of FIG. 52 and FIG. 53 shows measurement time (corresponding to thermal decomposition temperature), FIG. 52 shows a chart of a total ion peak obtained by the result of the mass spectrometry, and FIG. 53 shows a chart where each fragment ion peak of m/z 45, m/z 58 and m/z 76 observed in mass spectrometry of 2-methoxyethanol was extracted from the total ion peak. From these results, it has been clarified that total of each fragment ion peak of m/z 45, m/z 58 and m/z 76 nearly coincides with the total ion peak. Therefore, the ligand contained in the complex 1 has been identified to be 2-methoxyethanol.

Experiment Example 2

Synthesis of a $Mg[(OTf)_2(2\text{-(Hydroxymethyl)Tetrahydrofuran})_2]$ Complex and Confirmation Thereof (1) Synthesis of the Complex The $Mg[(OTf)_2(2\text{-(hydroxymethyl)tetrahydrofuran})_2]$ complex was obtained similarly as Experiment Example 1, except by using 1.53 g (0.0150 mol) of 2-(hydroxymethyl) tetrahydrofuran (produced by Tokyo Chemical Industry Co., Ltd.), instead of 1.14 g (0.0150 mol) of 2-methoxyethanol. Said complex was named a complex 2.

(2) $^1$H-NMR Measurement of the Complex

The isolated complex 2 was dissolved in deuterated acetone (acetone-$d_6$, produced by Wako Pure Chemical Industries, Ltd.) to measure $^1$H-NMR using an NMR measurement equipment. Shift values of measured peaks (based on tetramethylsilane, as standard) are shown below:

$^1$H NMR ($CD_3$ $COCD_3$); $\delta$=5.09 (br, 1H), 4.21-4.12 (m, 1H), 4.04-3.95 (m, 1H), 3.89-3.79 (m, 1H), 3.79-3.70 (m, 1H), 3.60-3.56 (m, 1H), 2.10-1.88 (m, 3H), 1.70-1.63 (m, 1H)

In addition, $^1$H NMR of 2-(hydroxymethyl)tetrahydrofuran itself was measured using the NMR measurement equipment. Results thereof are shown below:

$^1$H NMR ($CD_3$ $COCD_3$); $\delta$=3.87-3.384 (m, 1H), 3.78-3.73 (m, 1H), 3.66-3.61 (m, 1H), 3.49-3, 41 (m, 2H), 2.84 (br, 1H), 1.92-1.77 (m, 3H), 1.67-1.61 (m, 1H)

Comparing the $^1$H-NMR result of the complex 2 with the $^1$H-NMR result of 2-(hydroxymethyl)tetrahydrofuran itself, it has been clarified that shift value of the complex 2 was generally shifted toward a lower magnetic field side. Therefore, it was estimated that the complex 2 is a complex coordinated with 2-(hydroxymethyl)tetrahydrofuran to $Mg(OTf)_2$.

(3) Quantitative Determination of Magnesium by Chelatometric Titration

Chelatometric titration was performed similarly as in Experiment Example 1, except by using 0.5 g of the complex 2 instead of 0.5 g of the complex 1. As a result, content of magnesium in the complex was 4.5 w/w %. This was equal to the content of magnesium of 4.6 w/w %, calculated theoretically assuming that a structure of the complex 2 is $Mg(OTf)_2$(2-(hydroxymethyl)tetrahydrofuran)$_2$](relative error: 5% or less). From this, a structure of the complex 2 was estimated to be $Mg(OTf)_2$(2-(hydroxymethyl)tetrahydrofuran)$_2$] coordinated with 2 molecules of 2-(hydroxymethyl)tetrahydrofuran.

(4) Structure Analysis of a Ligand

Similarly as in Experiment Example 1, the complex 2 was supplied to a gas generated by heating—mass spectrometry to identify a structure of the ligand in the complex 2. Results thereof are shown in FIG. 54 and FIG. 55.

Figure 54:
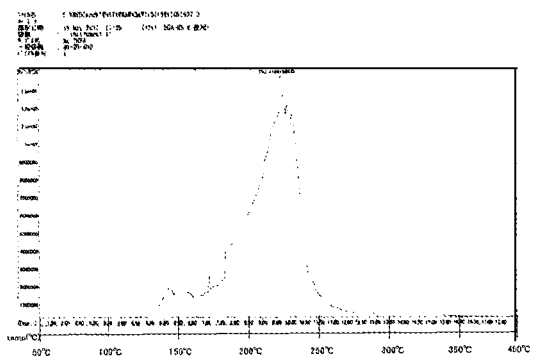
FIG. 54 represents a chart of total ion peak in the gas generated by heating the complex 2—mass spectrometry, obtained from Experimental Example 2.
Figure 55:
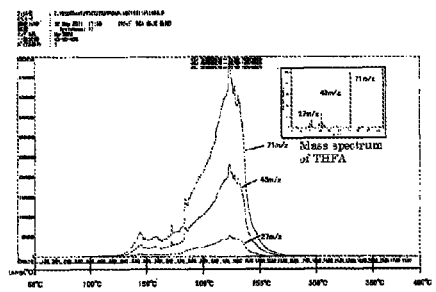
FIG. 55 represents a chart of fragment ion peak of 2-(hydroxymethyl)tetrahydrofuran extracted from the chart of total ion peak of FIG. 54, obtained from Experimental Example 2.

FIG. 54 shows a chart of a total ion peak obtained by the result of the mass spectrometry, and FIG. 55 shows a chart where each fragment ion peak of m/z 27, m/z 43 and m/z 71 observed in mass spectrometry of 2-(hydroxymethyl)tetrahydrofuran was extracted from the total ion peak. From these results, it has been clarified that total of each fragment ion peak of m/z 27, m/z 43 and m/z 71 nearly coincides with the total ion peak. Therefore, the ligand contained in the complex 2 has been identified to be 2-(hydroxymethyl)tetrahydrofuran.

Experiment Example 3

Synthesis of a $Mg[(OTf)_2$(Ethylene Glycol)$_2$] Complex (1) Synthesis of the Complex The $Mg[(OTf)_2$(ethylene glycol)$_2$] complex was obtained similarly as Experiment Example 1, except by using 0.93 g (0.0150 mol) of ethylene glycol (produced by Tokyo Chemical Industry Co., Ltd.), instead of 1.14 g (0.0150 mol) of 2-methoxyethanol. Said complex was named a complex 3.

(2) $^1$H-NMR Measurement of the Complex

The isolated complex 3 was dissolved in deuterated acetone (acetone-d$_6$, produced by Wako Pure Chemical Industries, Ltd.) to measure $^1$H-NMR using an NMR measurement equipment. Shift values of measured peaks (based on tetramethylsilane, as standard) are shown below.

$^1$H NMR (CD$_3$ COCD$_3$); δ=5.89 (br, 2H), 3.87 (s, 4H)

In addition, $^1$H NMR of ethylene glycol itself was measured using the NMR measurement equipment. Results thereof are shown below.

$^1$H NMR (CD$_3$ COCD$_3$); δ=3.78 (br, 2H), 3.56 (s, 4H)

Comparing the $^1$H-NMR result of the complex 3 with the $^1$H-NMR result of ethylene glycol itself, it has been clarified that shift value of the complex 3 was shifted toward a lower magnetic field side. Therefore, it was estimated that the complex 3 is a complex coordinated with ethylene glycol to $Mg(OTf)_2$.

(3) Quantitative Determination of Magnesium by Chelatometric Titration

Chelatometric titration was performed similarly as in Experiment Example 1, except by using 0.5 g of the complex 3 instead of 0.5 g of the complex 1. As a result, content of magnesium in the complex was 5.3 w/w %. This was equal to the content of magnesium of 5.4 w/w %, calculated theoretically assuming that a structure of the complex 3 is $Mg(OTf)_2$(ethylene glycol)$_2$](relative error: 5% or less). From this, a structure of the complex 3 was estimated to be $Mg(OTf)_2$(ethylene glycol)$_2$] coordinated with 2 molecules of ethylene glycol.

(4) Structure Analysis of a Ligand

Similarly as in Experiment Example 1, the complex 3 was supplied to a gas generated by heating—mass spectrometry to identify a structure of the ligand in the complex 3. Results thereof are shown in FIG. 56 and FIG. 57.

Figure 56:
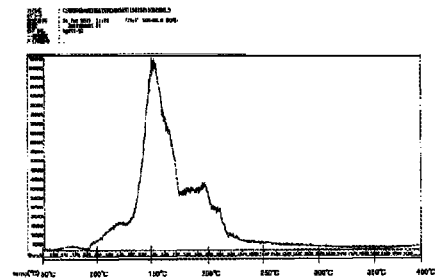
FIG. 56 represents a chart of total ion peak in the gas generated by heating the complex 3—mass spectrometry, obtained from Experimental Example 3.
Figure 57:
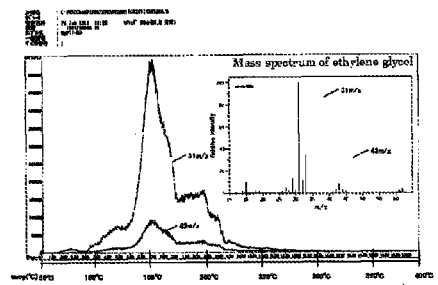
FIG. 57 represents a chart of fragment ion peak of ethylene glycol extracted from the chart of total ion peak of FIG. 56, obtained from Experimental Example 3.

FIG. 56 shows a chart of a total ion peak obtained by the result of the mass spectrometry, and FIG. 57 shows a chart where each fragment ion peak of m/z 31 and m/z 43 observed in mass spectrometry of ethylene glycol was extracted from the total ion peak. From these results, it has been clarified that total of each fragment ion peak of m/z 31 and m/z 43 nearly coincides with the total ion peak. Therefore, the ligand contained in the complex 3 has been identified to be ethylene glycol.

Experiment Example 4

Synthesis of a $Mg[(OTf)_2$(Methyl Glycolate)$_2$] Complex (1) Synthesis of the Complex The $Mg[(OTf)_2$(methyl glycolate)$_2$] complex was obtained similarly as Experiment Example 1, except by using 1.35 g (0.0150 mol) of methyl glycolate (produced by Tokyo Chemical Industry Co., Ltd.), instead of 1.14 g (0.0150 mol) of 2-methoxyethanol. Said complex was named a complex 4.

(2) $^1$H-NMR Measurement of the Complex

The isolated complex 4 was dissolved in deuterated acetone (acetone-d$_6$, produced by Wako Pure Chemical Industries, Ltd.) to measure $^1$H-NMR using an NMR measurement equipment. Shift values of measured peaks (based on tetramethylsilane, as standard) are shown below.

$^1$H NMR (CD$_3$ COCD$_3$); δ=5.32 (br, 1H), 4.24-4.17 (m, 2H), 3.72 (s, 3H)

In addition, $^1$H NMR of methyl glycolate itself was measured using the NMR measurement equipment. Results thereof are shown below.

$^1$H NMR (CD$_3$ COCD$_3$); δ=4.67 (br, 1H), 4.10-4.07 (m, 2H), 3.69 (s, 3H)

Comparing the $^1$H-NMR result of the complex 4 with the $^1$H-NMR result of methyl glycolate itself, it has been clarified that shift value of the complex 4 was generally shifted toward a lower magnetic field side. Therefore, it was estimated that the complex 4 is a complex coordinated with methyl glycolate to $Mg(OTf)_2$.

(3) Quantitative Determination of Magnesium by Chelatometric Titration

Chelatometric titration was performed similarly as in Experiment Example 1, except by using 0.5 g of the complex 4 instead of 0.5 g of the complex 1. As a result, content of magnesium in the complex was 4.6 w/w %. This was equal to the content of magnesium of 4.8 w/w %, calculated theoretically assuming that a structure of the complex 4 is $Mg(OTf)_2$(methyl glycolate)$_2$](relative error: 5% or less). From this, a structure of the complex 4 was estimated to be $Mg(OTf)_2$(methyl glycolate)$_2$] coordinated with 2 molecules of methyl glycolate.

Experiment Example 5

Synthesis of a Mg[(OTf)$_2$(Methyl 2-Hydroxyisobutyrate)$_2$] Complex (1) Synthesis of the Complex The Mg[(OTf)$_2$(methyl 2-hydroxyisobutyrate)$_2$] complex was obtained similarly as Experiment Example 1, except by using 1.77 g (0.0150 mol) of methyl 2-hydroxyisobutyrate (produced by Tokyo Chemical Industry Co., Ltd.), instead of 1.14 g (0.0150 mol) of 2-methoxyethanol. Said complex was named a complex 5.

(2) $^1$H-NMR Measurement of the Complex

The isolated complex 5 was dissolved in deuterated acetone (acetone-d$_6$, produced by Wako Pure Chemical Industries, Ltd.) to measure $^1$H-NMR using an NMR measurement equipment. Shift values of measured peaks (based on tetramethylsilane, as standard) are shown below.

$^1$H NMR (CD$_3$ COCD$_3$); δ=5.44 (br, 1H), 3.79 (s, 3H), 1.45 (s, 6H)

In addition, $^1$H NMR of methyl 2-hydroxyisobutyrate itself was measured using the NMR measurement equipment. Results thereof are shown below.

$^1$H NMR (CD$_3$ COCD$_3$); δ=4.09 (br, 1H), 3.69 (s, 3H), 1.35 (s, 6H)

Comparing the $^1$H-NMR result of the complex 5 with the $^1$H-NMR result of methyl 2-hydroxyisobutyrate itself, it has been clarified that shift value of the complex 5 was generally shifted toward a lower magnetic field side. Therefore, it was estimated that the complex 5 is a complex coordinated with methyl 2-hydroxyisobutyrate to Mg(OTf)$_2$.

(3) Quantitative Determination of Magnesium by Chelatometric Titration

Chelatometric titration was performed similarly as in Experiment Example 1, except by using 0.5 g of the complex 5 instead of 0.5 g of the complex 1. As a result, content of magnesium in the complex was 4.3 w/w %. This was equal to the content of magnesium of 4.4 w/w %, calculated theoretically assuming that a structure of the complex 5 is Mg(OTf)$_2$(methyl 2-hydroxyisobutyrate)$_2$](relative error: 5% or less). From this, a structure of the complex 5 was estimated to be Mg(OTf)$_2$(methyl 2-hydroxyisobutyrate)$_2$] coordinated with 2 molecules of methyl 2-hydroxyisobutyrate.

(4) Structure Analysis of a Ligand

Similarly as in Experiment Example 1, the complex 5 was supplied to a gas generated by heating—mass spectrometry to identify a structure of the ligand in the complex 5. Results thereof are shown in FIG. 58 and FIG. 59.

FIG. 58 shows a chart of a total ion peak obtained by the result of the mass spectrometry, and FIG. 59 shows a chart where each fragment ion peak of m/z 31, m/z 43 and m/z 59 observed in mass spectrometry of methyl 2-hydroxyisobutyrate was extracted from the total ion peak. From these results, it has been clarified that total of each fragment ion peak of m/z 31, m/z 43 and m/z 59 nearly coincides with the total ion peak. Therefore, the ligand contained in the complex 5 has been identified to be methyl 2-hydroxyisobutyrate.

Experiment Example 6

Synthesis of a Mg[(OTf) (2-Ethoxyethanol)] Complex (1) Synthesis of the Complex

The Mg[(OTf)$_2$(2-ethoxyethanol)$_2$] complex was obtained similarly as Experiment Example 1, except by using 1.35 g (0.0150 mol) of 2-ethoxyethanol (produced by Tokyo Chemical Industry Co., Ltd.), instead of 1.14 g (0.0150 mol) of 2-methoxyethanol. Said complex was named a complex 6.

(2) $^1$H-NMR Measurement of the Complex

The isolated complex 6 was dissolved in deuterated acetone (acetone-d$_6$, produced by Wako Pure Chemical Industries, Ltd.) to measure $^1$H-NMR using an NMR measurement equipment. Shift values of measured peaks (based on tetramethylsilane, as standard) are shown below.

$^1$H NMR (CD$_3$ COCD$_3$); δ=6.06 (br, 1H), 3.88-3.84 (m, 2H), 3.72-3.67 (m, 4H), 1.23-1.19 (t, 3H)

In addition, $^1$H NMR of 2-ethoxyethanol itself was measured using the NMR measurement equipment. Results thereof are shown below.

$^1$H NMR (CD$_3$ COCD$_3$); δ=3.62-3.59 (m, 2H), 3.47-3.42 (m, 4H), 2.81 (br, 1H), 1.14-1.11 (t, 3H)

Comparing the $^1$H-NMR result of the complex 6 with the $^1$H-NMR result of 2-ethoxyethanol itself, it has been clarified that shift value of the complex 6 was shifted toward a lower magnetic field side. Therefore, it was estimated that the complex 6 is a complex coordinated with 2-ethoxyethanol to Mg(OTf)$_2$.

(3) Quantitative Determination of Magnesium by Chelatometric Titration

Chelatometric titration was performed similarly as in Experiment Example 1, except by using 0.5 g of the complex 6 instead of 0.5 g of the complex 1. As a result, content of magnesium in the complex was 4.6 w/w %. This was equal to the content of magnesium of 4.8 w/w %, calculated theoretically assuming that a structure of the complex 6 is Mg(OTf)$_2$(2-ethoxyethanol)$_2$](relative error: 5% or less). From this, a structure of the complex 6 was estimated to be Mg(OTf)$_2$(2-ethoxyethanol)$_2$] coordinated with 2 molecules of 2-ethoxyethanol.

(4) Structure Analysis of a Ligand

Similarly as in Experiment Example 1, the complex 6 was supplied to a gas generated by heating—mass spectrometry to identify a structure of the ligand in the complex 6. Results thereof are shown in FIG. 60 and FIG. 61.

Figures 61, 62, 63:
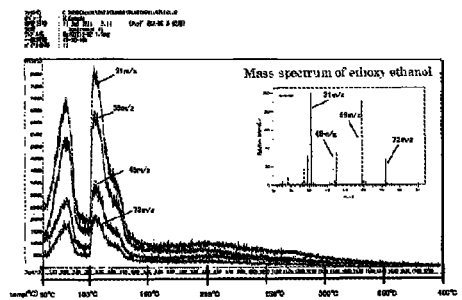
FIG. 61 represents a chart of fragment ion peak of 2-ethoxyetanol extracted from the chart of total ion peak of FIG. 60, obtained from Experimental Example 6.
FIG. 62 represents a graph of CV measurement using the electrolytic solution 82 {Mg[(OTf)$_2$ (2-methoxyethanol)$_2$ complex]/dimethoxyethane solution}, obtained from Example 136.
FIG. 63 represents a graph of CV measurement using the electrolytic solution 83 {Mg[(OTf)$_2$ (2-methoxyethanol)$_2$ complex]/diethylene glycol dimethyl ether solution}, obtained from Example 137.

FIG. 60 shows a chart of a total ion peak obtained by the result of the mass spectrometry, and FIG. 61 shows a chart where each fragment ion peak of m/z 31, m/z 45, m/z 59 and m/z 72 observed in mass spectrometry of 2-ethoxyethanol was extracted from the total ion peak. From these results, it has been clarified that total of each fragment ion peak of m/z 31, m/z 45, m/z 59 and m/z 72 nearly coincides with the total ion peak. Therefore, the ligand contained in the complex 6 has been identified to be 2-ethoxyethanol.

Example 126

Preparation of a Mg[(OTf)$_2$(2-Methoxyethanol)$_2$]/ Dimethoxyethane Solution from the Complex 1

The complex 1 (9.5 g 0.02 mol) isolated in Experiment Example 1, and 20 ml of dimethoxyethane (produced by Wako Pure Chemical Industries, Ltd.) were mixed and stirred at room temperature for 5 hours. After filtration separation of insoluble matters by suction filtration, 1 g of MS5 A [molecular sieve 5 A (produced by Wako Pure Chemical Industries, Ltd.)] was added to mother liquid for dehydration processing to prepare an electrolytic solution containing 0.5 M of the complex 1. Said electrolytic solution was named an electrolytic solution 82.

Example 127

Preparation of a Mg[(OTf)$_2$(2-Methoxyethanol)$_2$]/ Diethylene Glycol Dimethyl Ether Solution from the Complex 1

An electrolytic solution containing 0.5 M of the complex 1 was prepared by similar processing as in Example 126, except by using 20 ml of diethylene glycol dimethyl ether (produced by Wako Pure Chemical Industries, Ltd.)], instead of 20 ml of dimethoxyethane of Example 126. Said electrolytic solution was named an electrolytic solution 83.

Example 128

Preparation of a Mg[(OTf)$_z$(2-Methoxyethanol)]/ Tetrahydrofuran Solution from the Complex 1

An electrolytic solution containing 0.5 M of the complex 1 was prepared by similar processing as in Example 126, except by using 20 ml of tetrahydrofuran (produced by Wako Pure Chemical Industries, Ltd.)], instead of 20 ml of dimethoxyethane of Example 126. Said electrolytic solution was named an electrolytic solution 84.

Example 129

Preparation of a Mg[(OTf)$_2$(2-Methoxyethanol)$_2$]/2-Methyl Tetrahydrofuran from the Complex 1

An electrolytic solution containing 0.5 M of the complex 1 was prepared by similar processing as in Example 126, except by using 20 ml of 2-methyl tetrahydrofuran (produced by Wako Pure Chemical Industries, Ltd.)], instead of 20 ml of dimethoxyethane of Example 126. Said electrolytic solution was named an electrolytic solution 85.

Example 130

Preparation of a Mg[(OTf)$_2$(2-Methoxyethanol)$_2$]/ Propylene Carbonate Solution from the Complex 1

An electrolytic solution containing 0.5 M of the complex 1 was prepared by similar processing as in Example 126, except by using 20 ml of propylene carbonate (produced by Wako Pure Chemical Industries, Ltd.)], instead of 20 ml of dimethoxyethane of Example 126. Said electrolytic solution was named an electrolytic solution 86.

Example 131

Preparation of a Mg[(OTf)$_2$(2-Methoxyethanol)$_2$]/ Acetonitrile Solution from the Complex 1

An electrolytic solution containing 0.5 M of the complex 1 was prepared by similar processing as in Example 126, except by using 20 ml of acetonitrile (produced by Wako Pure Chemical Industries, Ltd.)], instead of 20 ml of dimethoxyethane of Example 126. Said electrolytic solution was named an electrolytic solution 87.

Example 132

Preparation of a Mg[(OTf)$_2$(2-Methoxyethanol)$_2$]/γ-Butyrolactone Solution from the Complex 1

An electrolytic solution containing 0.5 M of the complex 1 was prepared by similar processing as in Example 126, except by using 20 ml of γ-butyrolactone (produced by Wako Pure Chemical Industries, Ltd.)], instead of 20 ml of dimethoxyethane of Example 126. Said electrolytic solution was named an electrolytic solution 88.

Example 133

Preparation of a Mg[(OTf)$_2$(2-Methoxyethanol)$_2$]/ Ethanol Solution from the Complex 1

An electrolytic solution containing 0.5 M of the complex 1 was prepared by similar processing as in Example 126, except by using 20 ml of ethanol (produced by Wako Pure Chemical Industries, Ltd.)], instead of 20 ml of dimethoxyethane of Example 126. Said electrolytic solution was named an electrolytic solution 89.

Example 134

Preparation of a Mg[(OTf)$_2$(2-Methoxyethanol)]/Ethyl Acetate Solution from the Complex 1

An electrolytic solution containing 0.5 M of the complex 1 was prepared by similar processing as in Example 126, except by using 20 ml of ethyl acetate (produced by Wako Pure Chemical Industries, Ltd.)], instead of 20 ml of dimethoxyethane of Example 126. Said electrolytic solution was named an electrolytic solution 90.

Example 135

Preparation of a Mg[(OTf)(2-Methoxyethanol)$_2$]/Dimethoxy Ethane Solution from the Complex 3

An electrolytic solution containing 0.5 M of the complex 3 was prepared by similar processing as in Example 126, except by using 8.9 g (0.02 mol) of the complex 3 isolated in Experiment Example 3, instead of the complex 1 of Example 126. Said electrolytic solution was named an electrolytic solution 91.

Example 136

Cyclic Voltammetry (CV) Measurement Using the Electrolytic Solution 82

CV measurement was performed similarly as the method in Example 82, except by using the electrolytic solution 82 as the electrolytic solution. Results thereof are shown in FIG. 62.

As is clear from the results of FIG. 62, oxidation current is observed accompanying with dissolution of magnesium from the vicinity of 0.5 V, and current density at the vicinity of 1 V was about 4.5 mA/cm$^2$. On the other hand, reduction current is observed accompanying with deposition of magnesium from the vicinity of −0.5 V, and current density at the vicinity of −1.5 V was about −1.5 mA/cm$^2$. Therefore, it has been clarified that by using the electrolytic solution 82, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 137

Cyclic Voltammetry (CV) Measurement Using the Electrolytic Solution 83

CV measurement was performed similarly as the method in Example 82, except by using the electrolytic solution 83 as the electrolytic solution. Results thereof are shown in FIG. 63.

As is clear from the results of FIG. 63, oxidation current is observed accompanying with dissolution of magnesium from the vicinity of 0.3 V, and current density at the vicinity of 1 V was about 4.6 mA/cm$^2$. On the other hand, reduction current is observed accompanying with deposition of magnesium from the vicinity of −0.5 V, and current density at the vicinity of −1.5 V was about −1.1 mA/cm$^2$. Therefore, it has been clarified that by using the electrolytic solution 83, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 138

Cyclic Voltammetry (CV) Measurement Using the Electrolytic Solution 84

CV measurement was performed similarly as the method in Example 82, except by using the electrolytic solution 84 as the electrolytic solution. Results thereof are shown in FIG. 64.

Figure 64:
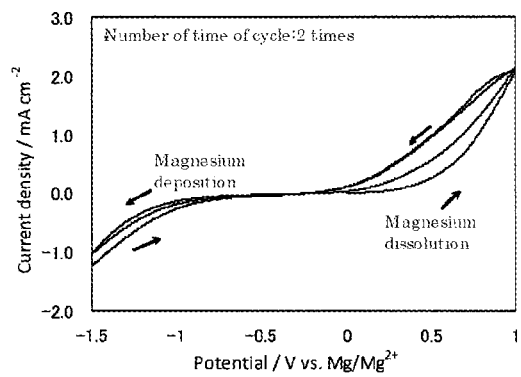
FIG. 64 represents a graph of CV measurement using the electrolytic solution 84 {Mg[(OTf)$_2$ (2-methoxyethanol)$_2$ complex]/tetrahydrofuran solution}, obtained from Example 138.

As is clear from the results of FIG. 64, oxidation current is observed accompanying with dissolution of magnesium from the vicinity of 0.5 V, and current density at the vicinity of 1 V was about 2.1 mA/cm$^2$. On the other hand, reduction current is observed accompanying with deposition of magnesium from the vicinity of −0.7 V, and current density at the vicinity of −1.5 V was about −1.2 mA/cm$^2$. Therefore, it has been clarified that by using the electrolytic solution 84, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Example 139

Cyclic Voltammetry (CV) Measurement Using the Electrolytic Solution 91

CV measurement was performed similarly as the method in Example 82, except by using the electrolytic solution 91 as the electrolytic solution. Results thereof are shown in FIG. 65.

Figure 65:
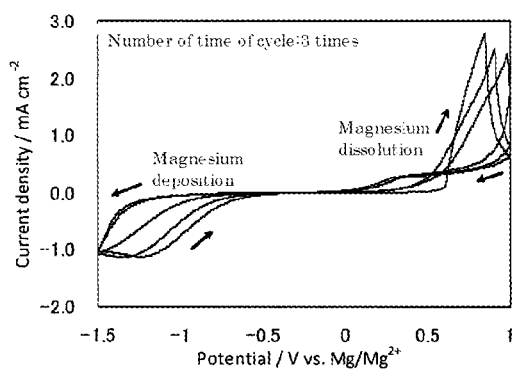
FIG. 65 represents a graph of CV measurement using the electrolytic solution 91 {Mg[(OTf)$_2$ (ethylene glycol)$_2$]/dimethoxyethane solution}, obtained from Example 139.

As is clear from the results of FIG. 65, oxidation current is observed accompanying with dissolution of magnesium from the vicinity of 0.5 V, and current density at the vicinity of 0.85 V was about 2.8 mA/cm$^2$. On the other hand, reduction current is observed accompanying with deposition of magnesium from the vicinity of −0.5 V, and current density at the vicinity of −1.5 V was about −1.0 mA/cm$^2$. Therefore, it has been clarified that by using the electrolytic solution 91, a reversible oxidation-reduction reaction of magnesium occurred, and thus gave high current density. Still more, it has also been found that dissolution and deposition of magnesium progress repeatedly and stably, because decrease in current density was not observed, even in sweep at or subsequent to the second cycle.

Comparative Example 7

Cyclic Voltammetry (CV) Measurement Using a Mg(Acac)$_2$ complex/tetrahydrofuran solution (1) Preparation of a Mg(Acac)$_2$ Complex/Tetrahydrofuran Solution 5.0 g (0.02 mol) of bis(2,4-pentanedionato)magnesium [Mg(acac)$_2$](produced by Tokyo Chemical Industry Co., Ltd.), and 45 ml of tetrahydrofuran (produced by Wako Pure Chemical Industries, Ltd.) were mixed and stirred at room temperature for 5 hours. After filtration separation of insoluble matters by suction filtration, 1 g of MS5 A [molecular sieve 5 A (produced by Wako Pure Chemical Industries, Ltd.)] was added to mother liquid for dehydration processing to prepare an electrolytic solution containing 0.49 M of the Mg(acac)$_2$ complex.

(2) CV Measurement

CV measurement was performed similarly as the method of Example 82, except by using an electrolytic solution containing 0.49 M of the above Mg(acac)$_2$ complex as the electrolytic solution. Results thereof are shown in FIG. 66.

Figure 66:
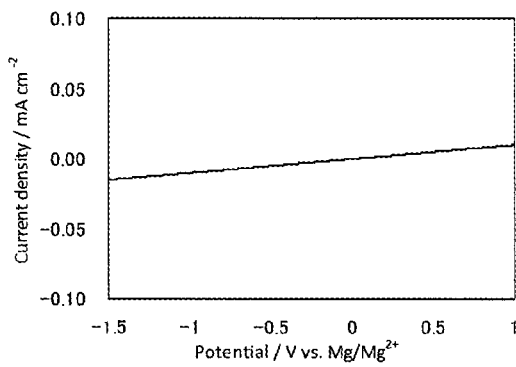
FIG. 66 represents a graph of CV measurement using the electrolytic solution [Mg(acac)$_2$ complex/tetrahydrofuran solution], obtained from Comparative Example 7.

As is clear from FIG. 66, in the case of using the Mg(acac)$_2$ complex/tetrahydrofuran solution as the electrolytic solution, a current peak accompanying with dissolution and deposition of magnesium was not observed at all.

Measurement results of oxidation current density and reduction current density, together with the electrolytic solution, a complex in the electrolytic solution and a solvent used in Examples 136 to 139, and Comparative Example 7 and Comparative Example 5 are shown in the following Table 12.

TABLE 12

| Example No. | Electrolytic Solution. No. | Mg complex | Solvent Name | Oxidation Current Density/ mA·cm$^2$ | Reduction Current Density/ mA·cm$^2$ |
|---|---|---|---|---|---|
| Example-136 | Electrolytric Solution-82 | Mg(OTf)$_2$/ (2-methoxyethanol)$_2$ | Dimethoxyethane | 4.5 | −1.5 |
| Example-137 | Electrolytric Solution-83 | Mg(OTf)$_2$/ (2-methoxyethanol)$_2$ | Diethylene glycol dimethyl ether | 4.6 | −1.1 |
| Example-138 | Electrolytric Solution-84 | Mg(OTf)$_2$/ (2-methoxyethanol)$_2$ | Tetrahydrofuran | 2.1 | −1.2 |

TABLE 12-continued

| Example No. | Electrolytic Solution. No. | Mg complex | Solvent Name | Oxidation Current Density/ mA·cm² | Reduction Current Density/ mA·cm² |
|---|---|---|---|---|---|
| Example-139 | Electrolytric Solution-91 | Mg(OTf)₂/ (ethylene glycol)₂ | Dimethoxyethane | 2.8 | −1.0 |
| Comparative Examle-7 | — | Mg(acac)₂ | Tetrahydrofuran | 0 | 0 |
| Comparative Examle-5 | — | Mg(OTf)₂ | Dimethoxyethane | 0.0026 | −0.0063 |

From the results of Examples 136 to 139, it has been clarified that by using the magnesium complex pertaining to the present invention as a supporting electrolyte, a general purpose organic solvent can be used as an electrolytic solution, without using the compound represented by the following general formula [2] pertaining to the present invention, and still more high current density is attained.

In addition, in Example 138 and Comparative Example 7, current density was measured using the same solvent and the complex in nearly the same concentration, except that the magnesium complex itself was different, and there was no current flow in known magnesium complex, however, in the case of using the magnesium complex pertaining to the present invention, there was observed 2.1 mA/cm² as an oxidation current and −1.2 mA/cm² as a reduction current, and thus it has been shown that by using specific magnesium complex, effect as the electrolytic solution can be obtained.

Still more, in comparing Examples 136 and 139 with Comparative Example 5, it has been clarified that in the case of using the magnesium salt as the supporting electrolyte, current density was very low, however, in the case of using the magnesium complex pertaining to the present invention, current density was very high.

In the magnesium complex pertaining to the present invention, as shown in the general formula [10], two molecules of the compound represented by the general formula [2] pertaining to the present invention are chelated to magnesium, however, in the Mg(acac)₂ complex having a similar coordination structure, oxidation-reduction current was not observed at all. From this fact, it has been clarified that the magnesium complex pertaining to the present invention has relatively mild chelating effect, as compared with the Mg(acac)₂ complex.

Therefore, from the results of the above Examples 136 and 139, as well as Comparative Examples 5 and 7, the electrolytic solution obtained from the complex pertaining to the present invention is estimated to become the electrolytic solution which is capable of repeating charge-discharge, due to rapid progress of elimination of the ligand (the compound represented by the general formula [2] pertaining to the present invention) from the magnesium complex in a reduction reaction (a deposition reaction of magnesium), while easy occurrence of re-coordination of the ligand (the compound represented by the general formula [2] pertaining to the present invention) to the dissolved magnesium ion, in an oxidation reaction (a dissolution reaction of magnesium).

It should be noted that also in the electrolytic solution of Examples 82 to 124, it is estimated that, due to generation of the magnesium complex where 2 molecules of ligands (the compounds represented by the general formula [2]) are coordinated to the magnesium ion in the supporting electrolyte, current density is significantly enhanced.

The invention claimed is:

1. An electrolytic solution for an electrochemical device comprising
  (1) a supporting electrolyte comprising a magnesium salt and
  (2) at least one or more kinds of the compounds represented by the following general formula [2]:

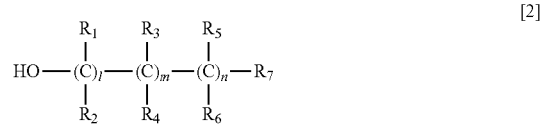

[2]

wherein l, m and n each independently represent an integer of 0 to 2;

$R_1$ and $R_2$ each independently represent a hydrogen atom, an alkyl group having 1 to 6 carbon numbers or a halogenoalkyl group having 1 to 6 carbon numbers;

$R_3$, $R_4$, $R_5$ and $R_6$ each independently represent a hydrogen atom, a halogen atom, an alkyl group having 1 to 6 carbon numbers, a halogenoalkyl group having 1 to 6 carbon numbers or a hydroxyl group;

$R_7$ represents an alkoxy group having 1 to 6 carbon numbers, an aralkyloxy group having 7 to 12 carbon numbers, an aryloxy group having 6 to 10 carbon numbers, an aryloxy group having 6 to 10 carbon numbers which has a halogen atom as substituent, an alkenyloxy group having 2 to 4 carbon numbers, a hydroxyalkenyl group having 2 to 4 carbon numbers, an alkylcarbonyl group having 2 to 7 carbon numbers, an alkylcarbonyloxy group having 2 to 7 carbon numbers, an alkenylcarbonyloxy group having 2 to 7 carbon numbers, an alkoxycarbonyl group having 2 to 7 carbon numbers, an alkylsulfonyl group having 1 to 4 carbon numbers, an alkylsilyloxy group having 1 to 6 carbon numbers, an alkylthio group having 1 to 4 carbon numbers, an arylcarbonyl group having 7 to 11 carbon numbers, an arylcarbonyloxy group having 7 to 11 carbon numbers, an aryloxycarbonyl group having 7 to 11 carbon numbers, a hydroxyalkyl group having 1 to 6 carbon numbers, an alkoxyalkyl group having 2 to 7 carbon numbers, an arylalkenyloxy group having 8 to 13 carbon numbers, an alkylsulfonyloxy group having 1 to 6 carbon numbers, a hydroxyaralkyloxy group having 7 to 12 carbon numbers, a hydroxyaryl group having 6 to 10 carbon numbers, a hydroxyaryloxy group having 6 to 10 carbon numbers, a hydroxyalkylcarbonyl group having 2 to 7 carbon numbers, an alkoxyarylalkyloxy group having 8 to 16 carbon numbers, an alkoxyaryl group having 7 to 13 carbon numbers, an alkoxyaryloxy group having 7 to 13 carbon numbers, an alkoxyalkenyl group having 3 to 7 carbon numbers, an alkoxyalkylcarbonyloxy group having 3 to 7 carbon numbers, an alkoxyalkenylcarbonyloxy group having 4 to 8 carbon numbers, an alkoxyalkyloxycarbonyl group having 3 to 7 carbon numbers, an alkoxyalkylcarbonyl group having 3 to 7 carbon numbers, a phosphono group represented by the following general formula [3]:

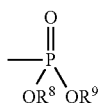

[3]

wherein $R_8$ and $R_9$ each independently represent a hydrogen atom or an alkyl group having 1 to 4 carbon numbers, an amide group represented by the following general formula [4]:

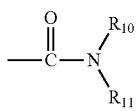

[4]

wherein $R_{10}$ and $R_{11}$ each independently represent a hydrogen atom or an alkyl group having 1 to 4 carbon numbers, a carbamide group represented by the following general formula [5]:

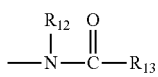

[5]

wherein $R_{12}$ represents a hydrogen atom or an alkyl group having 1 to 4 carbon numbers, $R_{13}$ represents an alkyl group having 1 to 4 carbon numbers, the group represented by the following general formula [6]:

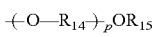

[6]

wherein p represents an integer of 1 to 6, $R_{14}$ each independently represents an alkylene group or a halogenoalkylene group having 1 to 3 carbon numbers when p is 2 to 5, $R_{15}$ represents a hydrogen atom, an alkyl group having 1 to 6 carbon numbers, or a halogenoalkyl group having 1 to 6 carbon numbers, a hydroxyl group, a carboxyl group, a sulfo group, an amino group, an amino group having an alkyl group which has 1 to 6 carbon numbers as substituent, a cyano group, a thiol group, a monocyclic heterocyclic group, a group derived from cyclic acetal, a group derived from cyclic carbonate, or a group derived from cyclic carboxylate, or a cycloalkyl group having 5 to 6 carbon numbers, which has an alkyl group having 1 to 3 carbon numbers, an amino group or a hydroxyl group as substituent, an aryl group having 6 to 10 carbon numbers, a monocyclic heterocyclic group, a group derived from cyclic acetal, a group derived from cyclic carbonate or a group derived from cyclic carboxylate.

2. The electrolytic solution according to claim 1, wherein $R_1$ and $R_2$ are a hydrogen atom or a methyl group.

3. The electrolytic solution according to claim 1, wherein $R_3$, $R_4$, $R_5$ and $R_6$ are each independently a hydrogen atom.

4. The electrolytic solution according to claim 1, wherein $R_7$ is an alkoxy group having 1 to 6 carbon numbers, an alkylcarbonyloxy group having 2 to 7 carbon numbers, an alkenyloxy group having 2 to 4 carbon numbers, a hydroxyalkenyl group having 2 to 4 carbon numbers, an alkylcarbonyl group having 2 to 7 carbon numbers, an alkoxycarbonyl group having 2 to 7 carbon numbers, the group represented by the general formula [3], the group represented by the general formula [6], a hydroxyl group or a cyano group.

5. The electrolytic solution according to claim 1, wherein n is 0.

6. The electrolytic solution according to claim 1, wherein the supporting electrolyte is comprising at least one kind of magnesium salt represented by the following general formula [1]:

[1]

wherein Mg represents a magnesium ion, q represents 1 or 2, and when q is 1, X represents oxide ion($O^{2-}$), sulfide ion($S^{2-}$), sulfate ion($SO_4^{2-}$), monohydrogen phosphate ion ($HPO_4^{2-}$), or carbonate ion($CO_3^{2-}$), which is a divalent anion, and when q is 2, X represents a perfluoroalkane sulfonate ion having 1 to 4 carbon numbers, a bis(perfluoroalkanesulfonyl)imide ion represented by the following general formula [7]:

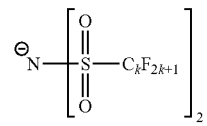

[7]

wherein k represents an integer of 1 to 4, F represents a fluorine atom, a bis(fluorosulfonyl)imide ion, an alkane sulfonate ion having 1 to 4 carbon numbers, an arene sulfonate ion having 6 to 10 carbon numbers, a perfluoroalkane carboxylate ion having 2 to 5 carbon numbers, an alkane carboxylate ion having 2 to 5 carbon numbers, an arene carboxylate ion having 7 to 11 carbon numbers, an alkoxide ion having 1 to 4 carbon numbers, a permanganate ion, a perchlorate ion, a tetraphenylborate ion, a tetrafluoroborate ion, a hexafluorophosphate ion, a hexafluoroarsenate ion, a nitrate ion, a dihydrogen phosphate ion, a hydrogen sulfate ion, a hydrogen carbonate ion, a hydrogen sulfide ion, a hydroxide ion($OH^-$), a thiocyanate ion, a cyanide ion($CN^-$), a fluoride ion($F^-$), a chloride ion($Cl^-$), a bromide ion($Br^-$), an iodide ion ($I^-$), or a hydride ion($H^-$), which is a monovalent anion.

7. The electrolytic solution according to claim 1, wherein concentration of the supporting electrolyte is 0.1 to 5.0 mol/L.

8. The electrolytic solution according to claim 1, further comprising (3) solvent.

9. The electrolytic solution according to claim 8, wherein the solvent comprises dimethoxyethane, 2-methyltetrahydrofuran, diethylene glycol dimethyl ether, propylene carbonate, acetonitrile, butyrolactone, ethanol, ethyl acetate, propionitrile, 1-ethyl-3-methylimidazolium trifluoromethanesulfonate, or tetraethylammonium trifluoromethanesulfonate.

10. An electrochemical device comprising the electrolytic solution according to claim 1, positive electrode, negative electrode and separator.

* * * * *